(12) United States Patent
Park et al.

(10) Patent No.: US 10,735,992 B2
(45) Date of Patent: Aug. 4, 2020

(54) CELLULAR COMMUNICATION METHOD ON BASIS OF FLEXIBLE FRAME STRUCTURE AND APPARATUS THEREFOR

(71) Applicant: Samsung Electronics Co., Ltd., Suwon-si, Gyeonggi-do (KR)

(72) Inventors: Seunghoon Park, Seoul (KR); Jungmin Moon, Suwon-si (KR); Byounghoon Jung, Seoul (KR); Sunheui Ryoo, Yongin-si (KR); Jungsoo Jung, Seongnam-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 15/754,140

(22) PCT Filed: Aug. 19, 2016

(86) PCT No.: PCT/KR2016/009212
§ 371 (c)(1),
(2) Date: Feb. 21, 2018

(87) PCT Pub. No.: WO2017/034247
PCT Pub. Date: Mar. 2, 2017

(65) Prior Publication Data
US 2018/0249374 A1  Aug. 30, 2018

Related U.S. Application Data

(60) Provisional application No. 62/208,198, filed on Aug. 21, 2015.

(51) Int. Cl.
*H04W 28/08* (2009.01)
*H04J 11/00* (2006.01)
(Continued)

(52) U.S. Cl.
CPC ............ *H04W 28/08* (2013.01); *H04J 11/00* (2013.01); *H04L 1/0007* (2013.01); *H04L 5/00* (2013.01);
(Continued)

(58) Field of Classification Search
CPC .................................................... H04W 28/08
(Continued)

(56) References Cited

U.S. PATENT DOCUMENTS

2010/0120444 A1  5/2010  Kuningas et al.
2010/0157901 A1  6/2010  Sanderovitz et al.
(Continued)

FOREIGN PATENT DOCUMENTS

CN  101652958 A  2/2010
CN  102118222 A  7/2011
(Continued)

OTHER PUBLICATIONS

Extended European Search Report dated Jul. 26, 2018, issued in European Application No. 16839536.6.
(Continued)

*Primary Examiner* — Shripal K Khajuria
(74) *Attorney, Agent, or Firm* — Jefferson IP Law, LLP

(57) ABSTRACT

The present invention relates to a communication technique for converging a 5G communication system for supporting a higher data rate beyond a 4G system with an IoT technology, and a system therefor. The present invention may be applied to intelligent services (for example, smart home, smart building, smart city, smart car or connected car, healthcare, digital education, retail, security and safety-related service, and the like) on the basis of a 5G communication technology and an IoT-related technology. A communication method for a terminal according to an embodiment of the present invention may comprise the steps
(Continued)

of: transmitting a RAT discovery request message to a base station through a CDCH; receiving, from the base station, a RAT discovery response message and system information associated with the RAT; and receiving, from the base station, a UE-specific configuration message through a resource area configured according to the system information.

15 Claims, 48 Drawing Sheets

(51) Int. Cl.
*H04L 5/00* (2006.01)
*H04W 48/16* (2009.01)
*H04W 48/14* (2009.01)
*H04L 1/00* (2006.01)
*H04L 12/805* (2013.01)
*H04W 72/12* (2009.01)
*H04W 68/02* (2009.01)

(52) U.S. Cl.
CPC .......... *H04L 5/0055* (2013.01); *H04L 5/0057* (2013.01); *H04L 47/365* (2013.01); *H04W 48/14* (2013.01); *H04W 48/16* (2013.01); *H04W 68/02* (2013.01); *H04W 72/1263* (2013.01)

(58) Field of Classification Search
USPC ........................................................ 370/310
See application file for complete search history.

(56) References Cited

U.S. PATENT DOCUMENTS

| | | |
|---|---|---|
| 2010/0202400 A1 | 8/2010 | Richardson et al. |
| 2011/0149813 A1 | 6/2011 | Parkvall et al. |
| 2011/0159904 A1 | 6/2011 | Cho |
| 2012/0122495 A1 | 5/2012 | Weng et al. |
| 2013/0028117 A1 | 1/2013 | Montojo et al. |
| 2014/0056220 A1* | 2/2014 | Poitau .................... H04W 76/14 370/328 |
| 2014/0071953 A1 | 3/2014 | Tian et al. |
| 2014/0342747 A1 | 11/2014 | Lee et al. |
| 2015/0063095 A1 | 3/2015 | Deng et al. |
| 2015/0173045 A1* | 6/2015 | Lee ........................ H04W 48/18 455/452.2 |
| 2015/0188690 A1 | 7/2015 | Khoryaev et al. |
| 2015/0215082 A1 | 7/2015 | Agiwal et al. |
| 2016/0044634 A1 | 2/2016 | Seo et al. |
| 2016/0119963 A1 | 4/2016 | Casati |
| 2016/0198507 A1* | 7/2016 | Wu ........................ H04W 76/14 370/330 |
| 2016/0309401 A1 | 10/2016 | Baek et al. |
| 2018/0192426 A1* | 7/2018 | Ryoo ................ H04W 74/0833 |
| 2018/0249374 A1 | 8/2018 | Park et al. |
| 2018/0249441 A1 | 8/2018 | Ryoo et al. |
| 2018/0262980 A1* | 9/2018 | Jeong ..................... H04W 8/04 |

FOREIGN PATENT DOCUMENTS

| | | |
|---|---|---|
| KR | 10-2014-0118496 A | 10/2014 |
| WO | 2014/152853 A2 | 9/2014 |
| WO | 2014-163335 A1 | 10/2014 |
| WO | 2014/187527 A1 | 11/2014 |
| WO | 2015/018239 A1 | 2/2015 |

OTHER PUBLICATIONS

Australian Office Action dated Jan. 30, 2020, issued in a counterpart Australian Application No. 2016312707.
Chinese Office Action dated Apr. 2, 2020, issued in a counterpart Chinese Application No. 201680048160.0.

* cited by examiner

<br>

(a)

(b)

(c)

CELLULAR COMMUNICATION METHOD ON BASIS OF FLEXIBLE FRAME STRUCTURE AND APPARATUS THEREFOR

TECHNICAL FIELD

The present invention relates to a communication method and apparatus and, in particular, to a method and apparatus for transmitting signals using a frame structure designed for a 5G communication system to support diverse communication technologies.

BACKGROUND ART

In order to meet the increasing demand for wireless data traffic since the commercialization of 4th generation (4G) communication systems, the development focus is on the 5th generation (5G) or pre-5G communication system. For this reason, the 5G or pre-5G communication system is called a beyond 4G network communication system or post long-term evolution (LTE) system. Implementation of the 5G communication system in millimeter wave (mmWave) frequency bands (e.g., 60 GHz bands) is being considered to accomplish higher data rates. In order to increase the propagation distance by mitigating propagation loss in the 5G communication system, discussions are underway about various techniques such as beamforming, massive multiple-input multiple output (MIMO), full dimensional MIMO (FD-MIMO), array antenna, analog beamforming, and large-scale antenna. Also, in order to enhance network performance of the 5G communication system, developments are underway of various techniques such as evolved small cell, advanced small cell, cloud radio access network (RAN), ultra-dense network, device-to-device (D2D) communication, wireless backhaul, moving network, cooperative communication, coordinated multi-points (CoMP), and interference cancellation. Furthermore, the ongoing research includes the use of hybrid frequency shift keying (FSK) and quadrature amplitude modulation (QAM){FQAM} and sliding window superposition coding (SWSC) as advanced coding modulation (ACM), filter bank multi-carrier (FBMC), non-orthogonal multiple access (NOMA), and sparse code multiple access (SCMA).

Meanwhile, the Internet is evolving from a human-centric communication network in which information is generated and consumed by humans to the Internet of things (IoT) in which distributed things or components exchange and process information. The combination of the cloud server-based Big data processing technology and the IoT begets Internet of everything (IoE) technology. In order to secure the sensing technology, wired/wireless communication and network infrastructure, service interface technology, and security technology required for implementing the IoT, recent research has focused on sensor network, machine-to-machine (M2M), and machine-type communication (MTC) technologies. In the IoT environment, it is possible to provide an intelligent Internet Technology that is capable of collecting and analyzing data generated from connected things to create new values for human life. The IoT can be applied to various fields such as smart home, smart building, smart city, smart car or connected car, smart grid, health care, smart appliance, and smart medical service through legacy information technology (IT) and convergence of various industries.

Thus, there are various attempts to apply the IoT to the 5G communication system. For example, the sensor network, M2M, and MTC technologies are implemented by means of the 5G communication technologies such as beamforming, MIMO, and array antenna. The application of the aforementioned cloud RAN as a big data processing technology is an example of convergence between the 5G and IoT technologies.

One of the main design goals of the 5G communication system is to provide communication throughput to cope with explosive data growth. To achieve this goal, research is mainly being conducted into aspects of massive bandwidth, small cell, and next generation transmission schemes. In order to secure a massive bandwidth, exploiting licensed band above 6 GHz in addition to the currently in use licensed band below 6 GHz and unlicensed/shared band are being considered. It may also be possible to increase spatial reuse in a given bandwidth with the introduction of the small cell concept.

Meanwhile, a 5G communication system should be designed to support IoT services and high-reliability/low-delay communication services as well as legacy mobile communication services. It may also be necessary consider future compatibility for service expansion, i.e., for supporting services expected in the future, without change of network infrastructure including base stations.

In LTE, as one of the representative 4G communication standards, the capacity of a transmission/reception link is determined as follows. A terminal (user equipment (UE)) performs measurement on a reference signal transmitted by a base station (evolved Node B (eNB)) in downlink and reports signal quality to the base station. Examples of the reference signal may include common/cell-specific reference signal (CRS), discovery reference signal (DRS), and channel state information-reference signal (CSI-RS), which are received by all UEs within a cell, and dedicated/demodulation reference signal (DMRS), which is received by a specific UE. The UE may observe/measure CRS/DRS/CSI-RS periodically or aperiodically and transmit, under the control of the eNB, a channel quality indicator (CQI) indicative of the measured channel quality to the eNB. The UE may use an uplink control channel for a periodic measurement report or an uplink data channel for an aperiodic measurement report. The eNB schedules the UE by allocating physical channel resource blocks based on the CQI transmitted by the UE and transmits resource allocation information as the scheduling result to the UE. The resource allocation information is conveyed in a physical downlink control channel (PDCCH) in the form of a control signal scrambled with a cell radio network temporary identifier (C-RNTI) or multimedia broadcast/multicast service (MBMS) radio network temporary identifier (M-RNTI), and the UE may receive on the physical channel block allocated in a physical downlink shared channel (PDSCH) indicated in the control signal.

In uplink, the eNB may performs measurement on a reference signal transmitted by the UE to determine signal quality. Examples of the reference signal of the UE uses a sounding reference signal (SRS) being periodically allocated (about 2~320 ms) by the eNB. Although not specific in the current standards, it may also be possible to consider using DMRS that is transmitted along with data being transmitted by the UE in uplink. The eNB may schedule the UE by allocating physical channel resource blocks based on the CQI generated as a result of measurement on the reference signal transmitted by the UE and transmit allocation information to the UE. The allocation information is conveyed in a physical downlink control channel (PDCCH) in the form of a control signal scrambled with a C-RNTI or M-RNTI, and the UE transmits the physical channel resource blocks in a physical uplink shared channel (PUSCH) indicated by the control channel.

LTE supports two different duplex modes: frequency division duplex (FDD) and time division duplex (TDD). In order to cope with traffic fluctuation and traffic amount reversion between downlink and uplink, it may be more appropriate to employ adoption of TDD for 5G communication systems from an economic view point because TDD makes it possible to implement both downlink and uplink in one carrier. Resource ratio of downlink and uplink should be changeable dynamically.

Meanwhile, deploying small cell eNBs close to each other in consideration of interference therebetween may increase costs. Also, in order to use unlicensed/shared band, it is necessary to take into consideration coexistence with other system/operator devices. In this respect, there is a need to consider interference control and a resource access scheme among the small cell eNBs.

Furthermore, there is a need of an improved resource access method for covering various service characteristics.

DISCLOSURE

Technical Problem

The present invention provides a resource access and transmission method capable of controlling interference and supporting various services using a frame structure flexible in adaptation to traffic load.

The objects of the present invention are not limited to the aforesaid, and other objects not described herein will be clearly understood by those skilled in the art from the descriptions below.

Technical Solution

In accordance with an aspect of the present invention, a resource access procedure and operation method of a base station and a terminal includes a condition and operation for transmitting, at the base station or terminal, a reference signal; a condition and operation for receiving, at the base station and terminal, the reference signal and measuring signal quality; a condition and operation for the terminal to report channel quality or congestion; an operation of the base station and terminal for changing a variable related to the resource access; and an operation of the terminal for changing the variable related to the resource access.

In accordance with another aspect of the present invention, a communication method of a terminal includes transmitting a radio access technology (RAT) discovery request message to a base station on a common discovery channel (CDCH), receiving an RAT discovery response message and RAT-related system information from the base station, and receiving a terminal-specific (UE-specific) configuration message from the base station in a resource region configured according to the system information.

In addition, transmitting the RAT discovery request message includes receiving a common configuration message including CDCH configuration information from the base station and transmitting the RAT discovery request signal to the base station on the CDCH configured according to the CDCH configuration information.

In addition, receiving the RAT discovery response message and the system information includes receiving the RAT discovery response message including position information for transmitting the system information from the base station and receiving the system information according to position information for transmitting the system information.

In addition, receiving the RAT discovery response message and the system information includes receiving the RAT discovery response message from the base station and receiving the system information on reception resources determined according to a position of a transmission resource of the RAT discovery request message or reception resources determined according to a position of reception resources of the RAT discovery response message.

In accordance with another aspect of the present invention, a communication method of a base station includes receiving a radio access technology (RAT) discovery request message from a terminal on a common discovery channel (CDCH), transmitting an RAT discovery response message and RAT-related system information to the terminal, and transmitting a terminal-specific (UE-specific) configuration message to the terminal in a resource region configured according to the system information.

In addition, receiving the RAT-discovery request message includes transmitting a common configuration message including CDCH configuration information to the terminal and receiving the RAT discovery request signal from the terminal on the CDCH configured based on the CDCH configuration information.

In addition, transmitting the RAT discovery response message and the system information includes transmitting the RAT discovery response message including position information for transmitting the system information to the terminal and transmitting the system information according to position information for transmitting the system information.

In addition, transmitting the RAT discovery response message and the system information includes transmitting the RAT discovery response message to the terminal and transmitting the system information on transmission resources determined according to a position of a reception resource of the RAT discovery request message or transmission resources determined according to a position of a transmission resource of the RAT discovery response message.

In accordance with another aspect of the present invention, a terminal includes a transceiver configured to transmit and receive signals and a controller configured to transmit a radio access technology (RAT) discovery request message to a base station on a common discovery channel (CDCH), receive an RAT discovery response message and RAT-related system information from the base station, and receive a terminal-specific (UE-specific) configuration message from the base station in a resource region configured according to the system information.

In accordance with still another aspect of the present invention, a base station includes a transceiver which transmits and receives signals and a controller configured to receive a radio access technology (RAT) discovery request message from a terminal on a common discovery channel (CDCH), transmit an RAT discovery response message and RAT-related system information to the terminal, and transmit a terminal-specific (UE-specific) configuration message to the terminal in a resource region configured according to the system information.

Advantageous Effects

The present invention is advantageous in terms of providing a control and access method for supporting varying traffic and diverse services in a 5G communication system.

The present invention is advantageous in terms of providing a resource access and transmission method capable of controlling interference and supporting various services using a frame structure flexible in adaptation to traffic load.

The advantages of the present invention are not limited to the aforesaid, and other advantages not described herein may be clearly understood by those skilled in the art from the descriptions below.

MODE FOR INVENTION

Figure 1:
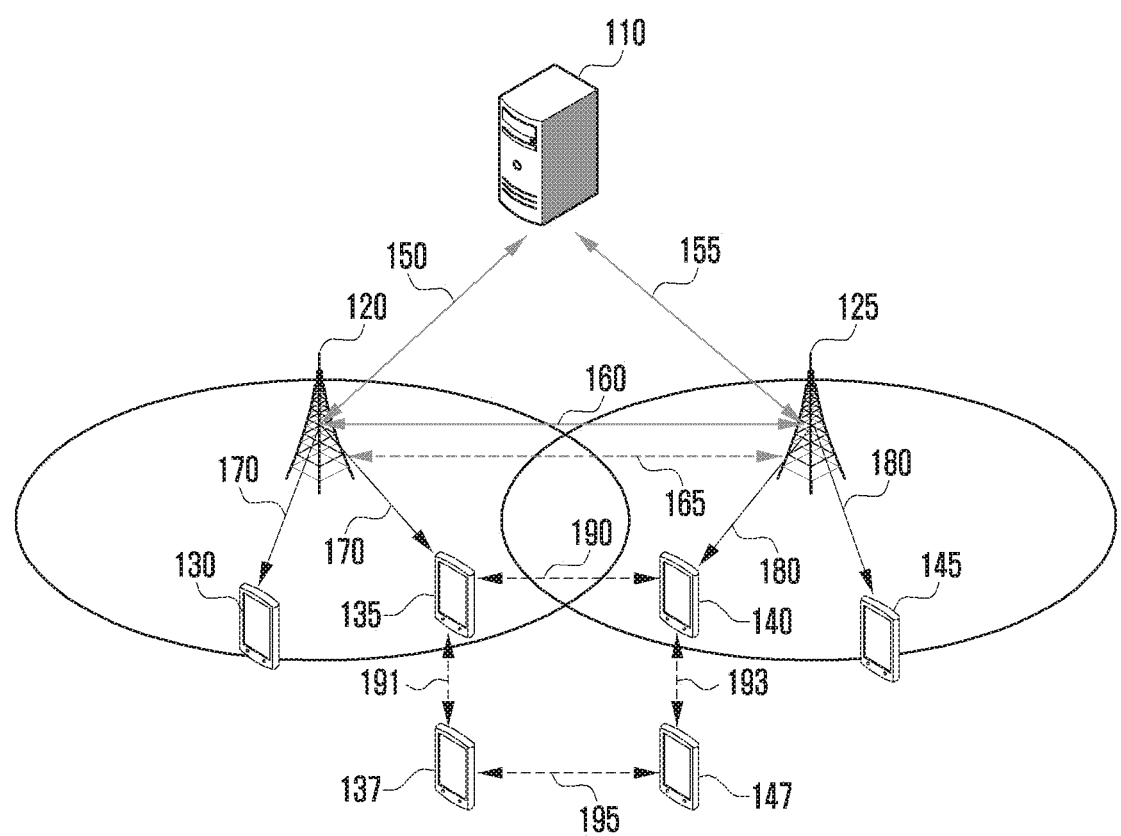
FIG. 1 is a diagram illustrating 5G access network architecture according to an embodiment of the present invention.

Detailed descriptions of technical specifications well-known in the art and unrelated directly to the present invention may be omitted to avoid obscuring the subject matter of the present invention. This aims to omit unnecessary description so as to make clear the subject matter of the present invention.

It will be understood that when an element is referred to as being "connected to" or "coupled to" another element, it can be directly connected or coupled to the other element or intervening elements may be present. It will be understood that the terms "comprises" "comprising," "includes" and/or "including" when used herein, specify including the following elements but not excluding others.

Although the components are depicted separately to indicate distinctive features, this does not mean that the components are configured as individual hardware or software units. That is, the components are enumerated separately just for convenience of explanation, and at least two of the components can be implemented as a single component or one component can be divided into a plurality of components taking charge of corresponding functions. The embodiments of the integrated and divided components are included in the scope of the present invention without departing from the spirit of the present invention.

Part of the components may not be essential components for inevitable functions of the invention and may be optional components just for performance enhancement. The present invention can be implemented with only the essential components required for implementing the subject matter of the present invention with the exception of the optional components for performance enhancement, and such a configuration with only the essential components with the exception of the optional components can be included in the claims of the present invention.

Detailed descriptions of well-known functions and structures incorporated herein may be omitted to avoid obscuring the subject matter of the present invention. Exemplary embodiments of the present invention are described in detail with reference to the accompanying drawings. Further, the following terms are defined in consideration of the functionality in the present invention, and they may vary according to the intention of a user or an operator, usage, etc. Therefore, the definition should be made on the basis of the overall content of the present specification.

It will be understood that each block of the flowcharts and/or block diagrams, and combinations of blocks in the flowcharts and/or block diagrams, can be implemented by computer program instructions. These computer program instructions may be provided to a processor of a general-purpose computer, special purpose computer, or other programmable data processing apparatus, such that the instructions which are executed via the processor of the computer or other programmable data processing apparatus create means for implementing the functions/acts specified in the flowcharts and/or block diagrams. These computer program instructions may also be stored in a non-transitory computer-readable memory that can direct a computer or other programmable data processing apparatus to function in a particular manner, such that the instructions stored in the non-transitory computer-readable memory produce articles of manufacture embedding instruction means which implement the function/act specified in the flowcharts and/or block diagrams. The computer program instructions may also be loaded onto a computer or other programmable data processing apparatus to cause a series of operational steps to be performed on the computer or other programmable apparatus to produce a computer implemented process such that the instructions that are executed on the computer or other programmable apparatus provide steps for implementing the functions/acts specified in the flowcharts and/or block diagrams.

According to various embodiments of the present disclosure, the term "module", means, but is not limited to, a software or hardware component, such as a Field Programmable Gate Array (FPGA) or Application Specific Integrated Circuit (ASIC), which performs certain tasks. A module may advantageously be configured to reside on the addressable storage medium and configured to be executed on one or more processors. Thus, a module may include, by way of example, components, such as software components, object-oriented software components, class components and task components, processes, functions, attributes, procedures, subroutines, segments of program code, drivers, firmware, microcode, circuitry, data, databases, data structures, tables, arrays, and variables. The functionality provided for in the components and modules may be combined into fewer components and modules or further separated into additional components and modules. In addition, the components and modules may be implemented such that they execute one or more CPUs in a device or a secure multimedia card.

Before undertaking below the detailed description of the present invention, it may be advantageous to set forth definitions of certain words and phrases used throughout the specification. However, it should be noted that the words and phrases are not limited to the exemplary interpretations herein.

The term "base station" denotes an entity connecting a number of other devices to one another and may be interchangeably referred to as BS, base station transceiver (BTS), node B (NB), evolved node B (eNB), and access point (AP). Particularly in a heterogeneous network including a primary base station and secondary base stations as the basis of the present invention, the primary base station may be interchangeably referred to as macro BS, macro eNB (MeNB), and primary cell (PCell); and the secondary base station may be interchangeably referred to as small BS, small eNB (SeNB), and secondary cell (SCell).

The term "terminal" denotes an entity communicating with a base station and may be interchangeably referred to as user equipment (UE), device, mobile station (MS), and mobile equipment (ME).

In a heterogeneous network, a terminal may communicate system information, control signal, and mobility-sensitive traffic such as voice through the PCell and burst data traffic through the SCell.

In the coverage area of a base station, a terminal may operate in a radio resource control (RRC) IDLE state or an RRC CONNECTED state.

A terminal in the RRC IDLE state selects a base station (or cell), monitors a paging channel, and receives system information (SI) without communicating data with the base station.

A terminal in the RRC CONNECTED state monitors for a control channel and communicates data with the base station through a data channel. The terminal in the RRC CONNECTED state may report measurement results associated with the serving and neighboring base stations to the serving base station to assist scheduling operation of the serving base station.

FIG. 1 is a diagram illustrating 5G access network architecture according to an embodiment of the present invention.

A 5G communication system should be designed to support various access schemes. In this respect, the network architecture of FIG. 1 can be considered.

In reference to FIG. 1, a first eNB (SeNB1 or eNB1) 120 and a second eNB (SeNB2 or eNB2) 125 may be controlled by an operation, administration, and maintenance (OAM) server or a centralized radio resource management (C-RRM) server 110 as denoted by reference numbers 150 and 155. Alternatively, the first eNB 120 and the second eNB 125 may exchange control signals directly to be controlled in a distributive way as denoted by reference numbers 160 and 165. In the case of being controlled in a distributive way between eNBs, the first and second eNBs 120 and 125 may exchange control signals via a wired link 160 or a wireless link 165. In downlink, it may be possible to protect against resource collisions among the UEs 130, 135, 137, 140, 145, and 147 being served by the eNBs 120 and 125. However, it may be possible to consider sharing resources between the two neighboring eNBs 120 and 125 in the 5G communication system. In this case, employment of a contention-based resource access or distributed-scheduling resource access may be considered for the UEs 130, 135, 137, 140, 145 and 147 being served by the neighboring eNBs 120 and 125 as denoted by reference numbers 190, 191, 193 and 195. Employment of a contention-based resource access or distributed-scheduling resource access may be considered in uplink for the UEs 130, 135, 137, 140, 145 and 147 being served by one or both of the eNBs 120 and 125

Figure 2:
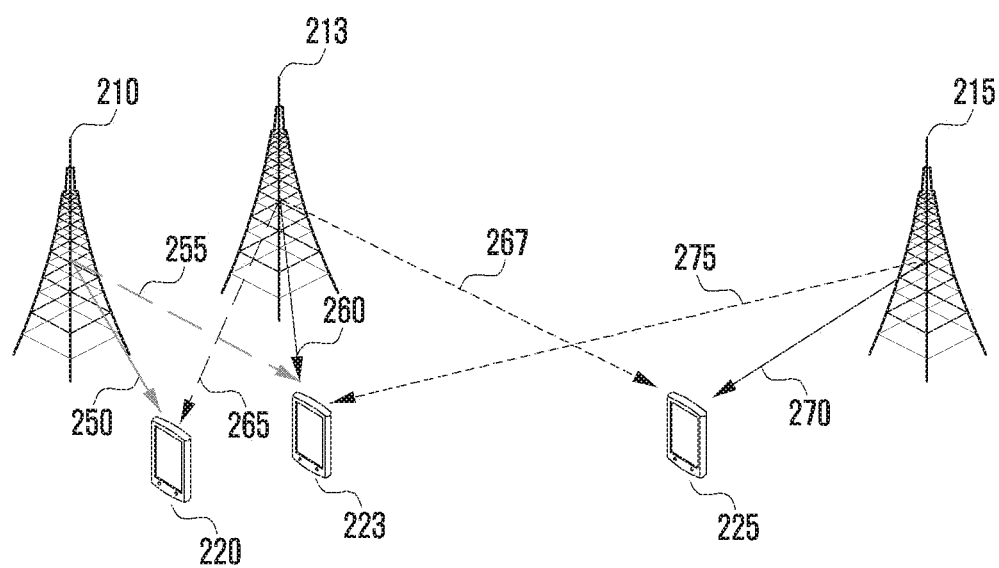
FIG. 2 is a diagram for explaining an example of resource allocation in a 5G communication system.

FIG. 2 is a diagram for explaining an example of resource allocation in a 5G communication system.

In a high density, small cell environment using both the licensed and unlicensed bands, eNBs are likely to be deployed in an unplanned manner as shown in FIG. 2. In this environment, the interference between first and second eNBs 210 and 213 that are located close to each other is high, and it is necessary to assign resources orthogonally. That is, the signal 250 transmitted on the first resource which the first eNB 210 has allocated the first UE 220 may act as an interference signal to the second UE 223 located within the coverage of the second eNB 213 as denoted by reference number 255. Likewise, the signal 260 transmitted on the second resource that the second eNB 213 has allocated to the second UE 223 may act as an interference signal to the first UE 220 as denoted by reference number 265. In order to avoid this situation, the first and second eNBs 210 and 213 may allocate resources orthogonally. In the case where the interference is low as between the first and third eNBs 213 and 215, it may be possible to allocate the same resources for radio resource reuse (spectrum reuse). That is, in the case where the second and third eNBs 213 and 215 are located far from each other as shown in the drawing, the signal 260 transmitted on the second resource that the second eNB 213 has allocated to the second UE 223 is unlikely to act as an interference signal to the third UE 225 as denoted by reference number 267. Likewise, the signal 270 transmitted on the second resource which the third eNB 215 has allocated to the third UE 225 is unlikely to act as an interference signal to the second UE 223 as denoted by reference umber 275. Accordingly, the second and third eNBs 213 and 215 may allocate the same resources for resource reuse.

In the present invention, exchange by eNBs of resource allocation information through an inter-eNB wired or wireless link and adjustment of resource allocation based on interference amount are considered.

In a 5G communication system, it may be necessary to support different types of resource access schemes for supporting various services. The resource access schemes may be categorized into two categories: scheduled access (SA) and contention-based access (CBA). The SA may be controlled by one device or multiple devices for resource allocation: the former being a centralized SA (C-SA) and the latter a distributed SA (D-SA), in which multiple peer devices exchange signals and messages for control of SA in an equal relationship. SA may also be referred to as contention-free access (CFA). C-SA may also be called centralized resource allocation, and D-SA may also be called distributed resource allocation. D-SA may be implemented as a combination of CA and SA so as to be called hybrid access (HA).

The present invention proposes a resource allocation method in which eNBs exchange information on the resource access scheme-specific frame structures through inter-eNB wired or wireless links and adjust the resource scheme based on the interference amount predicted based on the frame structure information. The frame structure information may include a resource access type and uplink/downlink/peer-link resource allocation information. Here, the term "peer-link" denotes a bidirectional link for sidelink, device to device (D2D), or mesh connection. The frame structure information may include resource access type in association with units on time and frequency axes and uplink/downlink/peer-link resource allocation information. The frame structure information may also include the resource allocation information indicative of one of full use, partial use, and non-use. Furthermore, the frame structure information may include the resource allocation information indicative of a transmit power value.

For example, an eNBs may exchange the information on the frame structure it wants to use with neighboring eNBs through an X2 interface. The eNB may also exchange the frame structure information with neighboring/grouped eNBs via an OAM server or a mobility management entity (MME). The eNB may exchange the frame structure information with the neighboring/grouped eNBs using a beacon transmitted through a control channel establishing therebetween. The description is directed to the case where a control channel is established between eNBs in consideration of the inter-eNB signal power/quality measurement function.

Figure 3A:
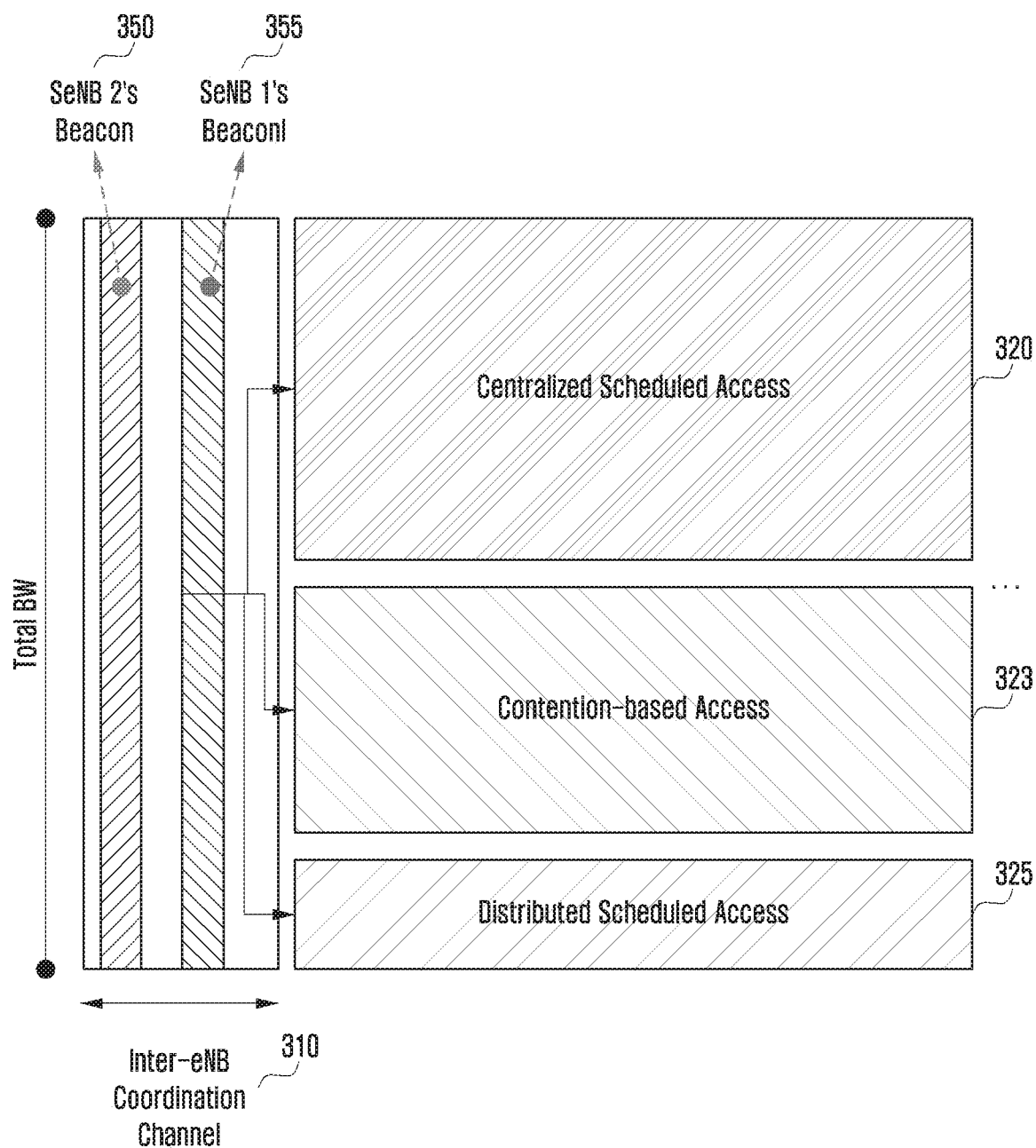
FIGS. 3A and 3B are diagrams for explaining a method for exchanging frame structure information between eNBs according to an embodiment of the present invention.
Figure 3B:
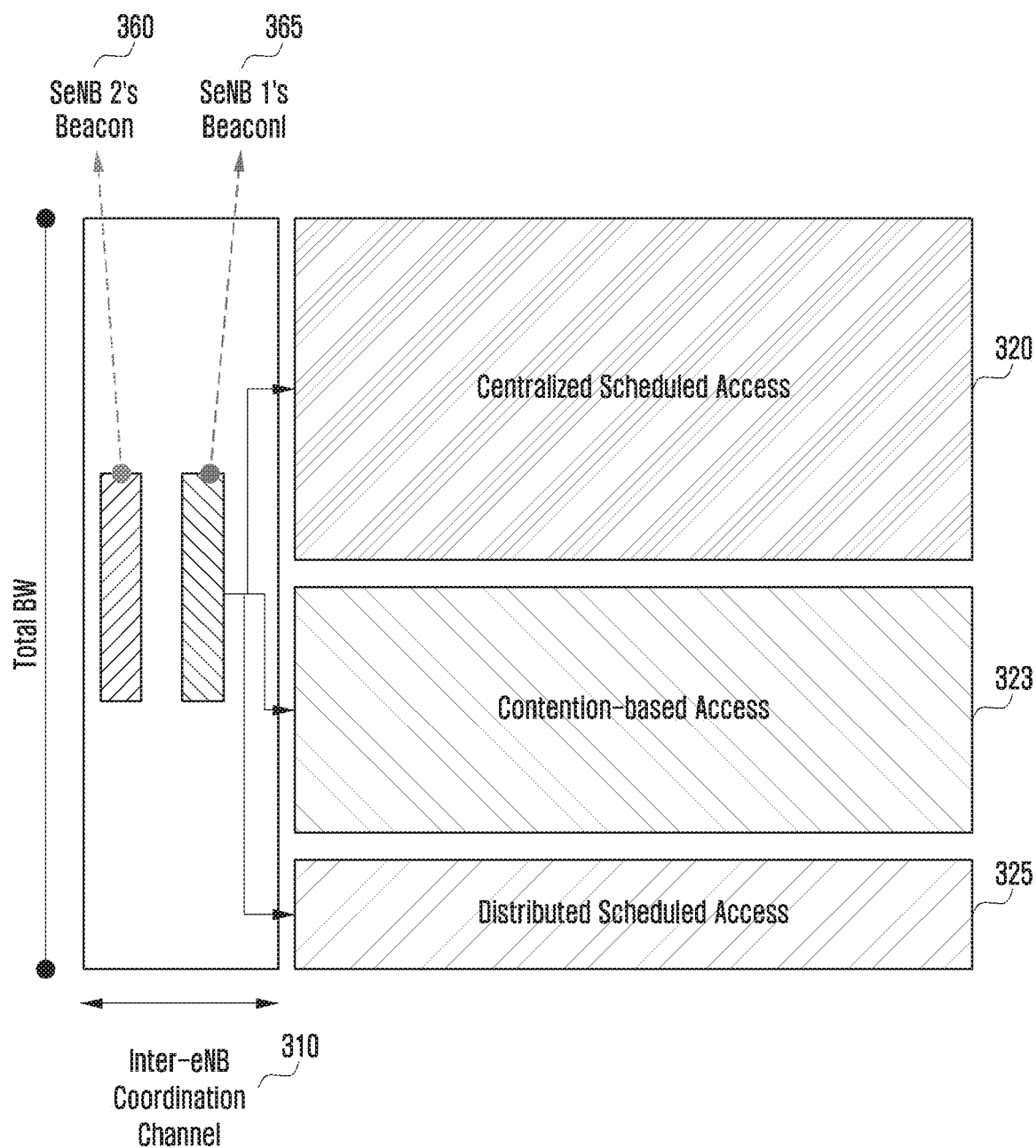
Figure 4:
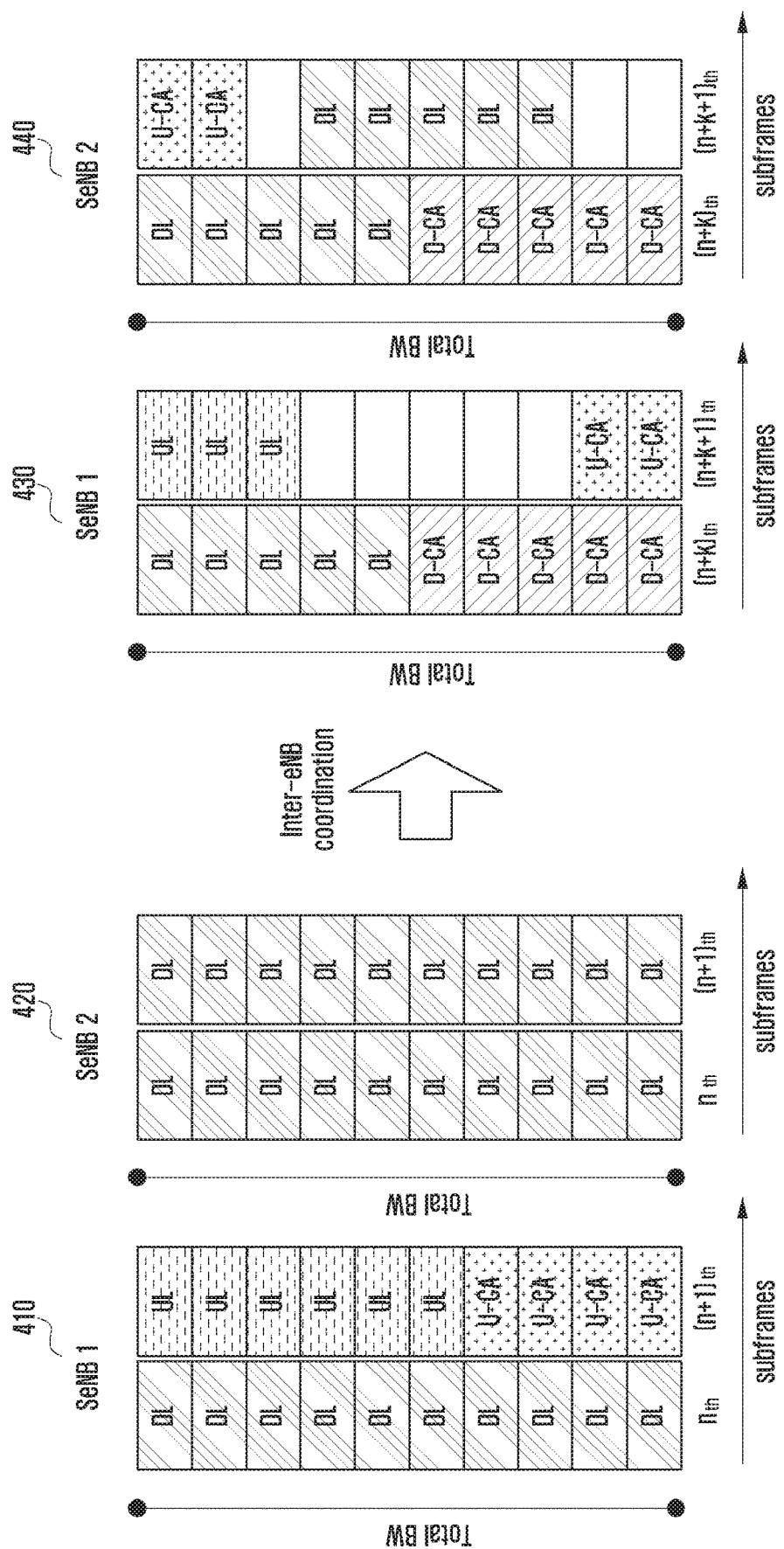
FIG. 4 is a diagram for explaining a principle of configuring a frame structure based on frame structure information according to an embodiment of the present invention.

FIGS. 3A and 3B are diagrams for explaining a method for exchanging frame structure information between eNBs according to an embodiment of the present invention, and FIG. 4 is a diagram for explaining a principle of configuring a frame structure based on frame structure information according to an embodiment of the present invention.

In reference to FIGS. 3A and 3B, the first and second eNBs may transmit beacons 350, 355, 360, and 365 over inter-eNB control channel (inter-eNB coordination channel) 310. In this case, the beacons 350, 355, 360, and 365 may be transmitted across the whole bandwidth as exemplified in FIG. 3A or in parts of the whole bandwidth as exemplified in FIG. 3B. Here, the frame structure may be configured based on the beacons 355 and 365 of the first eNB. That is, it may be possible to configure centralized scheduled access 320, contention-based access 323, and distributed scheduled access 325 based on the beacons 355 and 365 of the first eNB. Meanwhile, the first eNB may monitor the inter-eNB control channel 310 to receive the beacons 350 and 360 transmitted by other eNBs (e.g., second eNB) at a timing different from the timing of transmitting its beacons 355 and 365. Because the inter-eNB control channel is half-duplex, the beacons 350, 355, 360, and 365 should be transmitted in a timely separated manner in a time division multiplexing (TDM) mode or a carrier-sense multiple access with collision avoidance (CSMA/CA) mode. Even other UEs that are served by or which have camped on the UEs have to receive the beacons and update the frame structure based on the beacons.

In reference to FIG. 4, the first and second eNBs may exchange frame structure information of subframe n 410 and subframe n+1 420 and update and determine a frame structure of subframe n+k 430 and subframe n+k+1 440 in a way of adjusting or determining resource allocation schemes per resource, in consideration of potential interference between the first and second eNBs and resource allocation schemes of the first and second eNBs that are acquired from the frame structure information. In the case of exchanging the frame structure information between eNBs via a network, k may be set to 0. In the case of exchanging the frame structure information through the inter-eNB control channel, k may be set to a value greater than 0 because the inter-eNB control channel is resource-constrained.

In more detail, an eNB may identify neighboring eNBs as interferers based on the received signal strengths of the beacons transmitted by the neighboring eNBs and determine resource allocation information with the neighboring eNBs according to a priority rule. The priority rule may include a rule prioritizing resource allocation schemes and a rule of prioritizing eNBs. For example, in a case of collision between downlink (DL) and uplink (UL), it may be possible to give priority to the downlink. Meanwhile, in a case of collision between UL and uplink contention (U-CA), it may be possible to give priority to the uplink. In a case of collision between the resource allocation schemes with the same priority on the same resource, it may be possible to give priority of use to the resources based on the priorities of the eNBs. In order to achieve this purpose, it may be necessary for the eNBs to include a value indicative of their priority in their beacons 350, 355, 360, and 365. The priority of an eNB may be determined according to a predetermined generation pattern, configured according to an indicator from an MME or OAM server, or set to an arbitrary value generated by the eNB.

Figure 5:
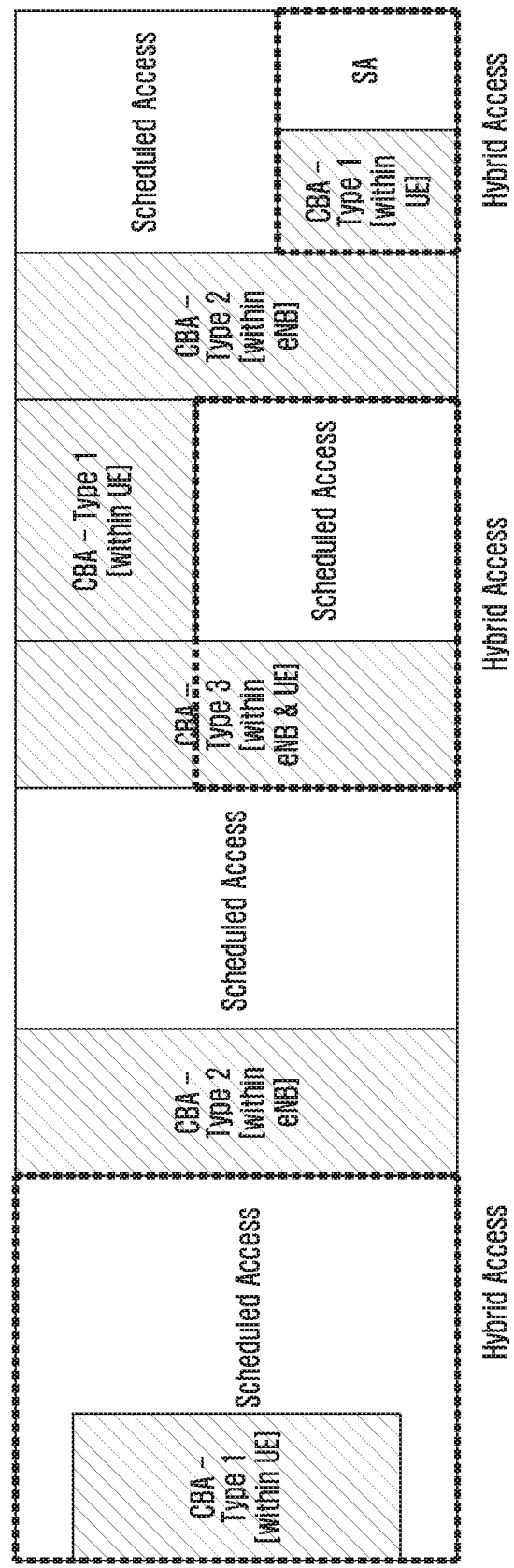
FIG. 5 is a diagram illustrating a HA or D-SA method according to an embodiment of the present invention.

FIG. 5 is a diagram illustrating a hybrid access or distributed scheduled access method according to an embodiment of the present invention.

In reference to FIG. 5, the hybrid access or distributed scheduled access may be implemented by combining contention-based access (CBA) and scheduled access (SA). That is, the hybrid access (HA) is characterized in that the eNBs exchange signals in a CBA region for small data size in order for the eNBs that won the contention to perform transmission in a SA region. The CBA type 1 is characterized by inter-UE signaling, the CBA type 2 by inter-eNB signaling, and the CBA type 3 by inter-UE, inter-eNB, and UE-eNB signaling.

The resource access scheme configuration method may be summarized as follows:

1) eNBs exchange resource allocation information including a resource access scheme by means of a beacon or system information message, using an inter-eNB wired control protocol, or under the control of a centralized server.

2) An eNB may determine the signal strength of a neighboring eNB based on the received signal strength measured on its beacon, SI, or synchronization/reference signal.

3) The eNB assess the interference effect of the signal transmitted by a neighboring eNB by taking the resource access scheme into consideration.

4) The eNB computes the resource access scheme and resource allocation in the next subframe based on the potential interference and shares the computation result with the neighboring eNB through beacon/SI messages or a wired network.

5) The UE receives the beacon/SI message transmitted by the eNB, identifies the resource in which the resource access scheme is changed, performs at least one of detection of a control signal based thereon, detection of data signals, determination of a data transmission scheme, channel measurement, and energy sensing.

Figure 6:
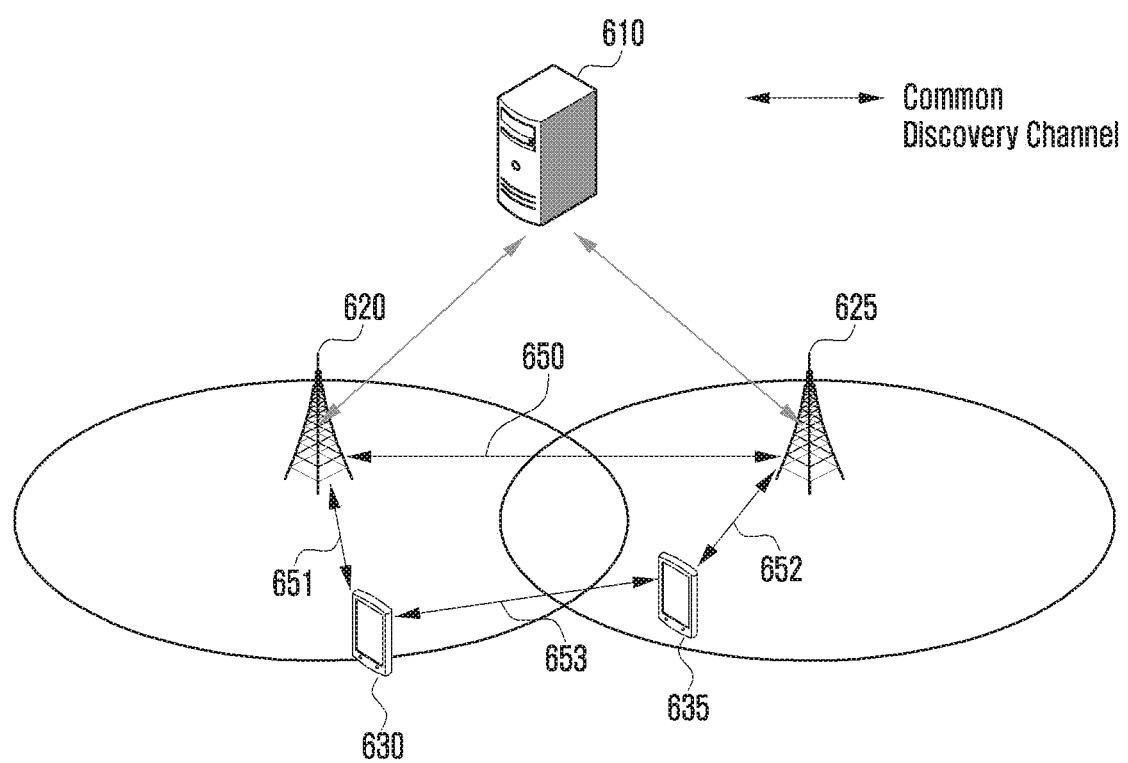
FIG. 6 is a diagram illustrating transmission of common discovery channels in a 5G communication system according to an embodiment of the present invention.
Figure 7:
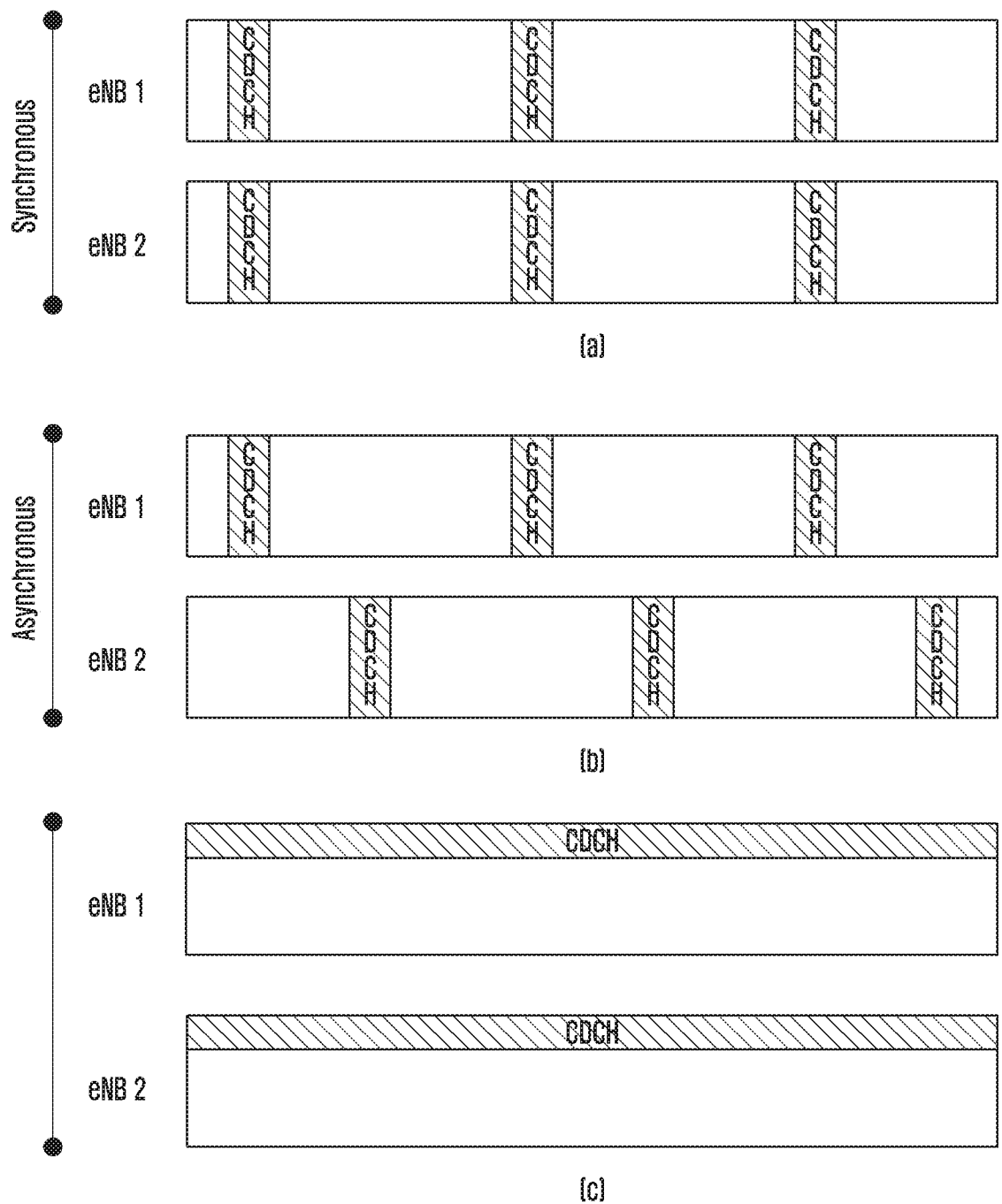
FIG. 7 is a diagram illustrating allocation of resources for common discovery channel transmission according to an embodiment of the present invention.

FIG. 6 is a diagram illustrating transmission of common discovery channels in a 5G communication system according to an embodiment of the present invention, and FIG. 7 is a diagram illustrating allocation of resources for common discovery channel transmission according to an embodiment of the present invention.

In reference to FIG. 6, the first and second eNBs 620 and 625 may be connected to an OAM or C-RRM server 610. The first UE 630 may be located within the coverage of the first eNB 620, and the second UE 635 may be located within the coverage of the second eNB 625.

In a 5G communication system, it may be possible to configure common discovery channels (CDCHs) 650, 651, 652, and 653 in order for various network entities including the eNBs 620 and 625 and UEs 630 and 635 to exchange small size information promptly.

The CDCHs 650, 651, 652, and 653 may be arranged on the time or frequency axis as exemplified in FIG. 7. In the case of a synchronous network, the eNBs may be allocated the same time resources for CDCHs 650, 651, 652, and 653 as shown in part (a) of FIG. 7. In the case of an asynchronous network, the eNBs may be allocated different time resources for CDCHs 650, 651, 652, and 653 as shown in part (b) of FIG. 7 and share the information. It may also be possible to consider allocating frequency resources for the CDCHs 650, 651, 652, and 653 for CDCH configuration independent of a synchronous/asynchronous network as shown in part c) of FIG. 7; but, in this case, an extra scheduling operation is required because of the half duplex constraint. Examples of the extra scheduling operation may include allocating extra time/frequency/code resources for the eNBs 620 and 625 to receive uplink CDCHs 651 and 652 transmitted by the UEs 630 and 635, allocating extra time/frequency/code resources for the eNB 620 and 625 to transmit downlink CDCHs 651 and 652 to the UEs 630 and 635, allocating extra time/frequency/code resources for the eNBs 620 and 625 to exchange CDCH 650, and allocating time/frequency/code resources for the UEs 630 and 635 to exchange CDCH 653.

Figure 8:
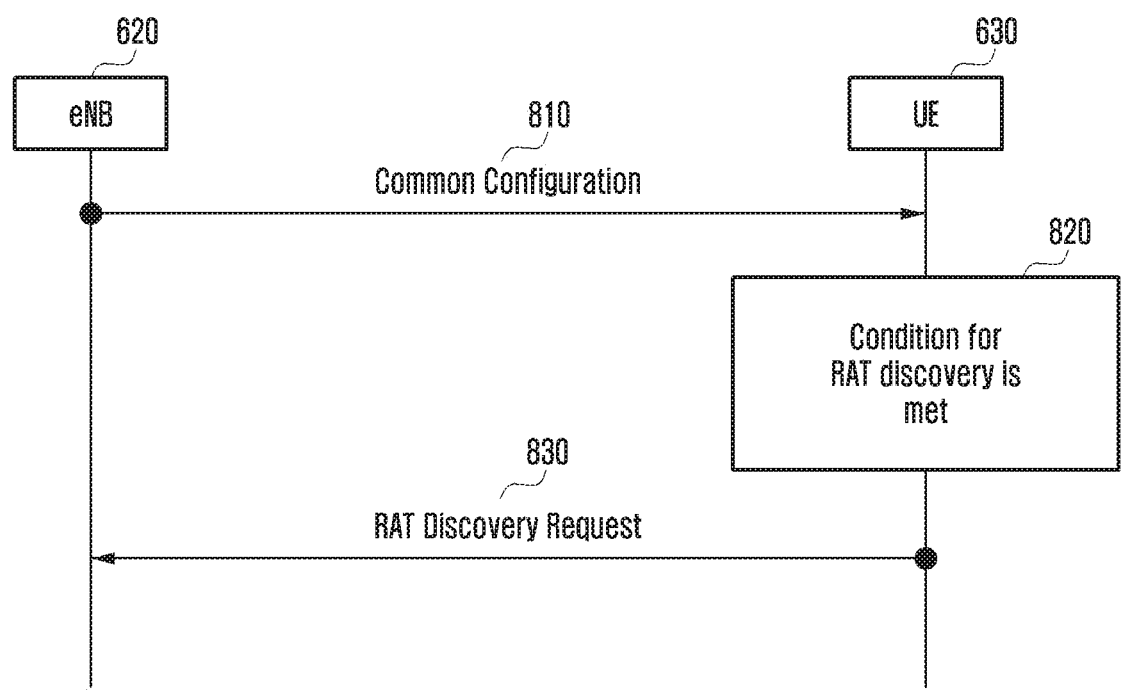
FIG. 8 is a signal flow diagram illustrating a procedure for notifying a UE of CDCH configuration according to an embodiment of the present invention.

FIG. 8 is a signal flow diagram illustrating a procedure for notifying a UE of CDCH configuration according to an embodiment of the present invention.

In reference to FIG. 8, the network (i.e., eNB 620) may transmit to the UE 630 a common configuration message indicative of CDCH configuration at step 810. The common configuration message includes system information commonly required at the least per service regardless of the type of the UE 630 and related configuration information. The eNB 620 may transmit the common configuration message a) to the UE 620 with the common time/frequency resource regardless of the type of UE/service or b) to the UE 630 connected to the UE/service-specific network through per-connected network (per radio access technology (RAT)) control channel or data channel. The common configuration message may include at least one of RAT (service, slice) information and RAT (service, slice) ID. If the common configuration message includes no RAT information/ID, the UE should have the RAT information/ID stored previously.

If the common configuration message is received, the UE 630 may monitor to detect fulfillment of a condition for transmitting an RAT discovery signal at step 820. If the RAT discovery signal transmission condition is fulfilled, the UE 630 may transmit at step 830 an RAT discovery request signal to the eNB 620 on the CDCH configured based on the information included in the common configuration message.

Figure 9:
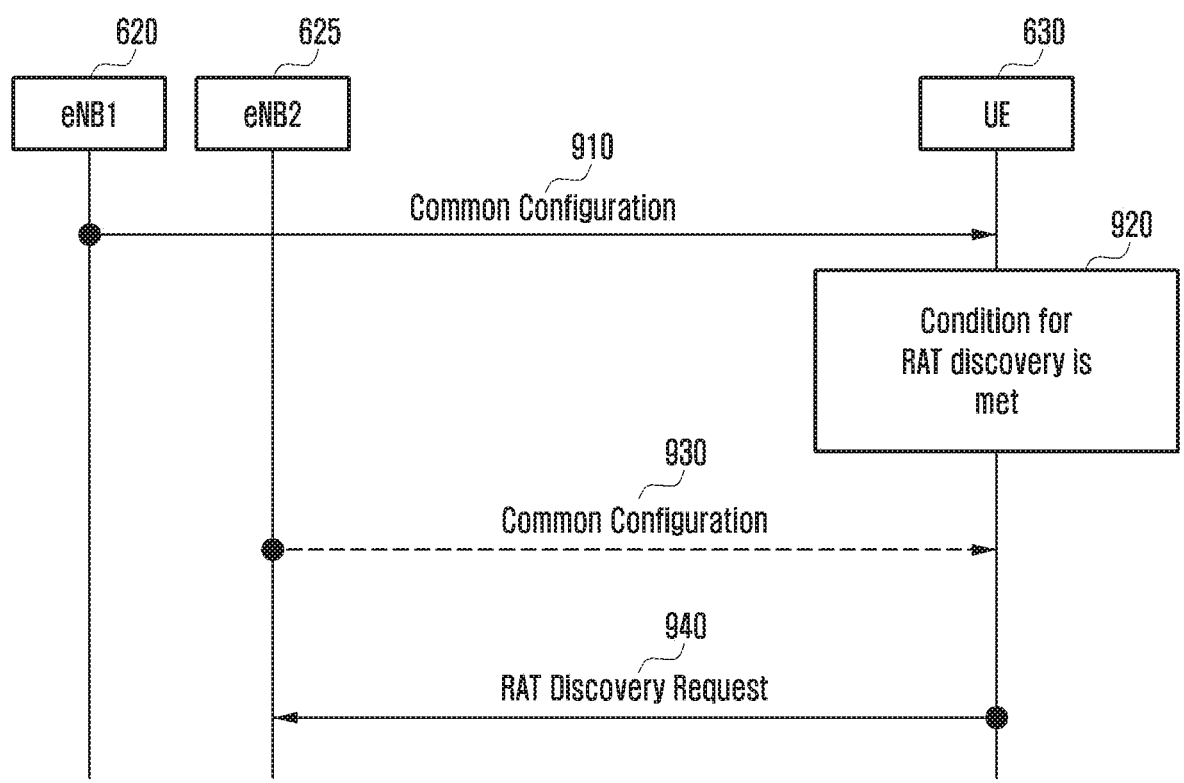
FIG. 9 is a signal flow diagram illustrating a procedure for notifying a UE of CDCH configuration according to another embodiment of the present invention.

FIG. 9 is a signal flow diagram illustrating a procedure for notifying a UE of CDCH configuration according to another embodiment of the present invention.

In reference to FIG. 9, the UE 630 may receive a common configuration message transmitted by the first eNB 620 at step 910. Upon receipt of the common configuration message, the UE 630 may transmit an RAT discovery request message to the second eNB 625 through steps 920 to 940. The UE 630 may select the eNB 625 as the destination of the RAT discovery request message through cell (re)selection through signal quality measurement on the synchronization signals and reference signals of the eNBs 620 and 625 and camped-cell selection. Meanwhile, in the camped cell selection procedure, the UE 630 may optionally check the common configuration message one more time at step 930. Here, the eNBs 620 and 625 may transmit to the UE 630 the common configuration messages including version information and, in this case, the UE 630 may cancel the operation of receiving the common configuration messages including the same version information. Although it is typical that the first and second eNBs 620 and 625 are physically separated devices, the two eNBs may be virtual entities belonging to a higher layer network (i.e., RAT or slice) and separated in one physical entity.

FIGS. 10 to 17 are signal flow diagrams illustrating a simplified initial/random access procedure of a UE according to embodiments of the present invention.

As an example, CDCH may be used for shortening the random access procedure of the UE 630. In reference to FIG. 17, the UE 630 may transmit to the eNB 620 an RAT discovery request message including information on the service which the UE 630 is interested in through the CDCH at step 1710. Then the eNB 620 may transmit to the UE 630 an RAT discovery response message at step 1720, the RAT discovery response message notifying the UE 630 of the position at which the system information related to the service is transmitted a) implicitly or 2) explicitly. Afterward, the eNB 620 may transmit the system information (SI) configured for the UE 630 at the corresponding position at step 1730. Meanwhile, the RAT discovery request message being transmitted at step 1710 may trigger a random access channel (RACH) procedure in which the eNB 620 determine a network-specific ID for use by the UE 630 and transmission-related information and transmits a UE-specific configuration message including the network-specific ID and transmission-related information to the UE 630 at step 1740.

The UE-specific configuration message may be transmitted in a resource region indicated by the system information.

Detailed descriptions are made of the respective operations hereinafter.

Figure 10:
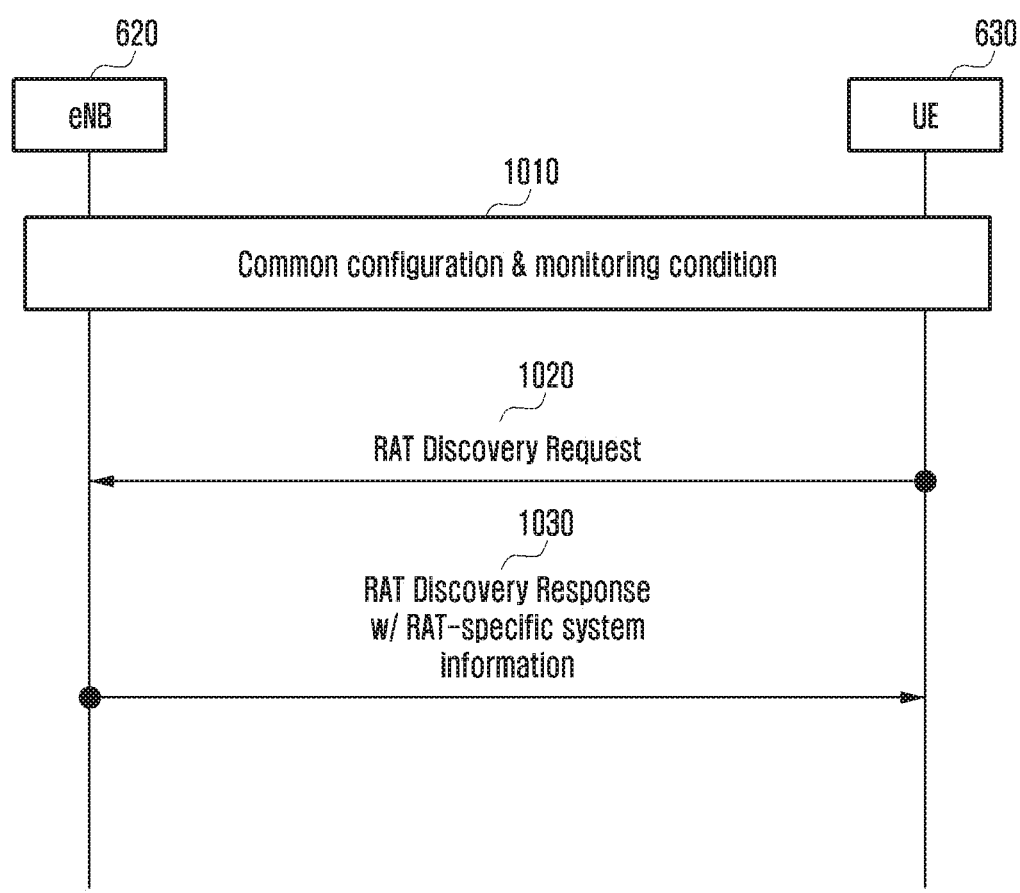
FIGS. 10 to 15, 16A and 16B, and 17 are signal flow diagrams illustrating a simplified initial/random access procedure of a UE according to embodiments of the present invention.

FIG. 10 depicts an exemplary implicit SI information transmission method. At step 1010, as described with reference to FIGS. 8 and 9, the eNB 620 may transmit to the UE 630 a common configuration message including CDCH configuration information and, upon receipt of the common configuration message, the UE 630 may monitor whether a condition for transmitting an RAT discovery request message is fulfilled. If the condition is fulfilled, the UE 630 may transmit a RAT discovery request message to the eNB 620 at step 1020.

In response to the RAT discovery request message from the UE 630, the eNB 620 may transmit to the UE 630 an RAT discovery response message along with the SI related to the RAT requested by the UE 630 at step 1030. The transmission position of the RAT-specific SI may be predetermined or determined depending on the position at which the RAT discovery response message is received or the position at which the RAT discovery request message is transmitted.

Figure 11:
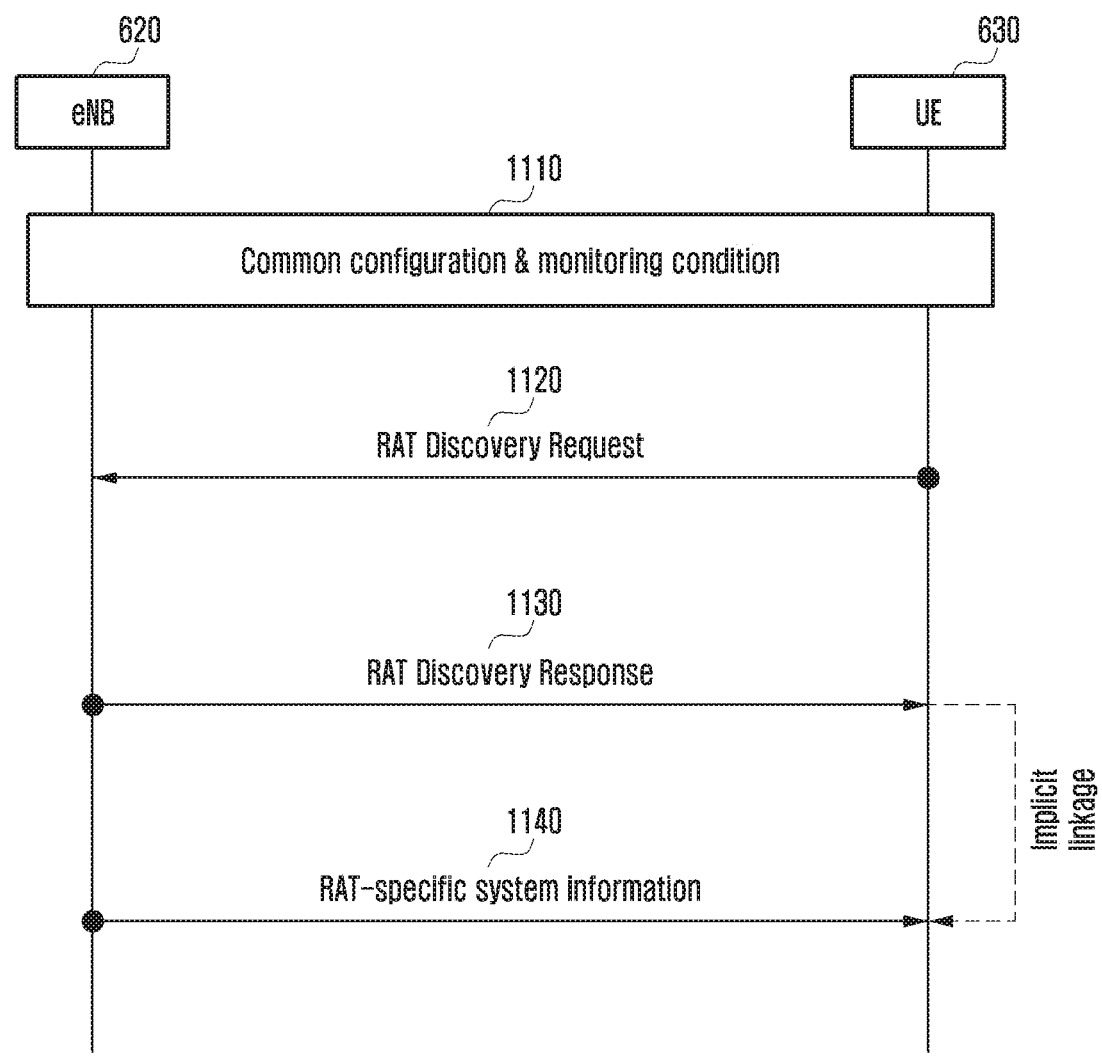
Figure 12:
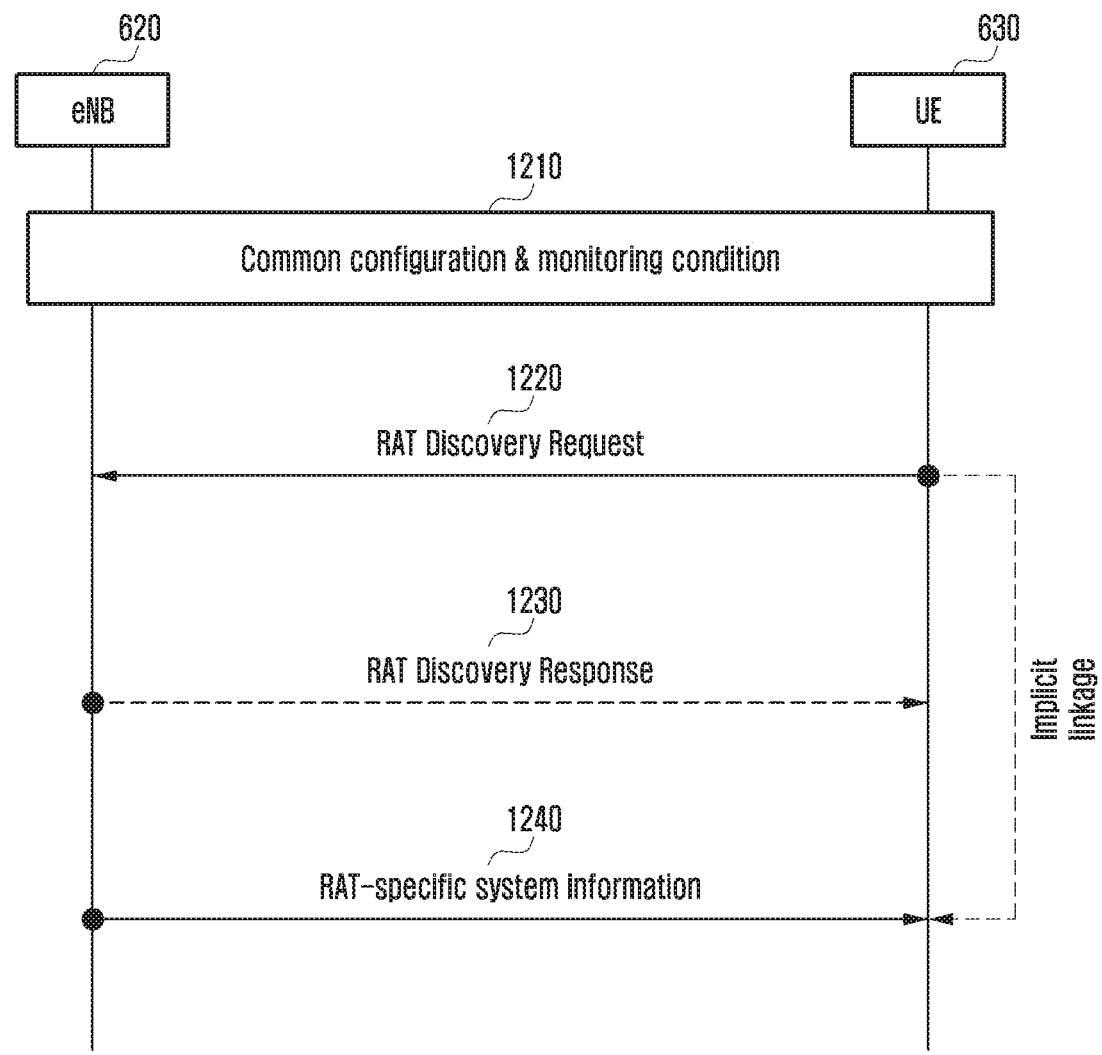

FIGS. 11 and 12 depict alternative implicit SI information transmission methods. At step 1110 or 1210, the eNB 620 may transmit the common configuration message including CDCH configuration information to the UE 630 and, upon receipt of the common configuration message, the UE 630 may monitor whether a condition for transmitting an RAT discovery request signal is fulfilled. If the condition is fulfilled, the UE 630 may transmit a RAT discovery request message to the eNB 620 at step 1120 or 1220.

In response to the RAT discovery request message from the UE 630, the eNB 620 may transmit to the UE 630 an RAT discovery response message and the SI related to the requested RAT at different timings. That is, the eNB 620 may transmit to the UE 630 the RAT discovery response message at step 1130 or 1230 and the SI related to the RAT requested by the UE 630 at step 1140 or 1240. The transmission position of the RAT-specific SI may be predetermined or determined depending on the position at which the RAT discovery response message is received as exemplified in FIG. 11 or the position at which the RAT discovery request message is transmitted as shown in FIG. 12. In the embodiment of FIG. 12, the step of transmitting the RAT discovery response message may be omitted or delayed to the next time point.

Figure 13:
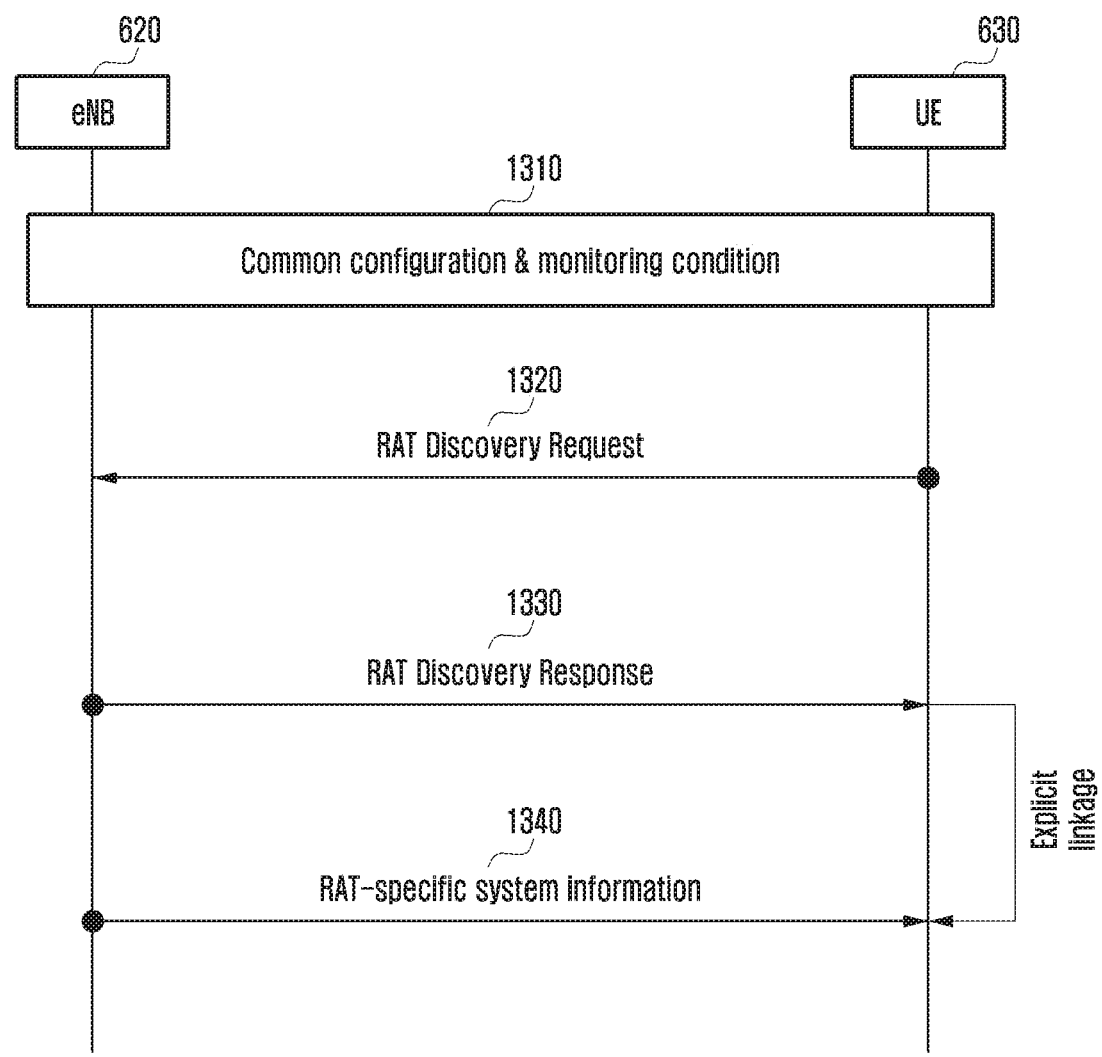

FIG. 13 depicts an exemplary explicit SI information transmission method. At step 1310, the eNB 620 may transmit the common configuration message including CDCH configuration information to the UE 630 and, upon receipt of the common configuration message, the UE 630 may monitor whether a condition for transmitting an RAT discovery request signal is fulfilled. If the condition is fulfilled, the UE 630 may transmit an RAT discovery request message to the eNB 620 at step 1320.

In response to the RAT discovery request message from the UE 630, the eNB 620 may transmit to the UE 630 an RAT discovery response message and the SI related to the RAT requested by the UE 620 at different timings. That is, the eNB 620 may transmit to the UE 630 the RAT discovery response message at step 1330 and the SI related to the RAT requested by the UE 630 at step 1340. The transmission position of the RAT-specific SI may be designated by the eNB 620 by means of the RAT discovery response message or indicated by a UE-specific control channel indicated by a UE-specific indicator included in the RAT discovery response message.

Figure 14:
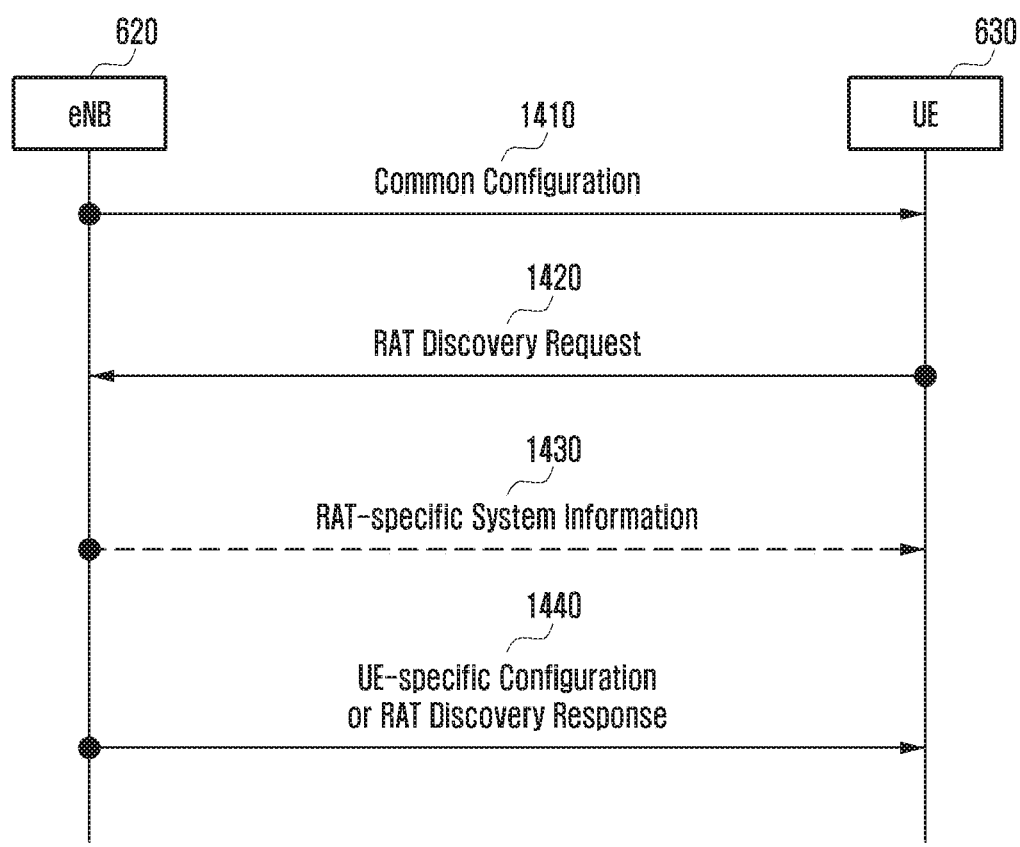

FIG. 14 depicts an exemplary UE-specific configuration information transmission method. At step 1410, the eNB 620 may transmit to the UE 630 the common system information or RAT specific control channel (when accessing a specific RAT) information including common configuration information. At step 1420, the UE 630 may transmit the RAT discovery request message to the eNB 620 on common RAT resources. At step 1430, the eNB 620 may transmit the system information (SI) related to the RAT configuration in response to the request from the UE 630 through a broadcast channel or a UE-specific channel allocated to the UE 630. At step 1440, the eNB 620 may transmit to the UE 630 the UE-specific configuration information for use in RAT access and transmission/reception or an RAT discovery response message including the configuration information. According to an embodiment of the present invention, if the common configuration information includes the resource allocation information for use in receiving per-RAT UE-specific configuration or RAT discovery response message, the RAT-specific SI transmission or reception step may be omitted.

The eNB 620 may transmit per-UE configuration information to the UE 630 in the random access procedure.

Figure 15:
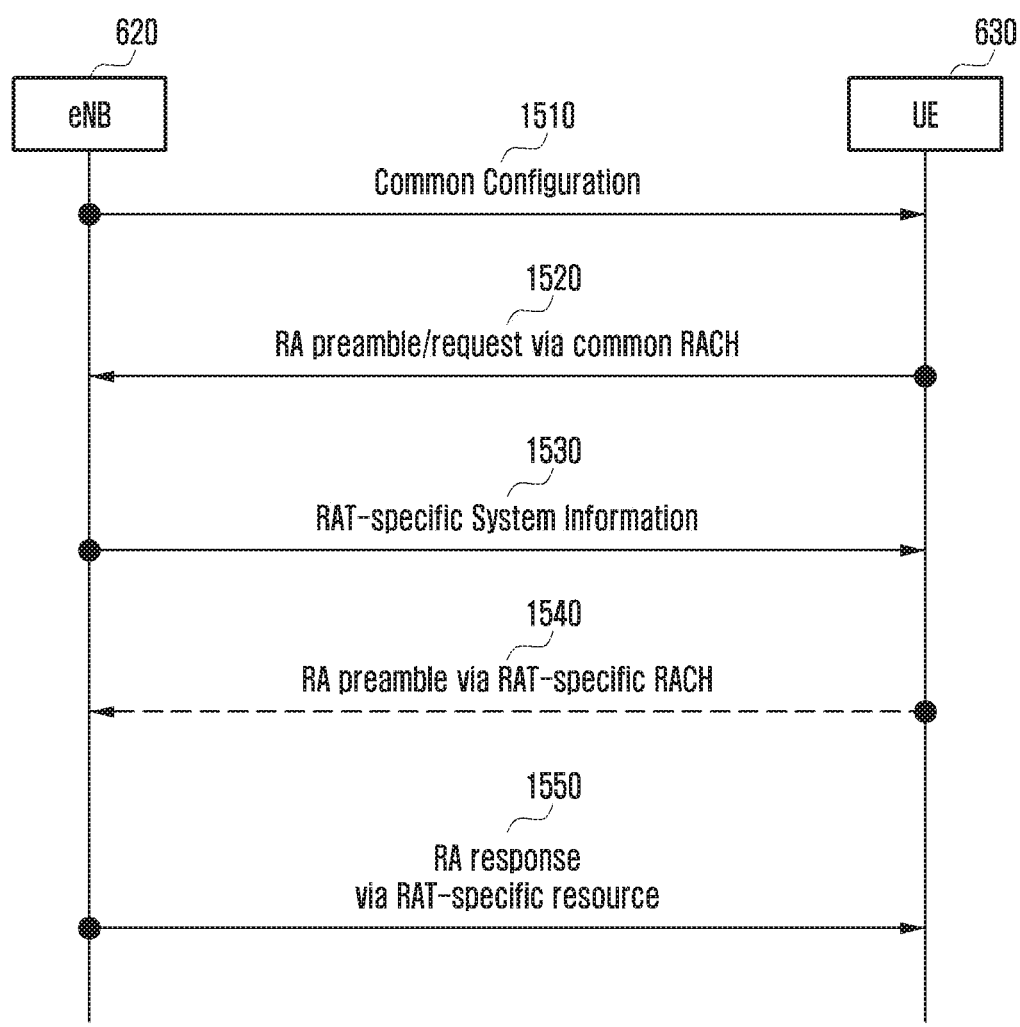

In reference to FIG. 15, it may be possible to simplify the random access (RA) procedure for specific RAT access using the RA preamble being transmitted by the UE 630 and the RA response being transmitted by the eNB 620. That is, at step 1510, the eNB 620 may transmit to the UE 630 the common configuration information by means of the common system information or RAT-specific control channel (when accessing a specific RAT). At step 1520, the UE 630 may transmit a common RA preamble through a common RA channel (common RACH) identified by applying the common configuration. Upon receipt of the RA preamble, the eNB 620 may transmit to the UE 630 an RA response message on the RAT-specific resources at step 1550. If the frequency environments of the common resources and RAT-specific resources are different from each other, the UE 630 that has received the RAT-specific SI additionally may further transmit the RA preamble to the eNB 620 through the RAT-specific RACH at step 1540. At step 1530, the eNB 620 may transmit to the UE 630 the SI related to RAT configuration in response to the request from the UE 630.

In order for the UE 630 to distinguish the RAT-specific RA response message transmitted by the eNB 620, the UE has to have a capability of computing RAT-specific RA-RNTI in association with the RA preamble transmitted/received through common resource or CDCH. The legacy RA-RNTI may be computed as in equation (1):

$$RA\text{-}RNTI = 1 + t\_id + 10 * f\_id \qquad \text{[Equation 1]}$$

where t_id denotes RACH resource identified on the time axis, and f_id denotes RACH resource identified on the frequency axis. The f_id is configured only in TDD, and f_id is set to 0 in FDD. Since the RACH resource is configured every subframe, the t_id corresponds to the subframe index. In LTE, the t_id may correspond to one of 10 subframes, i.e., subframes 0 to 9, constituting a frame. That is, in the legacy system, the RA-RNTI is determined by an index of the RACH resource for use in transmitting the RA preamble.

In the present invention, however, the common resources for the RATs and RAT-specific resources may be configured very differently. Since the configuration of legacy RA preamble transmission resources, i.e., RACH resources, may be understood differently depending on RAT, the RA-specific RA-RNTI may be determined based on a) a variable provided by the UE 630 explicitly for determining RA-RNTI or b) an equation for converting the RA-RNTI obtained through the common RA procedure to the RA-RNTI for use in the RAT-specific RA procedure.

Examples of a) may include a-1) the UE 630 transmits the RA request message including the random value selected in a predetermined range based on the common configuration information, a-2) the UE 630 transmits the RA request message including a combination of an RAT-specific variable (e.g., configured as prime number) provided in the common configuration information and a random value, and a-3) the UE 630 transmits the random preamble selected from the RAT-specific RA preamble group provided in the common configuration information.

Examples of b) may include b-1) the UE 630 compares the common RA configuration and RAT-specific RA configuration and selects the RACH resource used in the most recent RAT-specific RA procedure corresponding to the time point when it was transmitted actually on the common RACH to determine the RA-RNTI based on the index of the selected RACH resource and b-2) the UE 630 compares the common RA configuration and RAT-specific RA configuration and determines the RA-RNTI based on the logical resource index in the RAT-specific RA corresponding to the logical resource index transmitted on the common RACH in the logical RACH resource order (e.g., time, frequency, and time-frequency). In the case of b-2), if the common RA configuration indicates 10 subframes and 8 frequency resource blocks (RBs), if the RA preamble is transmitted in the second frame, and if the RAT-specific RA configuration indicates 3 subframes and 4 frequency RBs, the t_id f_id, or t_f_id per RAT may be determined by equations (2) and (3).

$$\text{RAT}\_t\_id = \text{Common}\_t\_id \times [\text{Max\_common\_subframe}]/[\text{Max\_RAT\_subframe}] = \text{Common}\_t\_id \times 10/3$$

$$\text{RAT}\_f\_id = \text{Common}\_f\_id \times [\text{Max\_common\_RBs}]/[\text{Max\_RAT\_RBs}] = \text{Common}\_f\_id \times 8/4$$

$$\text{RAT}\_t\_f\_id = \text{Common}\_t\_f\_id \times \{[\text{Max\_common\_subframe}] \times [\text{Max\_common\_RBs}]\}/\{[\text{Max\_RAT\_subframe}] \times [\text{Max\_RAT\_RBs}]\} = \text{Common}\_t\_f\_id \times \{10 \times 8\}/\{3 \times 4\} \quad \text{Equation 2}$$

$$\text{RAT}\_t\_id = \{[\text{frame\_index}] \times [\text{Max\_common\_subframe}] + \text{Common}\_t\_id\} \bmod [\text{Max\_RAT\_subframe}] = \{2 \times 10 + \text{Common}\_t\_id\} \bmod 3$$

$$\text{RAT}\_f\_id = \{\text{Common}\_f\_id\} \bmod [\text{Max\_RAT\_RBs}] = \{\text{Common}\_f\_id\} \bmod 4$$

$$\text{RAT}\_t\_f\_id = \{[\text{frame\_index}] \times \{[\text{Max\_common\_subframe}] \times [\text{Max\_common\_RBs}]\} + \text{Common}\_t\_id \times \text{Common}\_f\_id\} \bmod \{[\text{Max\_RAT\_subframe}] \times [\text{Max\_RAT\_RBs}]\} = \{2 \times 10 \times 8 + \text{Common}\_t\_id\} \bmod \{3 \times 4\} \quad \text{Equation 3}$$

Figure 16A:
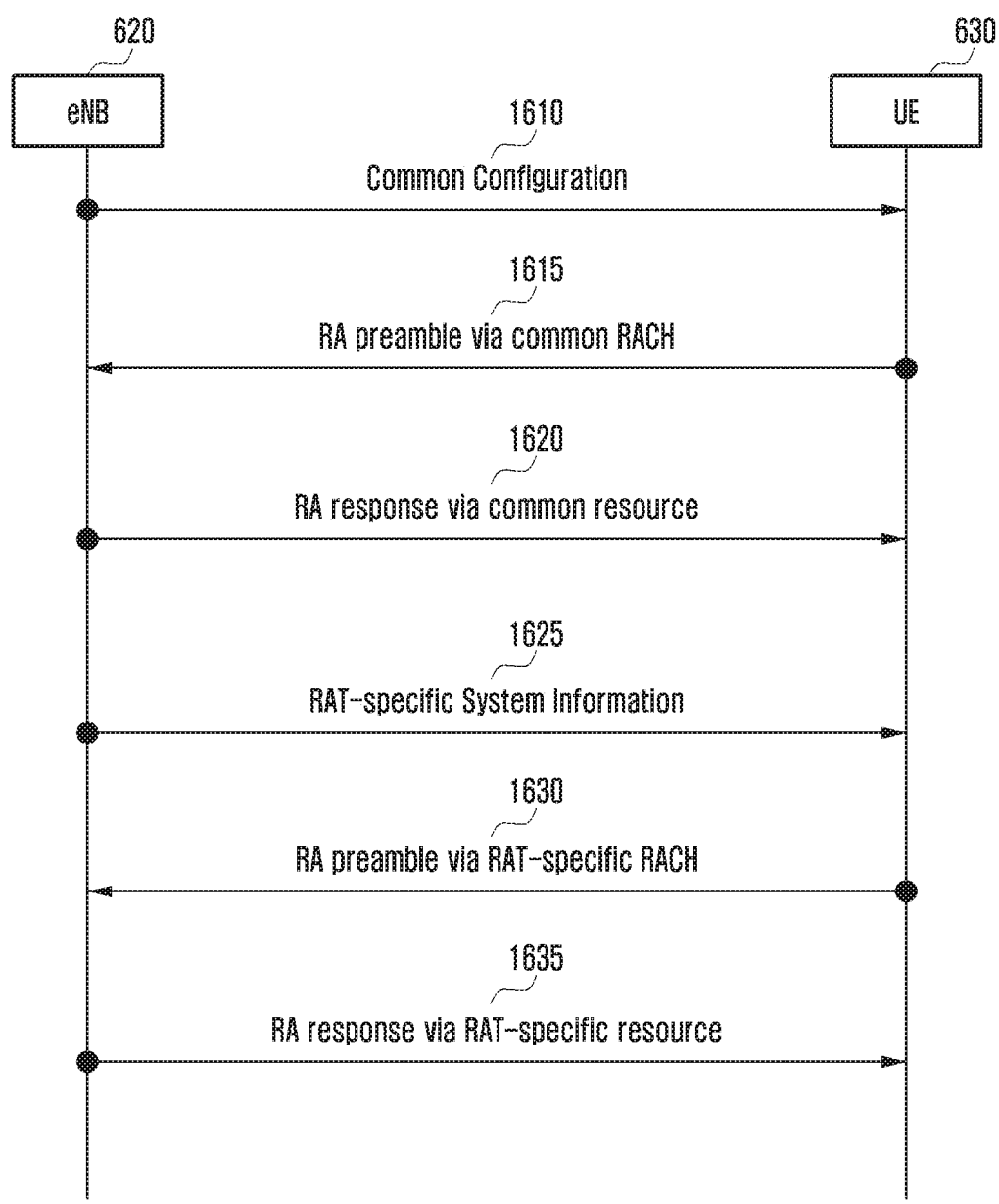
Figure 16B:
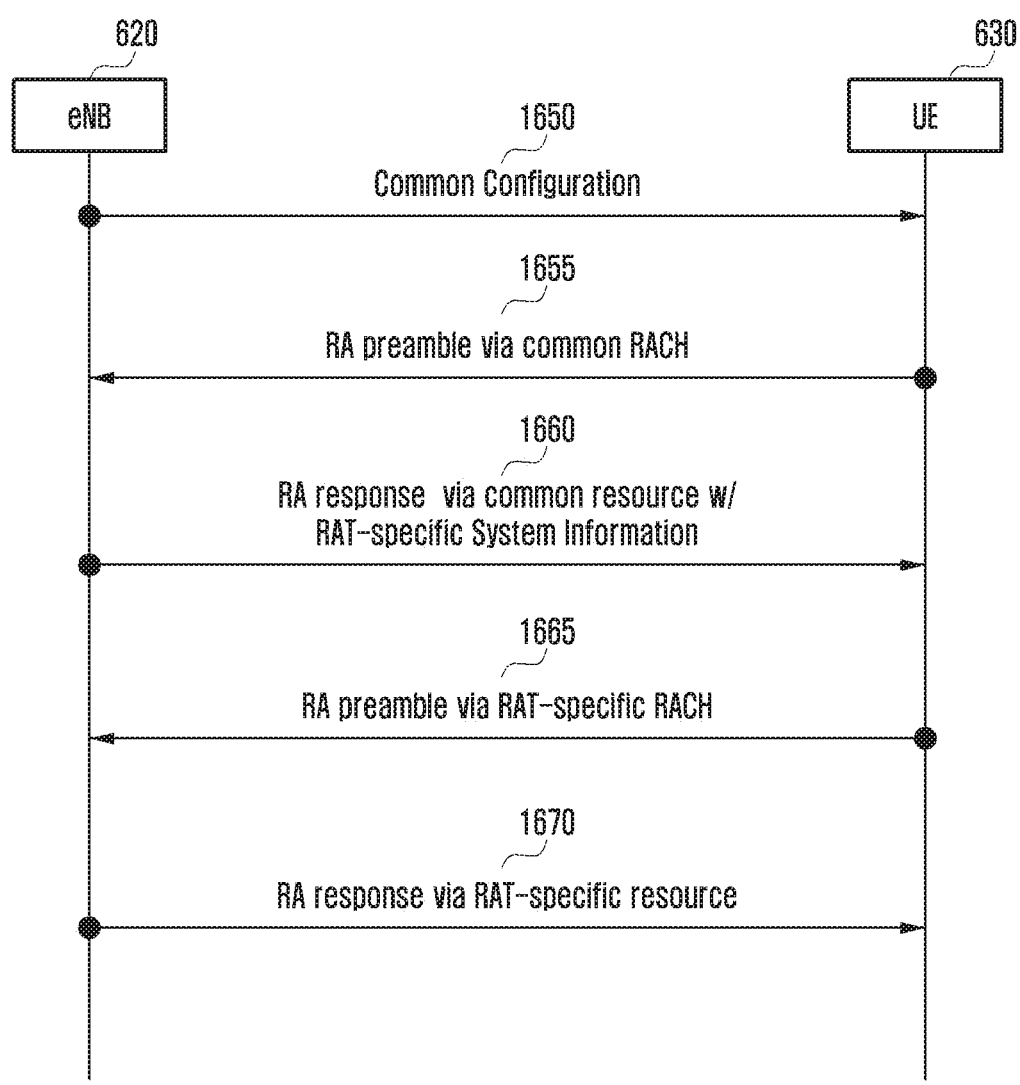
Figure 17:
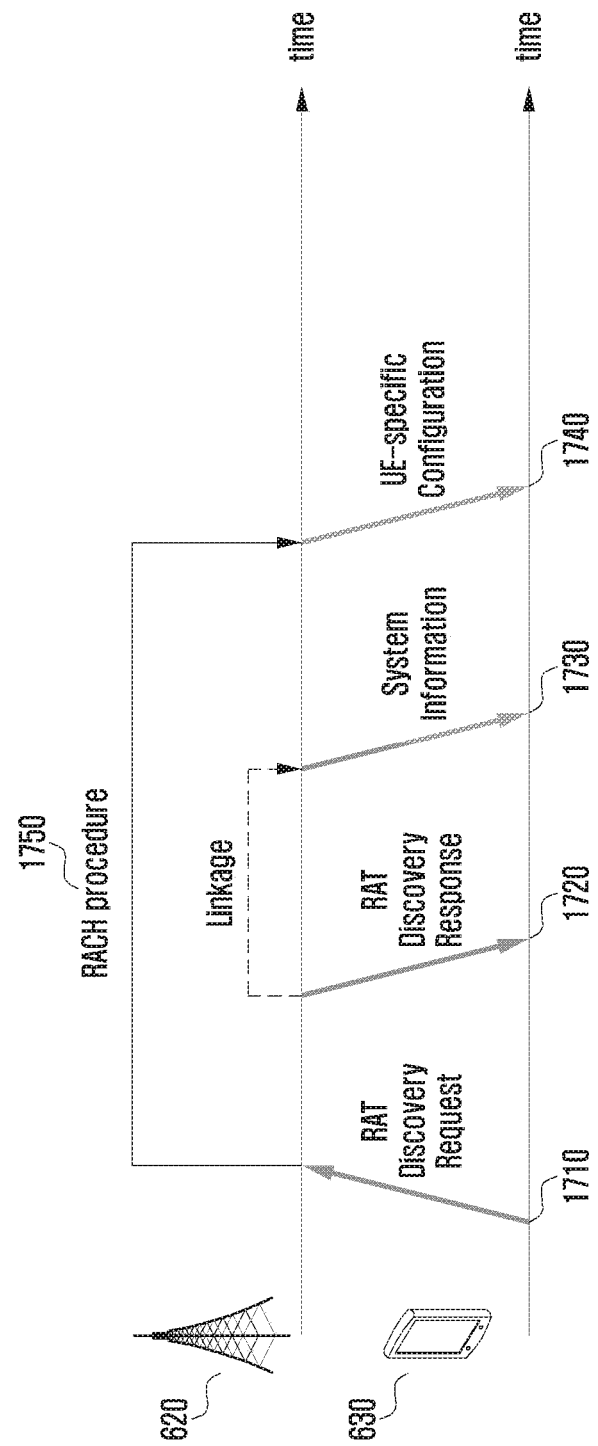

In reference to FIGS. 16A and 16B, if the legacy procedure is extended, the common RA procedure and RAT-specific RA procedure, respectively, should be performed.

In FIG. 16A, the UE 630 and the eNB 620 may complete the RA preamble/response procedure on the common resources through steps 1610 to 1620. Afterward, the UE 630 receives the RAT-specific SI transmitted by the eNB 620 through a separate procedure at step 1625 to check the RAT-specific RA resource configuration and, if an RA procedure initiation condition is fulfilled in the corresponding RAT, performs the RA preamble/response procedure on the RAT-specific RACH/resource at steps 1630 and 1635.

FIG. 16B differs from FIG. 16A in that the eNB 620 transmits to the UE 630 the RAT-specific SI using the RAT response message on the common resources. That is, the RA preamble/response procedure is completed on the common resources through steps 1650 to 1660. In this case, the eNB 620 may transmit to the UE 630 the RAT response message and the RAT-specific SI together. The UE 630 may check the RAT-specific RA resource configuration and, if the RA procedure initiation condition is fulfilled in the corresponding RAT, perform the RA preamble/response procedure on the RAT-specific RACH/resource at steps 1665 and 1670.

Returning to FIG. 17, the RAT discovery request/response procedure and common RA/RAT-specific RA connection procedure are performed in a combined manner. That is, the RAT-specific resource information acquisition procedure of the UE 630 (as denoted by reference numbers 1710, 1720, and 1730) and the UE-specific configuration procedure for UE-specific network access (as denoted by reference numbers 1710 and 1740; 1750) may be initiated by one RAT discovery request message.

Figure 18:
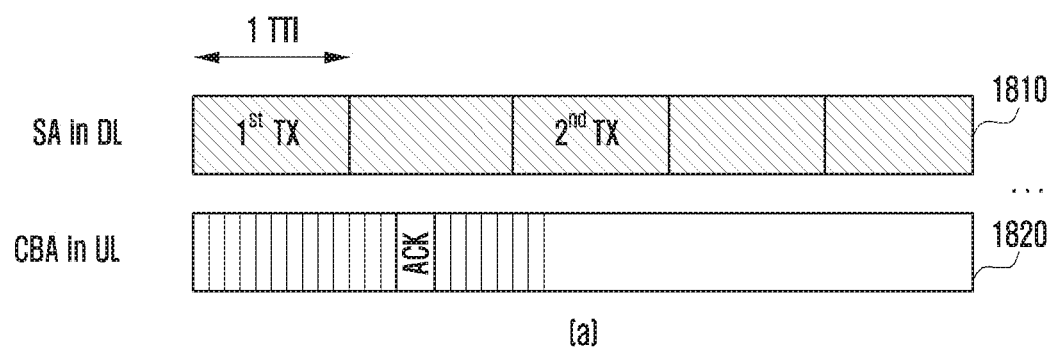
FIG. 18 is a diagram illustrating a low latency communication service method according to an embodiment of the present invention.
Figure 18:
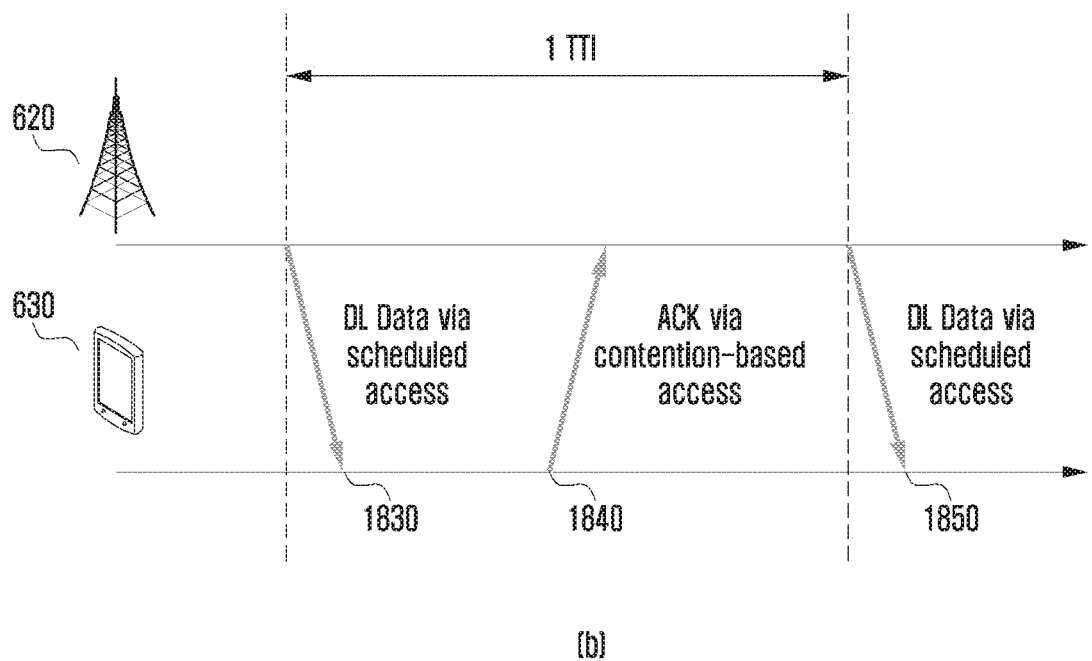

FIG. 18 is a diagram illustrating a low latency communication service method according to an embodiment of the present invention.

A 5G communication system is designed to enable low latency communication services. The requirements for low latency communication services may be fulfilled with supportability of various resource access schemes. As exemplified in part (a) of FIG. 18, a frame may be configured with SA in downlink 1810 and CBA in uplink 1820. In this case, the UE 630 may receive downlink data at step 1830 as exemplified in part (b) of FIG. 18. Here, the UE 630 may transmit an acknowledgement (ACK) message corresponding to the downlink data at step 1840 without explicit resource allocation from the eNB 620 for uplink transmission 1820. Accordingly, the UE 630 and the eNB 620 may perform the next transmission quickly at step 1850. In the drawing, the transmission time interval (TTI) is a unit of transmission period.

The UE 630 may perform transmission in the resource selected from an uplink contention resource pool configured by the eNB 620 in a contention-based mode without any instruction from the eNB 620, and the eNB 620 has to identify the UE 630 that has performed transmission. In order for the eNB 620 to identify the UE 630 that has transmitted an HARQ-ACK/NACK, the UE 630 may notify to the eNB 620 according to at least one of the following operations:

a) Transmit the HARQ-ACK/NACK scrambled with the same information as that which is applied to the corresponding data (e.g., C-RNTI)

b) Transmit the index of the DL subframe conveying the corresponding data along with the HARQ-ACK/NACK c) Transmit the HARQ-ACK/NACK at a position of time-frequency resources mapped with UE identification information (e.g., UE ID and C-RNTI)

It may also be necessary to design the 5G communication system in a manner unlike that of the legacy scheduler in consideration of new metrics such as latency. It may also be necessary to consider a case where the resource regions are divided by class of the UE.

Figure 19A:
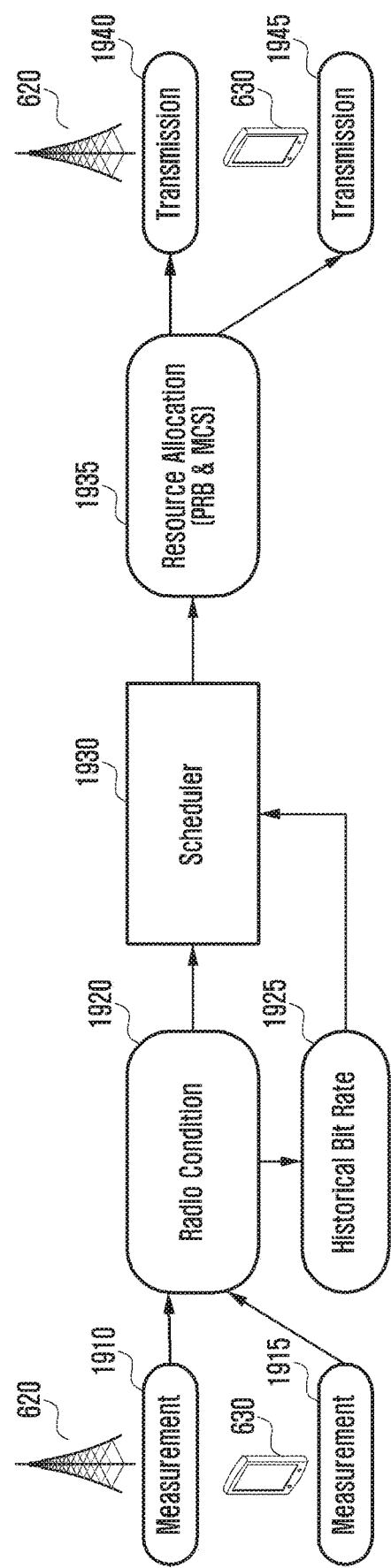
FIGS. 19A to 19C are diagrams for explaining a scheduling procedure according to an embodiment of the present invention.
Figure 19B:
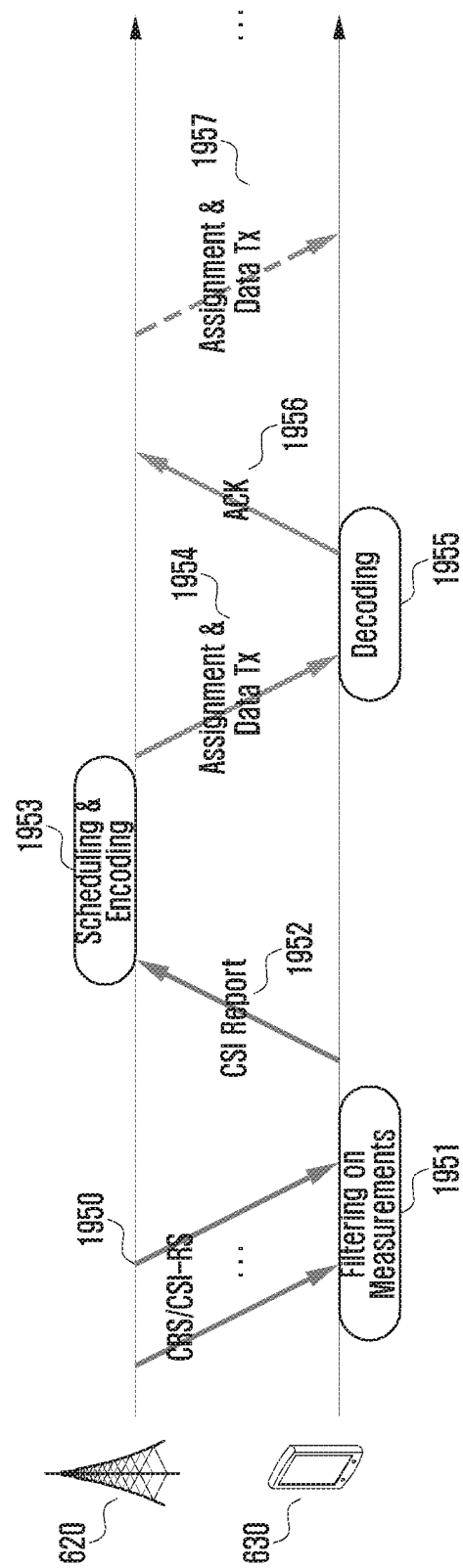
Figure 19C:
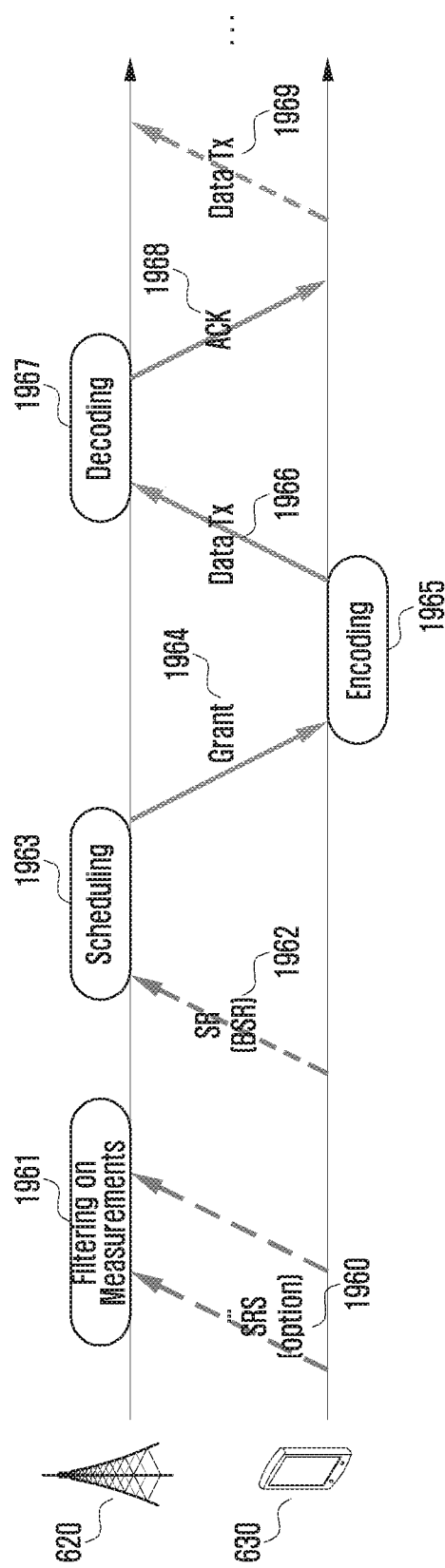

FIGS. 19A to 19C are diagrams for explaining a scheduling procedure according to an embodiment of the present invention.

In reference to FIGS. 19A to 19C, the eNB 620 may collect measurement results 1910, 1915, 1950, 1951, 1952, 1953, 1960, 1961, and 1962 of the eNB 620 or the UE 630 and calculate a proportional fairness metric based on the current radio condition 1920 and stored transmission bit rate 1925 such that the scheduler 1930 determines the resource amount (PRB) and modulation & coding scheme (MCS) index 1935 based on the proportional fairness matric as denoted by reference number 1953 and 1963. As a consequence, the eNB 620 or the UE 630 may perform transmissions 1940, 1945, 1954, 1955, 1956, 1957, 1964, 1965, 1966, 1967, 1968, and 1969.

The uplink and downlink procedures may be performed as exemplified in parts of FIGS. 19B and 19C.

Figure 20:
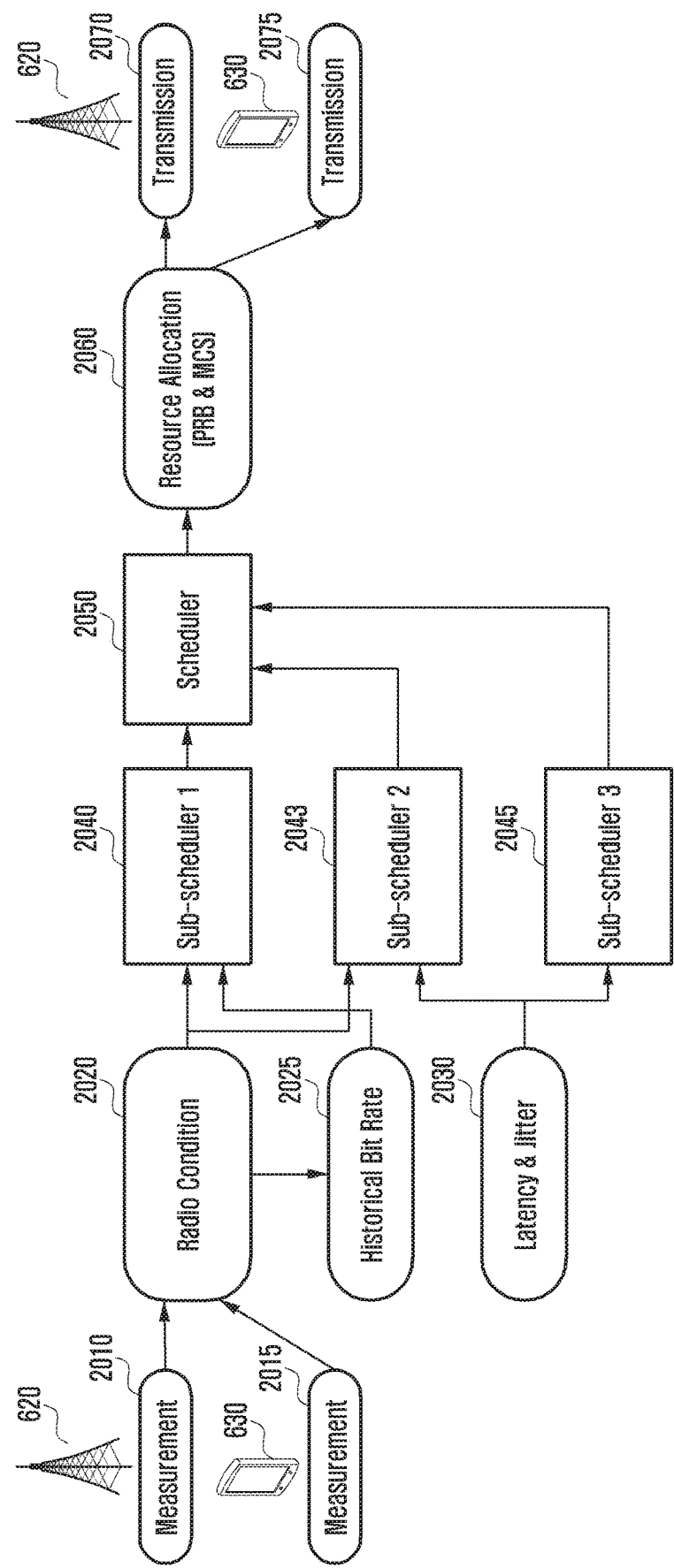
FIG. 20 is a diagram illustrating a scheduling procedure according to an embodiment of the present invention.
Figure 21:
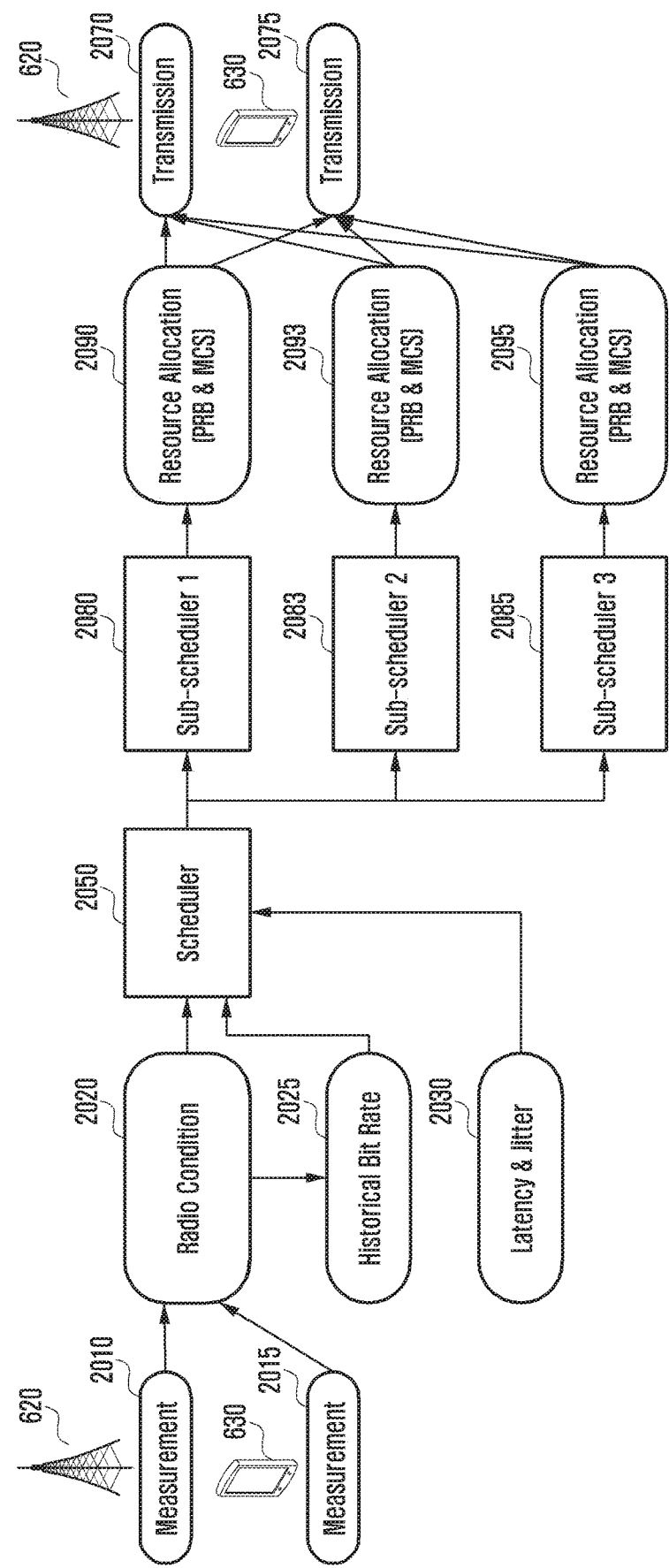
FIG. 21 is a diagram illustrating a scheduling procedure according to another embodiment of the present invention.

FIG. 20 is a diagram illustrating a scheduling procedure according to an embodiment of the present invention, and FIG. 21 is a diagram illustrating a scheduling procedure according to another embodiment of the present invention.

In reference to FIGS. 20 and 21, the scheduler may be modified as exemplified in case of taking further latency or jitter 2030 into consideration.

In reference to FIG. 20, the UE 630 may be allocated resources by appropriate sub-schedulers 2040, 2043, and 2045 according to traffic or service type. The sub-schedulers 2040, 2043, and 2045 are changed according to a combination of many metrics. The calculation results of the sub-schedulers 2040, 2043, and 2045 are collected and adjusted by the scheduler 2050. The final resource allocation and MCS determination operations 2060 may be performed by the scheduler 2050. Other components depicted in this drawing but not described operate in similar manners to that described with reference to FIGS. 19A to 19C.

In reference to FIG. 21, the scheduler 2050 may determine service-specific resource pools and then the service-specific sub-schedulers 2080, 2083, and 2085 may perform per-UE resource allocations and MCS determinations 2090, 2093, and 2095. Other components depicted in this drawing but not described operate in similar manners to that described with reference to FIGS. 19A to 19C.

The two types of schedulers exemplified in FIGS. 20 and 21 are necessary for the eNB 620 or the network to provide the UE 630 with various services. It may be necessary to report metrics such as channel measurement result, required delay, and power consumption for the operations of the purpose-specific sub-schedulers 2040, 2043, 2045, 2080, 2083, and 2085. Accordingly, the eNB 620 or the network may configure the type of control signal for report by slice, bearer, or PDU during the initial access or RRC establishment procedure of the UE 630. Although the control signal is transmitted for the same physical layer report, the actual information may be changed depending on the configured control signal type. The UE 630 may configure a report control signal according to the report type configured in the initial access procedure and transmit it to the eNB 620, and the eNB 620 may operate based on the type configured before converting the report type to the RRC reconfiguration. Since the UE 630 may receive multiple services, it may be necessary for the UE 630 to transmit a scheduler ID for identifying the scheduler 2050 in the report or for the reporting resources to be configured per scheduler ID.

Meanwhile, in order to provide a flexible and dynamic frame structure for 5G communication, the present invention proposes a method for configuring a frame by combining the basic subframes as a smallest building block according to a modularization principle.

Figure 22:
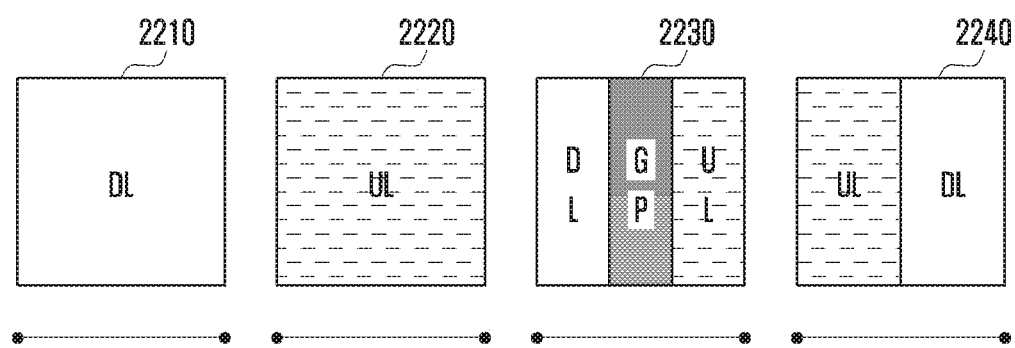
FIG. 22 is a diagram illustrating subframe structures according to an embodiment of the present invention.
Figure 23:
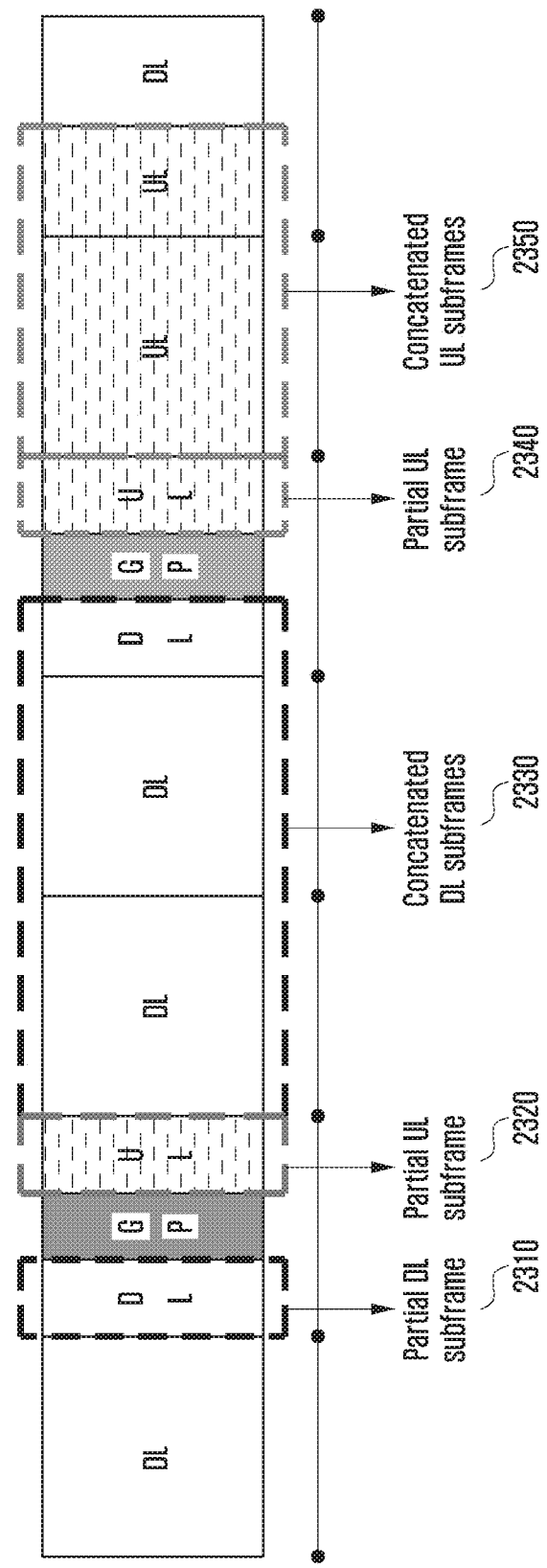
FIG. 23 is a diagram illustrating a frame structure according to an embodiment of the present invention.

FIG. 22 is a diagram illustrating subframe structures according to an embodiment of the present invention, and FIG. 23 is a diagram illustrating a frame structure according to an embodiment of the present invention.

In reference to FIG. 22, a frame may include 4 different types of subframe. The four types of subframe are downlink (DL) subframe 2210, uplink (UL) subframe 2220, downlink-guard period-uplink (DL-GP-UL) subframe 2230, and UL-DL (or DL-UL) subframe 2240. The GP in the DL-GP-UL subframe 2230 is required to secure extra margin for timing advance, which is used to achieve UL synchronization with the eNB when the eNB switches from DL to UL. The UL-DL subframe may need a very short RF transition time (a few or a few dozen us).

In reference to FIG. 23, a frame is composed of the four types of subframe 2210, 2220, 2230, and 2240 exemplified in FIG. 22. The eNB may allocate to the UE resources of multiple subframes that are grouped as one resource as denoted by reference numbers 2330 and 2350 as well as resources by subframe regardless of the type of subframe 2210, 2220, 2230, and 2240. For example, it may be possible to allocate to the UE the DL part of the DL-GP-UL subframe 2230 as a partial DL subframe 2310 and the UL part of the of the DL-GP-UL subframe 2230 as a partial UL subframe 2320 and 2340. It may also be possible to allocate to the UE a concatenated DL subframe 2230 which is composed of two DL subframes 2210 and a DL part of the DL-GP-UL subframe 2230. It may also be possible to allocate to the UE a concatenated UL subframe 2350 which is composed of one UL subframe 2220 and the UP part of the UL-DL subframe 2240. The information on the concatenated subframes 2330 and 2350 may be included in a control signal for DL assignment or UL grant. In the case where the subframes with different lengths are concatenated, the physical layer may notify the MAC layer of the format of the concatenated subframes 2330 and 2350 or the number of symbols/bits available in the concatenated subframes to help scheduling.

However, this method of using a flexible frame structure may cause a problem of significant cross talk from neighboring eNBs. The cross talk phenomenon may cause problems in both the cases of collision between the downlink of the serving eNB and the uplink of a neighboring eNB and collision between the uplink of the serving eNB and the downlink of the neighboring eNB.

In particular, interference to a control signal may have a significant effect on the system. In this respect, the present invention proposes a minimized structure based flexible frame configuration method that is capable of minimizing interference to control signals. This method is referred to as atomic design for convenience of explanation. A downlink control signal may be used to transmit a scheduling assignment, a grant, and an ACK corresponding to uplink transmission. An uplink control signal may be used to transmit a scheduling request, a buffer status request, an ACK corresponding to downlink transmission, and a sounding reference signal (SRS).

FIGS. 24 to 32 are diagrams illustrating exemplary subframe configurations according to embodiments of the present invention.

In order to reduce interference to the control signal, a method for arranging the DL control signal and UL control signal at the fixed positions in a basic subframe or a method for placing a GP around the DL and UL control signal position may be considered to minimize interference. The atomic design structure is advantageous in terms of making it possible to use a control channel promptly at any necessary time because every subframe has the DL and UL control channels. For example, the eNB may calculate (schedule) the value n for transmitting the HARQ-ACK/NACK corresponding to the DL data transmitted at subframe k using a UL control channel (or piggybacking on a UL data channel) in subframe k+n and notify the UE of n using the DL control channel in the subframe k indicative of DL data transmission. Alternatively, the eNB may transmit a UL grant for UL data transmission of the UE in the DL control channel of subframe k along with n such that the UE transmits the UL data signal in subframe k+n. Alternatively, the eNB may schedule the UE to transmit HARQ-ACK/NACK corresponding to the UL data transmitted at subframe k in the DL control channel (or DL data channel by piggybacking thereon) of the subframe k+n and notify the UE of the scheduling result using a UL grant indicative of UL data transmission in subframe k or an RRC control signal.

Alternatively, the eNB may notify the UE of the resource allocations in multiple subframes at subframe k and then instruct cancelling/changing the allocated resource at subframe k+n. In this case, it may be possible to change the transmission timing, transmission scheme, physical layer time-frequency resource for transmission, and subframe structure. Alternatively, the eNB may notify the UE of the resource positions for UL signals such as SR, BSR, and SRS with a modular operation on system time (e.g., frame/subframe number) or explicitly and dynamically. According to an embodiment, for unconstrained change of an atomic subframe in addition to predetermined semi-static UL control signal allocation for system time through the normal RRC control, it may be possible a) to notify the UE of an additional offset at a timing configured through RRC signaling or SI, b) to cancel the closest specific UL control signal timing, or c) to change the closest specific UL control signal timing.

First, descriptions are made of the methods for placing the DL control signal and UL control signal at fixed positions in the basic subframe.

In reference to FIGS. 24 to 27, the DL control signal (DL cnt) and UL control signal (UL cnt) are fixed at the same time and/or frequency positions in every subframe. If such subframe structures are used among synchronized networks/eNBs, it may be possible to avoid inter-eNB or inter-UE interference at least on DL and UL control channels.

Figure 24:
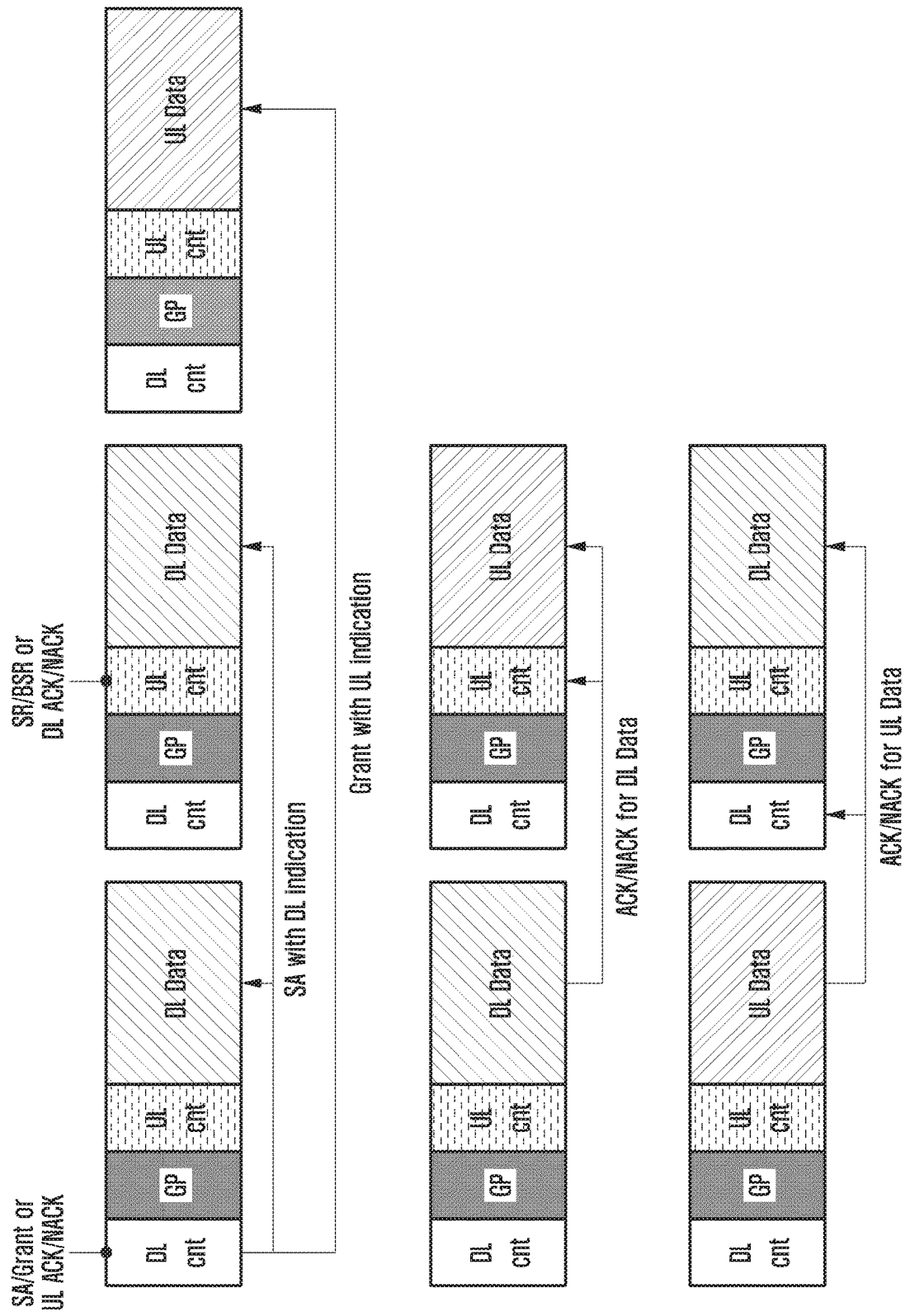
FIGS. 24 to 32 are diagrams illustrating exemplary subframe configurations according to embodiments of the present invention.

In reference to FIG. 24, every subframe is composed of DL control channel (DL cnt), gap (GP), UL control channel (UL cnt), and data arranged in sequence (DL cnt/GP/UL cnt/data. In this case, it is advantageous to process the control and data channel separately because the DL and UL control channels and data channel are separated in time. This method is also advantageous in terms of degree of freedom for the eNB to receive UL data anytime by allowing the UE to transmit HARQ-related variables such as UL data type and HARQ process ID through a UL control channel in advance, in an asynchronized HARQ operation. Alternatively, it may be possible to give priority to UL control channel transmission in the operation of transmitting UL control channel or data after UL LBT.

Figure 25:
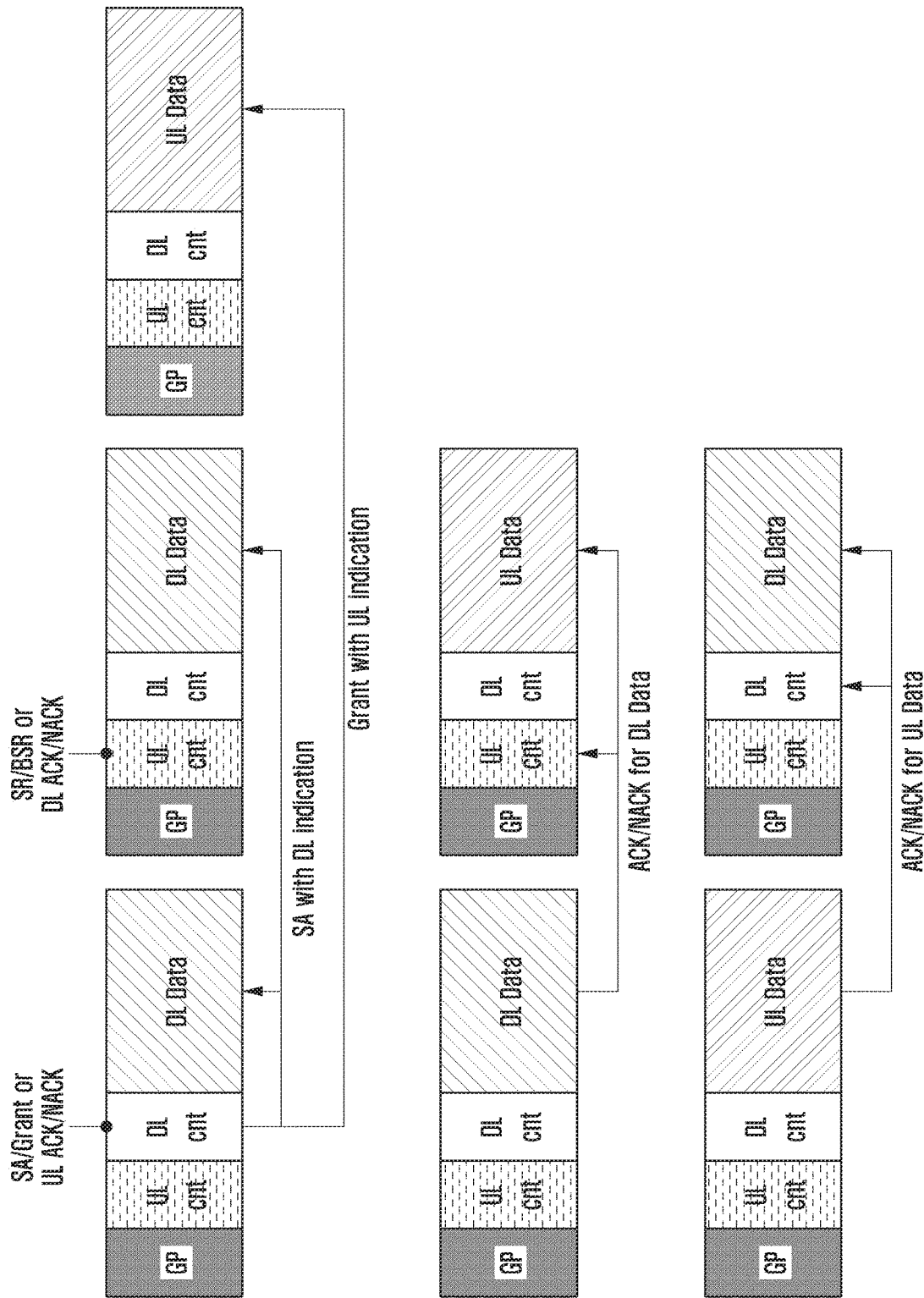

The subframe structure exemplified in FIG. 25 is characterized in that the UL cnt precedes the DL cnt, which makes it possible for the UE to transmit reference signals such as SRS and thus for the eNB to complete channel measurement quickly in addition to the advantage caused by putting the DL cnt and UL cnt together in comparison with the subframe structure exemplified in FIG. 24. In the TDD mode in which the same frequency is used for DL and UL, the eNB may determine MCS for DL or UL data based on the UL reference signal owing to the channel reciprocity characteristic. The eNB may apply the MCS to the data transmission of a subframe equal to the subframe receiving the UL reference signal (RS) or a nth subframe after the subframe receiving the UL RS when a processing delay is detected, according to the channel measurement result of the UL RS.

Figure 26:
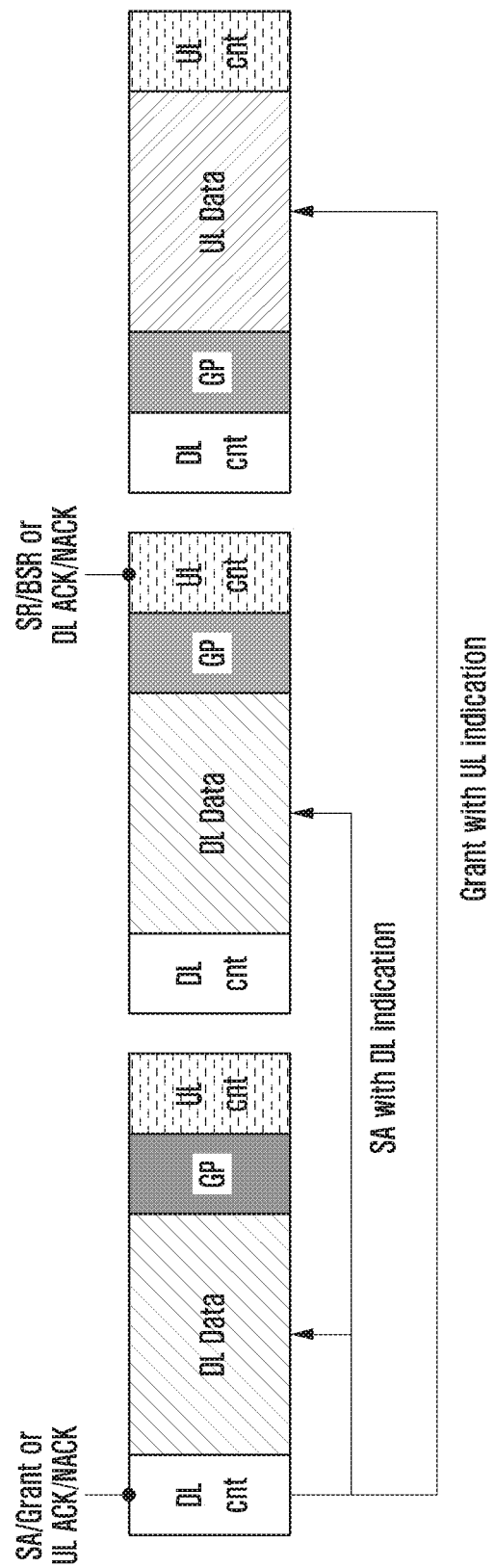

The subframe structure exemplified in FIG. 26 is characterized by putting the DL cnt and DL data together and the UL data and UL cnt together in comparison with the subframe structures exemplified in FIGS. 24 and 25. This subframe structure is useful in the case where it is necessary to transmit/receive data immediately after control channel transmission/reception.

Figure 27:
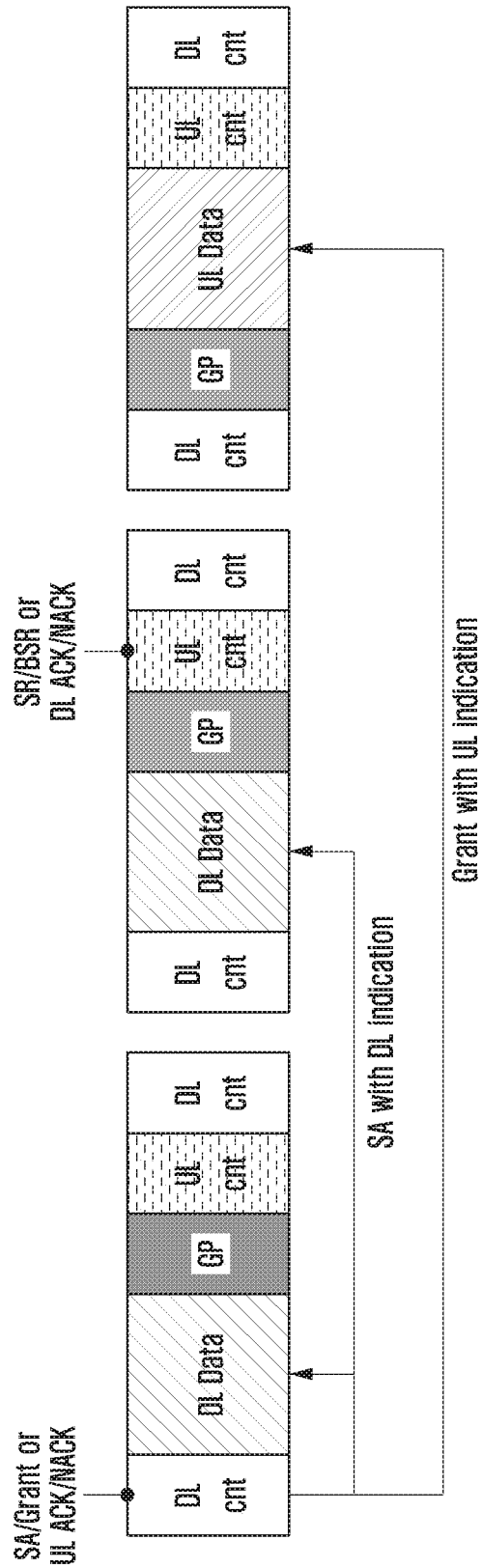

The subframe structure exemplified in FIG. 27 is identical with the subframe structure of FIG. 26 with the exception that a DL cnt is further added at the end of the subframe. This subframe structure is advantageous in terms of making it possible to transmit/receive the HARQ ACK/NACK corresponding to the UL data in the DL cnt arranged at the end of the same subframe.

Next, a description is made of a method for minimizing interference by arranging GP around the DL and UL control signal positions.

Figure 28:
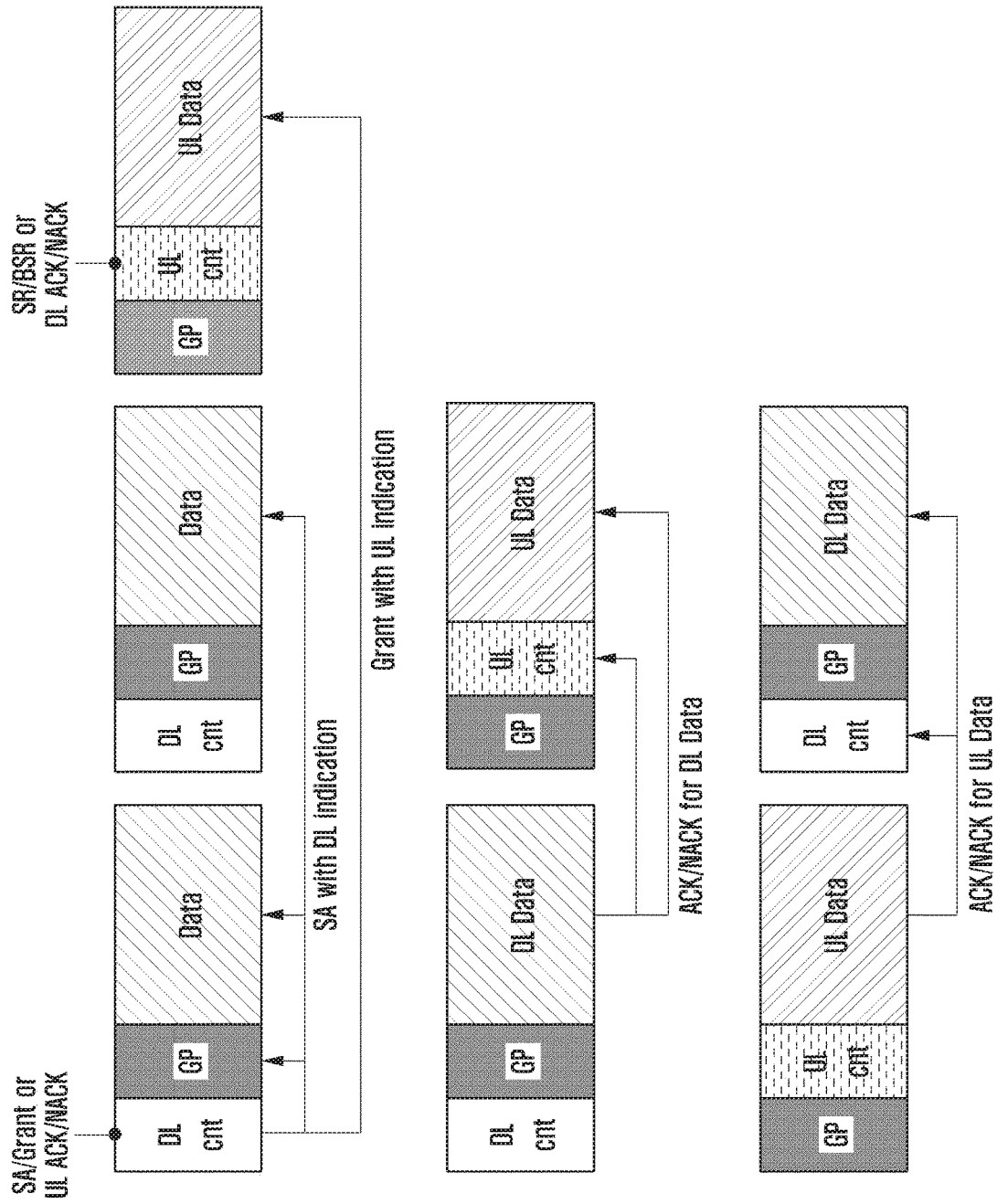
Figure 29:
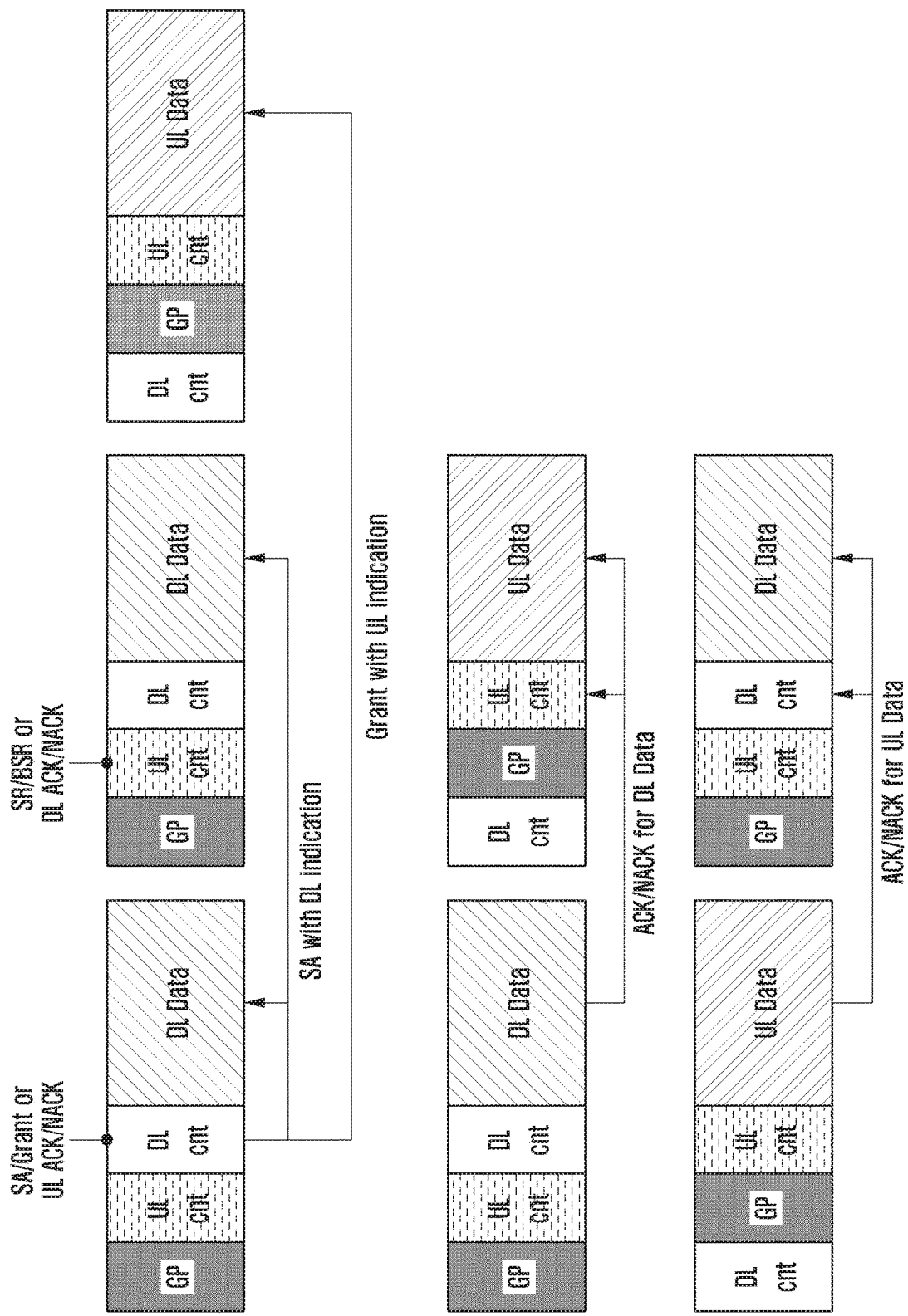
Figure 30:
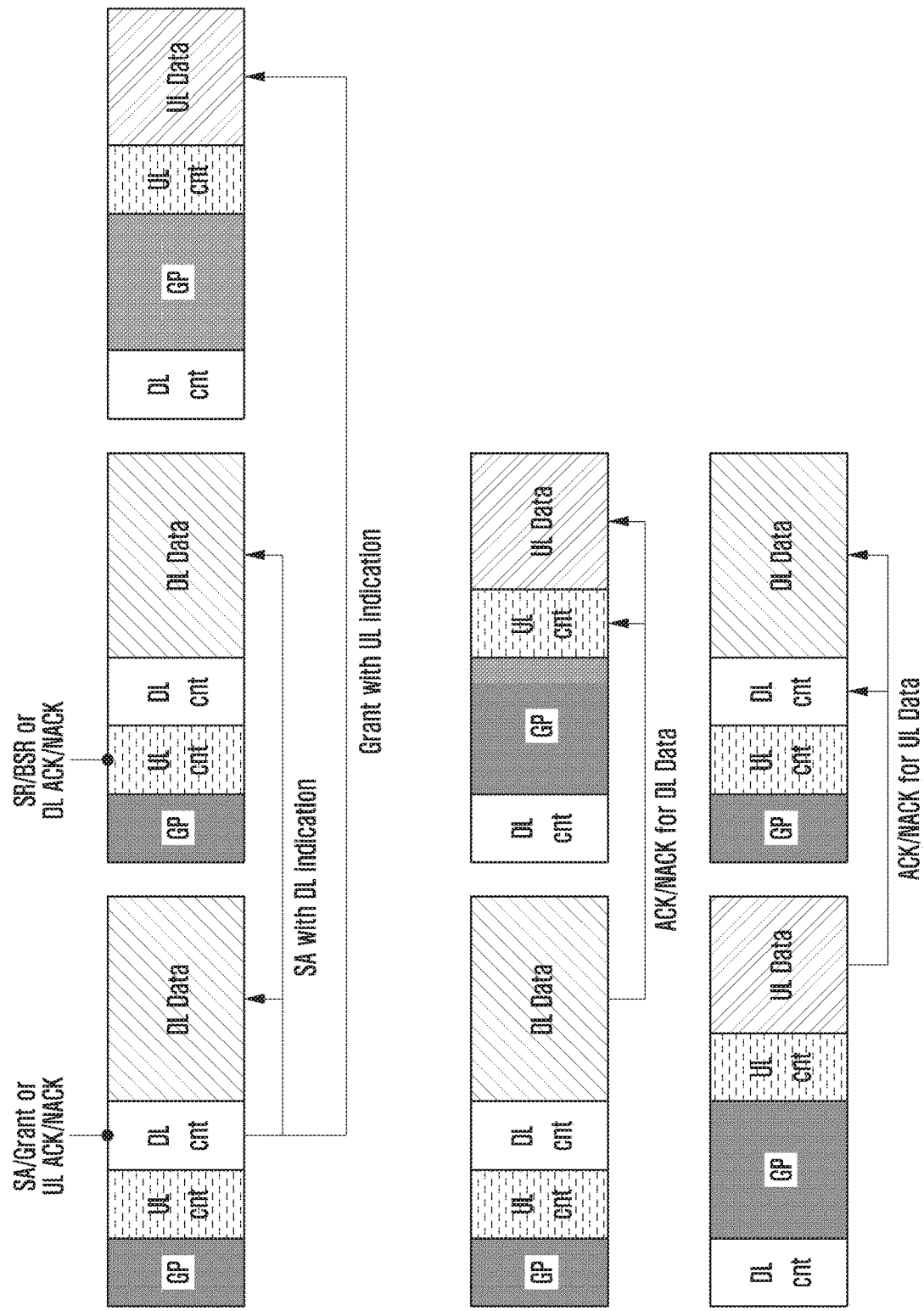

In reference to FIGS. 28 to 30, the DL control signal (DL cnt) and UL control signal (UL cnt) are not fixed at the same time and/or frequency positions in every subframe, but they are put together with a gap period (GP). If such subframe structures are used among synchronized networks/eNBs, it may be possible to reduce at least interference between DL and UL control channels. In such embodiments, however, the system has to notify the UE of the length of the GP explicitly or with an ID of a subframe set because the interference amount is adjusted according to the length of the GP. In a certain scenario to which other methods such as a receiving part interference cancellation or LBT is applicable, the eNB may notify the UE of the GP length set 0.

In reference to FIG. 28, the subframes are categorized into DL subframe and UL subframe. That is, a subframe may be configured in the form of DL cnt/GP/DL data or GP/UL cnt/UL data. This subframe configuration is characterized in that the control channel always precedes the data so as to make it possible to transmit channel measurement result and information for use in data transmission before data transmission.

The subframe structure of FIG. 29 is characterized in that the DL control channel (DL cnt)/UL control channel (UL cnt) is arranged along with an opposite direction (UL or DL) control channel thereafter at the beginning of each subframe in comparison with the subframe structure exemplified in FIG. 28. Here, the newly added control channel may be arranged with a GP to avoid interference between DL and UL.

In reference to FIG. 30, it may be possible to control the interference amount on an intended control channel by adjusting the length of the GP as described above.

Meanwhile, it may be possible to modify an atomic building block type slightly. That is, it may be possible to make a change to the control channel or GP in an atomic building block.

Figure 31:
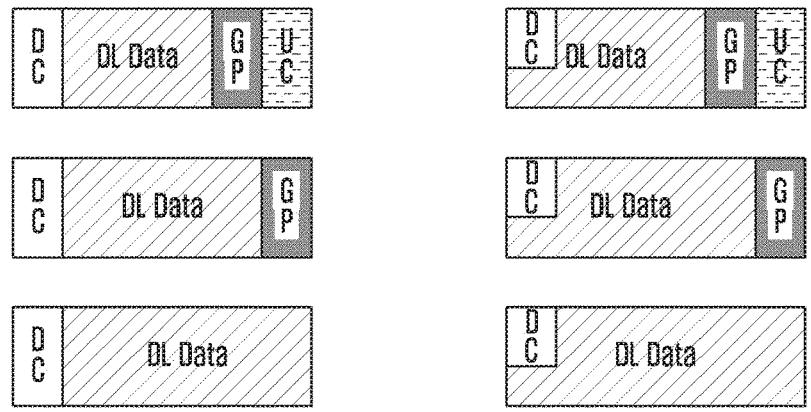
Figure 31:
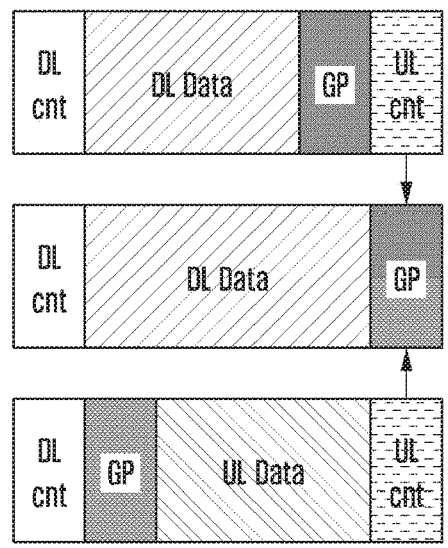
Figure 31:
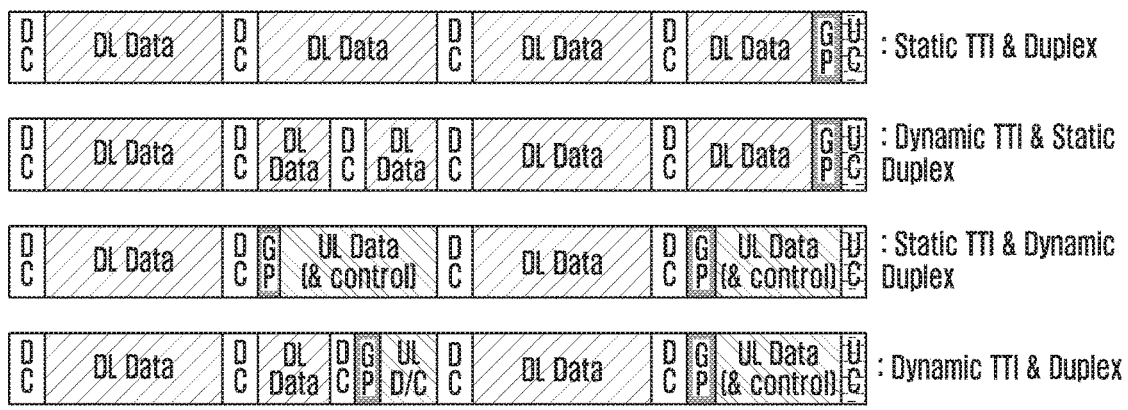

In reference to FIG. 31, it may be possible to delete the UL cnt, place the GP at the end of the subframe, or delete the GP too as exemplified in part (a) of FIG. 31. Although such a change is made, it is advantageous to cancel the interference of the UL cnt using the GP as exemplified in part (b) of FIG. 31. Part (a) of FIG. 31 also exemplifies a case of arranging the DL cnt at a part of rather than across the whole bandwidth.

It may also be possible to combine the atomic building blocks exemplified in parts (a) and (b) of FIG. 31 to derive various subframe structure as shown in part (c) of FIG. 31. In this case, it may be possible to have a fixed TTI and a fixed duplex mode 3110, a dynamic TTI and a fixed duplex mode 3120, a fixed TTI and a dynamic duplex mode 3130, or a dynamic TTI and a dynamic duplex mode 3140.

Here, it may be preferred, even though a dynamic TTI is configured, to operate the duplex mode in a semi-static manner, for mitigating cross talk interference in the data region. A description is made of the control signaling method for operating the dynamic TTI in reference to FIG. 32.

Figure 32:
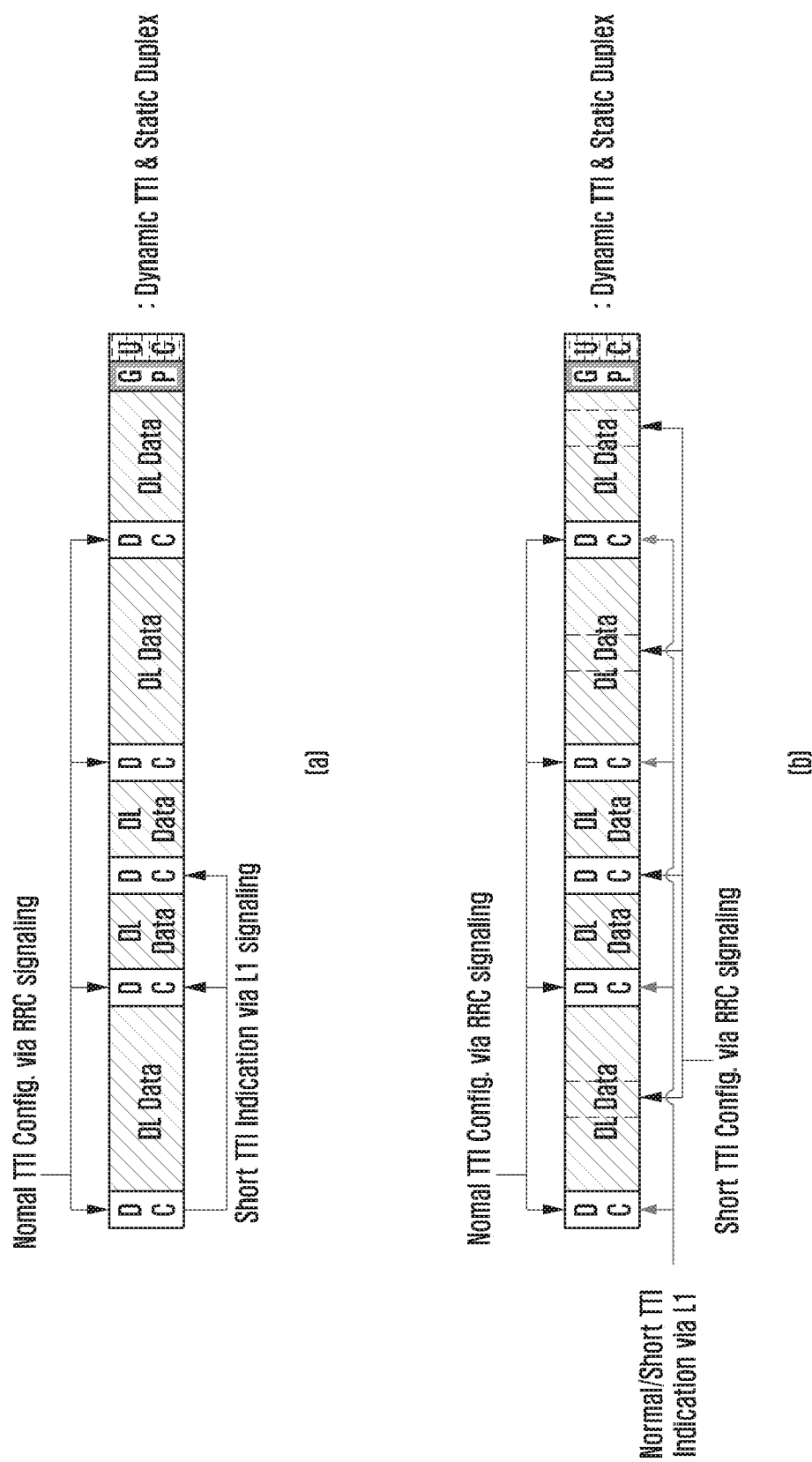

In reference to part (a) of FIG. 32, the eNB may notify the UE of a default TTI mode (normal TTI) through RRC signaling. In order to switch to a short TTI, the eNB may notify the UE of the use of the short TTI for subframe n+k in the next n subframe in advance through L1 (physical layer) signaling in the DL control channel of the normal TTI.

In reference to part (b) of FIG. 32, it may be possible to notify the UE of the potential position of at least one TTI mode through RRC signaling. Here, the eNB may notify the UE of the normal TTI configuration and short TTI configuration through RRC signaling. The TTI mode may be determined by 1) notifying the UE of the TTI mode for subframe n+k at next subframe n through L1 signaling in the DL control channel indicated in a specific TTI mode in advance, or 2) notifying the UE of the TTI mode for subframe n+k at the next subframe n through L1 signaling for multiple TTI modes in advance.

In the case of using the variable subframe configured as above, if the control is made according to the system information being broadcasted at a relatively long interval, it may be difficult to reflect the quick change of traffic condition. Accordingly, the present invention proposes a method for transmitting the information on the next frame at every frame. For example, it may be possible to transmit to the UE the next frame information at anywhere in a frame with the Dl control signal (e.g., upper layer signal of PDCCH or PDSCH). The next frame information may include a number of subframes and type of each subframe. In the case that a discontinuous frame is configured, it may be possible to notify the UE of the absolute value of the start time point of the frame or a relative value determined in relation to a reference time point of the corresponding frame. It may also be possible to introduce a gap frame/subframe newly for notifying the UE of an empty frame/subframe. It may also be possible to notify the UE of the number of repetitions of the indicated frame. If no information indicating the number of repetitions of the next frame is received, the UE may operate under the assumption that the frame configuration that has been notified most recently repeats infinitely until new indication arrives. A detailed description thereof is made hereinafter.

Figure 33:
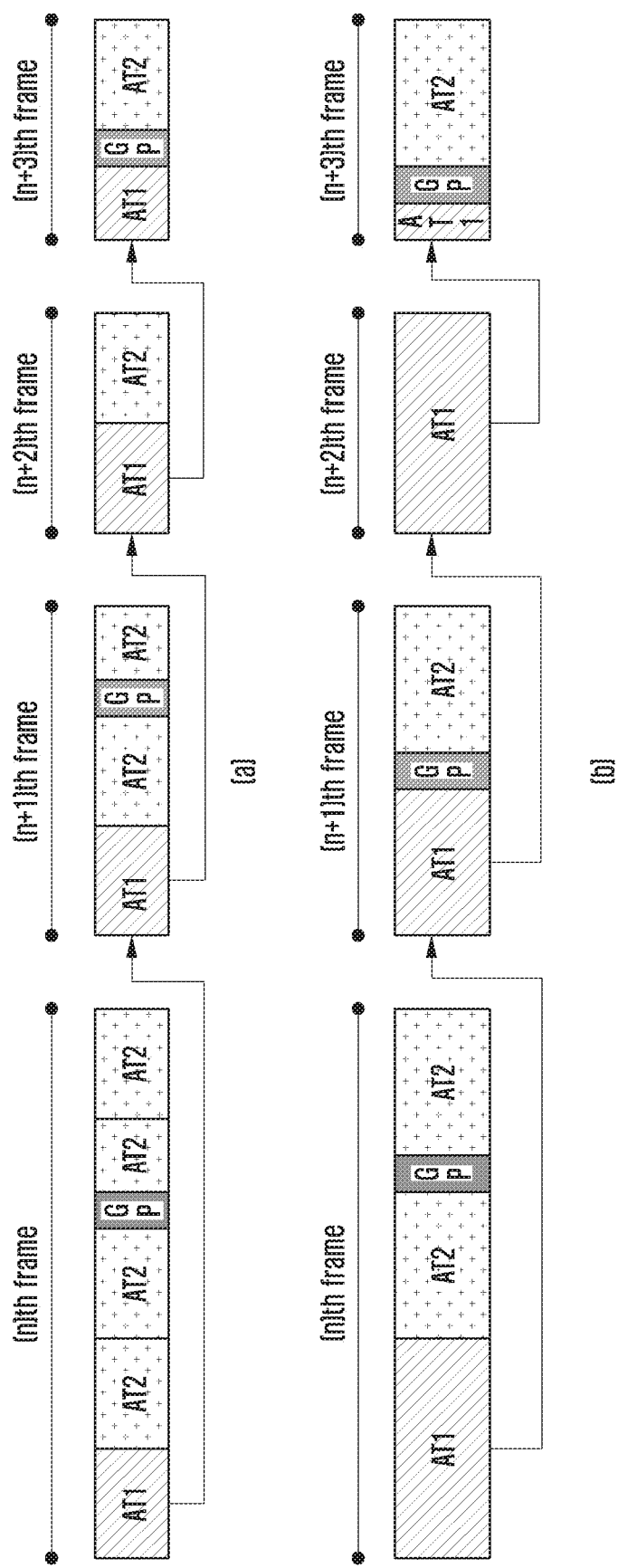
FIGS. 33 and 34 are diagrams for explaining a next frame information notification method according to an embodiment of the present invention.
Figure 34:
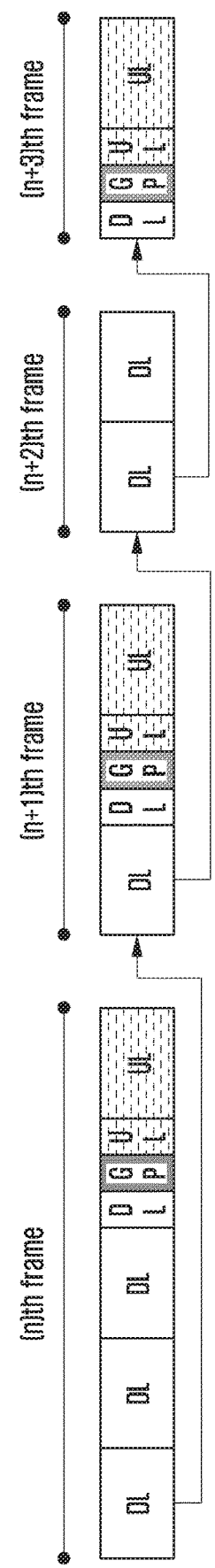

FIGS. 33 and 34 are diagrams for explaining a next frame information notification method according to an embodiment of the present invention.

In reference to part (a) of FIG. 33, a frame structure is depicted under the assumption that the length of a subframe is fixed. AT1 and AT2 denote building block types 1 and 2 according to the atomic design. The AT1 and AT2 may include DL or UL data scheduled by the eNB. It may be possible to configure a frame such that the GP is positioned at the beginning of an AT2 and at the end of an AT1. It may be possible to configure the frame to have a separate gap indication to indicate the GP position in the frame of part (a) of FIG. 33. The AT1 should be a subframe including at least one DL control channel, and the eNB may notify the UE of the frame configuration after next subframe n or subframe k through the DL control channel.

In reference to part (b) of FIG. 33, a frame structure is depicted under the assumption that the length of a subframe is variable. AT1 and AT2 denote building block types 1 and 2 according to the atomic design. The AT1 and AT2 may include DL or UL data scheduled by the eNB. It may be possible to configure a frame such that the GP is positioned at the beginning of an AT2 and at the end of an AT1 or include a separate gap indication to indicate the GP position. The AT1 should be a subframe including at least one DL control channel, and the eNB may notify the UE of the frame configuration after subframe k through the DL control channel. In the frame structure of part (b) of FIG. 33, the subframe length is variable; thus, if the UE does not receive a frame indicator, it may be difficult for the UE to determine a reference time for receiving the control channel. Accordingly, the eNB may notify the UE of the periodic timing in advance through RRC signaling or SI and schedule or control to transmit the next frame configuration indicator at the corresponding timing.

In association with the frame configuration method exemplified in FIG. 34, it may be possible to consider additional operations as follows.

a) The UE may overwrite the old frame configuration with a recently received frame configuration according to the frame indicator received from the eNB. This means to update the information on the same frame and add a new frame. If the frame indices mismatch, the same principle may be applied in unit of subframe. That is, it may be possible to update the information on the same subframe and add a new subframe.

b) It may be possible to configure semi-static frame information for sync, RACH, paging, and measurement. The fixed frame structure is not changed by a dynamic frame configuration. The eNB may transmit to the UE the information on the frame (or subframe) for receiving a sync signal, a reference signal, or a paging message through RRC signaling or system information (SI). The eNB may notify the UE of the RACH resource for use by the UE in transmitting the RA preamble through RRC signaling or SI. The common sync signal necessary for the initial access of the UE may be preconfigured at the UE or transmitted to the UE by another network through a separate control signal or a signal including SI.

c) If the UL data transmission scheduled according to an old UL grant is affected by a changed frame/subframe configuration, the UE has to make a determination thereon. The UE may perform at least one of the following operations. 1) If the UL data transmission timing indicated by the UL grant belongs to the changed frame/subframe, the UE cancels the UL data transmission. 2) If the UL data transmission timing indicated by the UL grant is changed to DL data transmission by the changed frame/subframe, the UE cancels the UL data transmission. 3) If the UL data transmission timing indicated by the UL grant is configured with the UL data transmission in spite of the changed frame/subframe, the UE does not cancel the UL data transmission. 4) If a variable affecting data transmission/reception such as subframe length is changed even though UL data transmission timing indicated by the UL grant is configured with the UL data transmission in spite of the changed frame/subframe, the UE cancels the UL data transmission.

Meanwhile, if the UL data transmission is cancelled, the eNB may transmit a separate UL grant with a UL grant-UL data delay shorter than that exists now for the cancelled UL data transmission or a UL grant including the delay value explicitly. This may be called quick UL data retransmission. In the case that the UL data transmission is cancelled owing to the frame/subframe configuration, the UE may hold the data blocks in the buffer and, if a UL grant with the same HARQ process ID is received from the eNB, transmit the stored data blocks. Although the time of storing the data blocks in the above operation is determined depending on the UE implementation, the eNB may configure a separate buffer storage time to the UE or limit the buffer storage time to the frame length for facilitating the scheduling operation of the eNB.

Next, a description is made of dynamic burst scheduling (DBS).

Figure 35:
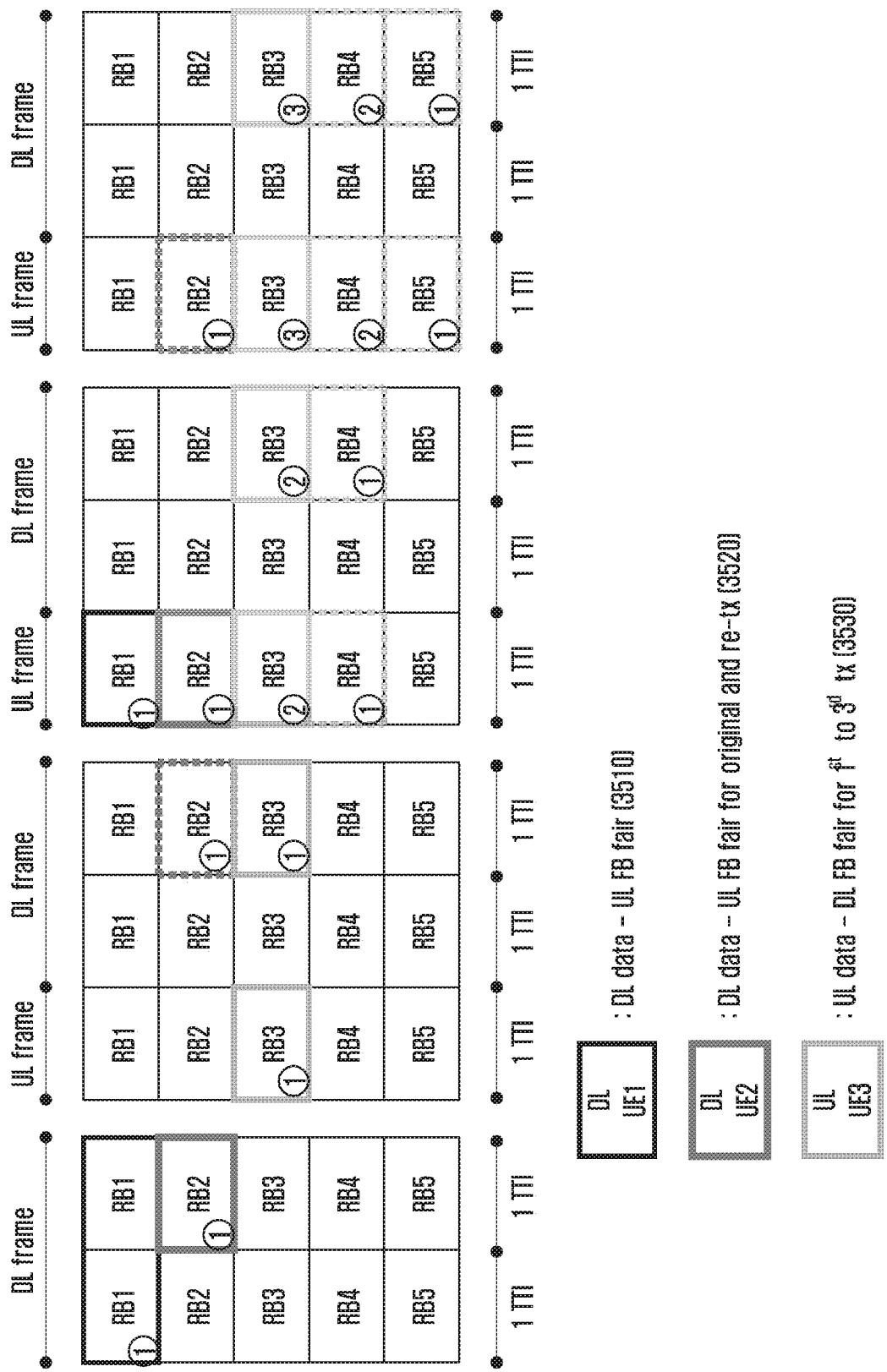
FIG. 35 is a diagram illustrating an exemplary DBS according to an embodiment of the present invention.

FIG. 35 is a diagram illustrating an exemplary DBS according to an embodiment of the present invention.

The resources for data burst and other signals are allocated by means of a signal indicator (single indication) indicative of configuration parameters such as timing and RBs.

The DBS is categorized into the following types:
Type-1 DBS allocates resources for data burst and feedback by means of a single PDCCH.
Type-2 DBS allocates resources for initial transmission and retransmissions by means of a single PDCCH.

If the retransmission (re-tx) resources for multiple UEs are overlapped, the eNB may overwrite the existing DL assignments or allocate priority-based shared UL resources.
Type-3 DBS allocates resources for multiple data bursts by means of a single PDCCH.

It may also be possible to allocate resources for UL and DL data bursts simultaneously.

The DBS types may be combined according to traffic property and service requirements (e.g., high reliability and low latency usages).

Meanwhile, a downlink control information (DCI) format may include at least the information as follows depending on DBS type.

In the case of Type-1 DBS (DL assignment for DL data), the DCI may include the information fields as listed in Table 1.

TABLE 1

| Field name | Length (Bits) |
| --- | --- |
| RB assignment | 10~20 (determined according to BW) |
| HARQ process ID | 3(FDD) or 4(TDD) |
| MCS | 5 |
| RV (Redundancy Version) | 2 |
| Time location of HARQ-ACK/NACK | 4 (one of following options)<br>a) $k^{th}$ subframe since subframe conveying DL data<br>b) $k^{th}$ subframe since start time of frame conveying DL data<br>c) $k^{th}$ UL data subframe since receipt of DL data<br>d) $k^{th}$ UL control channel since receipt of DL data |
| Frequency location of HARQ-ACK/NACK | RB_start (6), RB_length (6) |
| Multiplexing format w/ other UL controls | 3 |

In the case of Type-1 DBS (UL grant for UL data), the DCI may include the information fields as listed in Table 2.

TABLE 2

| Field name | Length (Bits) |
| --- | --- |
| RB assignment | 10~20 (determined according to BW) |
| HARQ process ID | 3(FDD) or 4(TDD) |
| TPC (Transmit Power Control) | Transmit Power Control |
| MCS | 5 |
| RV (Redundancy Version) | 2 |

TABLE 2-continued

| Field name | Length (Bits) |
| --- | --- |
| NDI (New Data Indicator) | 1 |
| Time location of HARQ-ACK/NACK | 4 (one of following options)<br>a) $k^{th}$ subframe since subframe conveying UL data<br>b) $k^{th}$ subframe since start time of frame conveying UL data<br>c) $k^{th}$ DL data subframe since transmission of UL data<br>d) $k^{th}$ DL control channel since transmission of UL data |
| Frequency location of HARQ-ACK/NACK | RB_start (6), RB_length (6) |
| Multiplexing format w/ other DL controls | 3 |

Although Type-2 DBS may allocate retransmission resources as does Type-1 DBS, it may be possible to improve efficiency by applying at least one of 1) allowing multiple UEs sharing the retransmission resources, 2) allowing for sharing the retransmission resources for multiple HARQ process IDs, and 3) allowing for sharing the retransmission resources to transmit the same HARQ process ID in multiple subframes because the retransmission resources are not in the state of being confirmed for transmission. In the case of Type-2 DBS, the DCI may further include at least one of the information fields listed in Table 3 in addition to the information fields included in the DCI for Type-1 DBS.

TABLE 3

| Field name | Length (Bits) |
| --- | --- |
| $M^{th}$ transmission | 2 |
| Fields of Type-I DBS | N/A |
| Information to be shared | a) UE group ID<br>b) HARQ process ID set (bitmap or start and end)<br>c) Recent J transmissions of specific HARQ process ID |

The Type-3 DBS is similar to the legacy multi-subframe scheduling characterized by allocating multiple subframes in one UL grant or DL assignment with the exception that the Type-3 DBS also allocates feedback resources for HARQ-ACK/NACK. Although it is possible to indicate the resource position for feedback corresponding to each data burst (packet) separately, it is preferable to indicate the resource position for feedback corresponding to the first transmission for DCI resource utilization efficiency. The resource positions for the feedback corresponding to other transmissions may be determined by one of a) by assuming that the interval between the first transmission and the corresponding feedback is maintained equally, b) assuming that feedback corresponding to the transmissions subsequent to the first transmission is conveyed in the consecutive subframes following the subframe conveying the feedback corresponding to the first transmission, and c) assuming that the feedback corresponding to the transmissions subsequent to the first transmission is multiplexed into the resources on which the feedback corresponding to the first transmission is transmitted.

The DBS is featured in that the resource bursts may be scheduled in consideration of the data and frequency band (FB) as well as all of the new transmission (new-tx) packets and retransmission (re-tx) packets to reduce feedback resource allocation delay or retransmission resource allocation delay.

The eNB may allocate resources to the UE using a resource mapping pattern selected among a predetermined number of resource sets. The resource mapping pattern may include allocated RBs, period, data/FB, and MCS etc.

The pre-assignment of resources for retransmission may cause waste of resources. In this respect, a resource sharing scheme may be considered.

In FIG. 35, reference numbers 3510, 3520, and 3550 denote the resource blocks allocated to the first to third UEs respectively. The circled numbers indicate initial transmission and retransmissions.

Figure 36:
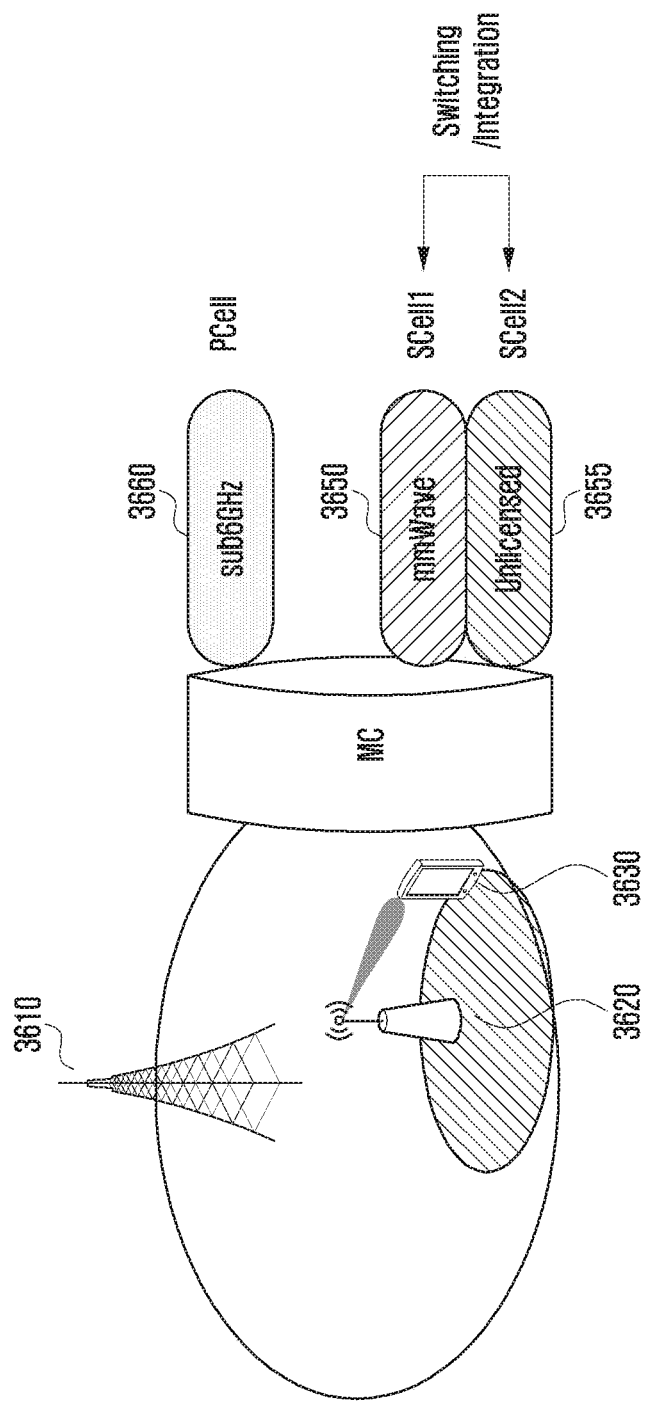
FIG. 36 is a diagram illustrating a mechanism for providing 5G communication services according to an embodiment of the present invention.

FIG. 36 is a diagram illustrating a mechanism for providing 5G communication services according to an embodiment of the present invention.

In reference to FIG. 36, it may be possible to use an unlicensed band 3655 as a backup link for a millimeter wave band (mmWave band) 3650 in the 5G communication. For example, if the throughput of the mmWave link drops abruptly, a secondary eNB (e.g., SeNB) 3620 may switch to the unlicensed band 3655 to mitigate the drop of throughput based on a report from a UE 3630. This is because the unlicensed band 3655 has a relatively low propagation attenuation in comparison with the mmWave band 3650, which makes it possible to secure a broadband in comparison with the licensed band 3660.

In more detail, the primary eNB (e.g., MeNB) 3610 and the secondary eNB (e.g., SeNB) 3620 may be integrated in a DC structure. The SeNB 3620 may have two switchable bands (spectrums) (e.g., mmWave band 3650 and industrial, scientific, and medical (ISM) 5 GHz band 3655). Typically, the UE 3630 may be served by means of the frequency band 3660 of the MeNB 3610 and mmWave band 3650 of the SeNB. If the service fails in the mmWave band 3650, the UE 3630 may be served by means of the frequency band 3660 of the MeNB 3610 and the ISM 5 GHz band 3655 of the SeNB 3620. However, the mmWave band 3650 suffers high attenuation and thus is likely be broken down. From the attenuation perspective, the ISM 5 GHz band 3655 may have a link property better than that of the mmWave band 3650. Switching between the mmWave band 3650 and the ISM 5 GHz band 3655 may be triggered through the frequency band (e.g., sub6 Ghz) 3660 of the MeNB 3610 or the ISM 5 GHz band 3655 of the SeNB 3620.

Figure 37:
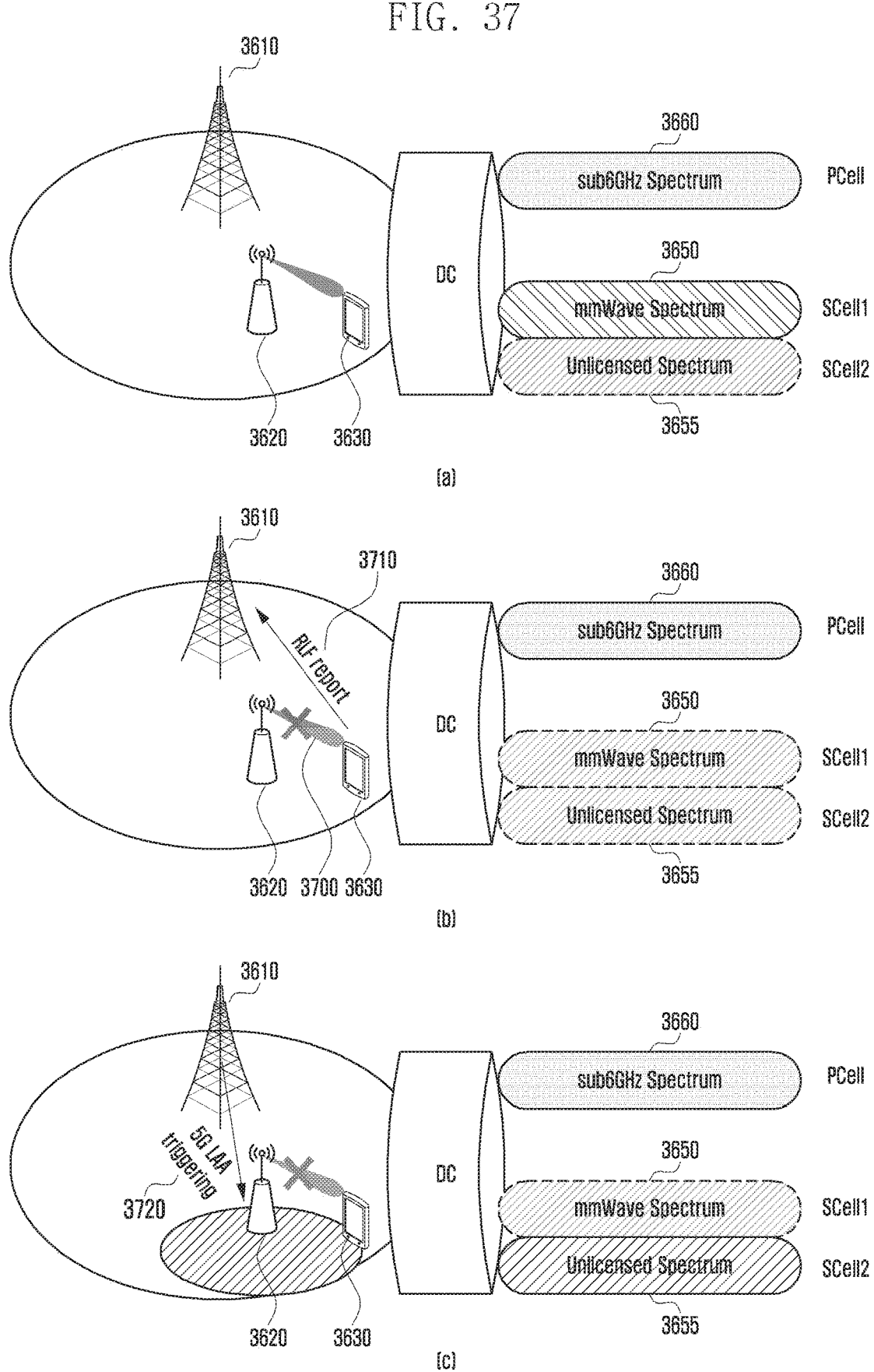
FIGS. 37 and 38 are diagrams for explaining a method for a UE to report radio link failure (RLF) in the mmWave band according to an embodiment of the present invention.
Figure 38:
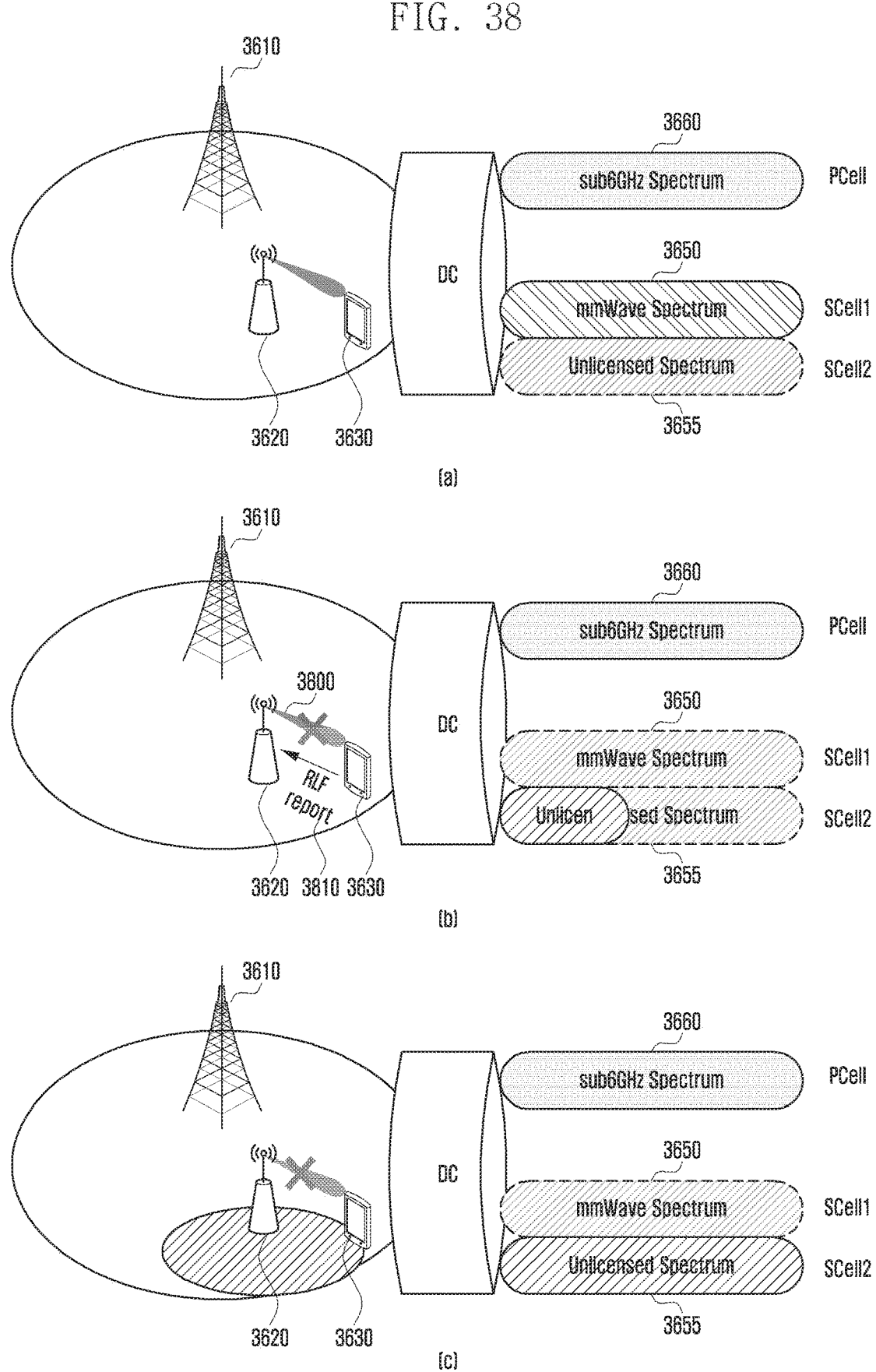
Figure 39:
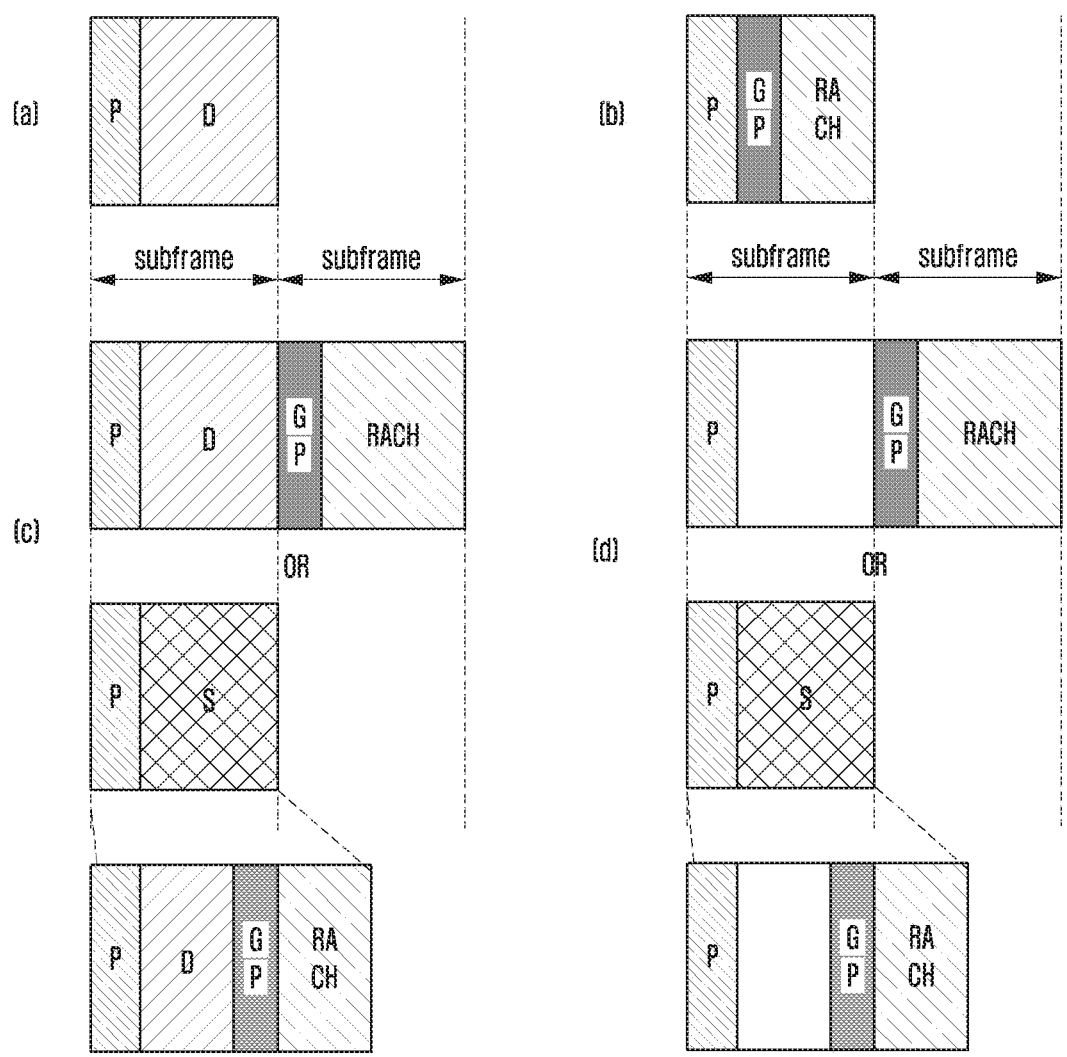
FIG. 39 is a diagram illustrating subframe structures for use by a UE in reporting RLF in an mmWave band.

FIGS. 37 and 38 are diagrams for explaining a method for a UE to report radio link failure (RLF) in the mmWave band according to an embodiment of the present invention, and FIG. 39 is a diagram illustrating subframe structures for use by a UE in reporting RLF in an mmWave band.

In reference to FIG. 37, the UE 3630 may report RLF in the mmWave band 3650 to the MeNB 3610 as denoted by reference number 3710. The UE 3630 may be served by the SeNB 3620 in the mmWave band 3650 as shown in part (a) of FIG. 37. In this situation, it may occur that the throughput on a link of the mmWave band 3650 between the UE 3630 and the SeNB 3620 drops as denoted by reference number 3700 (e.g., link failure) as shown in part (b) of FIG. 37. In this case, the UE 3630 may report RLF to the MeNB 3610 as denoted by reference number 3710. The MeNB 3610 may transmit to the SeNB 3620 a message triggering a switch from the mmWave band 3650 to the unlicensed band 3655 as denoted by reference number 3720 as shown in part (c) of FIG. 37. Afterward, the UE 3630 may be served by the SeNB 3620 in the unlicensed band 3655.

In reference to FIG. 38, the UE 3630 may report RLF of the mmWave band 3650 via the SeNB 3620. As shown in part (a) of FIG. 38, the UE 3630 may be served by the SeNB 3620 in the mmWave band 3650. In this situation, it may occur that the throughput on a link of the mmWave band 3650 between the UE 3630 and the SeNB 3620 drops as denoted by reference number 3800 (e.g., link failure) as shown in part (b) of FIG. 38. In this case, the UE 3630 may report RLF to the SeNB 3620 as denoted by reference number 3810. Afterward, the SeNB 3620 may serve the UE 3630 in the unlicensed band 3655 as shown in part (c) of FIG. 38. This approach may make it possible to report RLF quickly in comparison with the approach of reporting RLF to the MeNB 3610 in the embodiment of FIG. 37.

In order for the UE 3630 to report RLF to the SeNB 3620 quickly, it is necessary to design the network to allow prompt uplink transmission in spite of the LBT rule in the unlicensed band 3655.

In reference to FIG. 39, the eNB 3620 may transmit a polling signal "P" at a predetermined interval on a predetermined carrier in consideration of service requirements. The polling signal may be configured in legacy primary synchronization signal/secondary synchronization signal (PSS/SSS), CRS/CSI-RS, or DRS. Since the polling signal consumes a very short time, the eNB 3620 may transmit the polling signal at a relatively short interval in spite of the LBT rule. There is no need of a channel sensing operation for transmitting an uplink signal in response to the polling signal after a predetermined GP. Accordingly, the UE 3630 that has configured RACH after receipt of the polling signal "P" and then experienced abrupt RLF on the mmWave link may monitor the unlicensed band 3655 for the polling signal. The UE 3630 may transmit an RLF failure report to the eNB 3620 or perform a normal random access procedure on the RACH resources that is preconfigured or indicated in the polling signal.

A description is made of the 5G band sharing (spectrum sharing).

Figure 40:
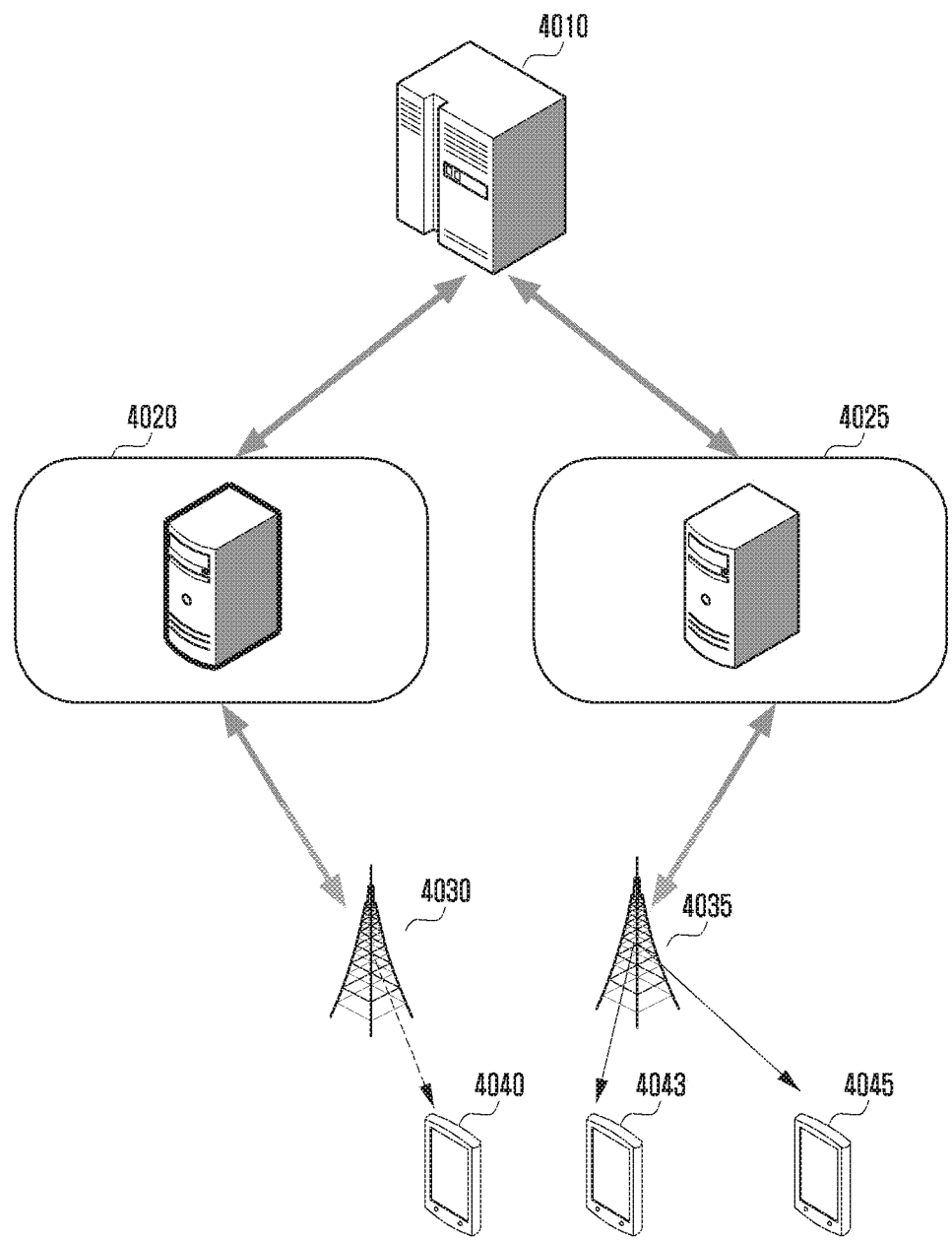
FIG. 40 is a diagram illustrating exemplary frequency sharing for 5G communication according to an embodiment of the present invention.
Figure 41:
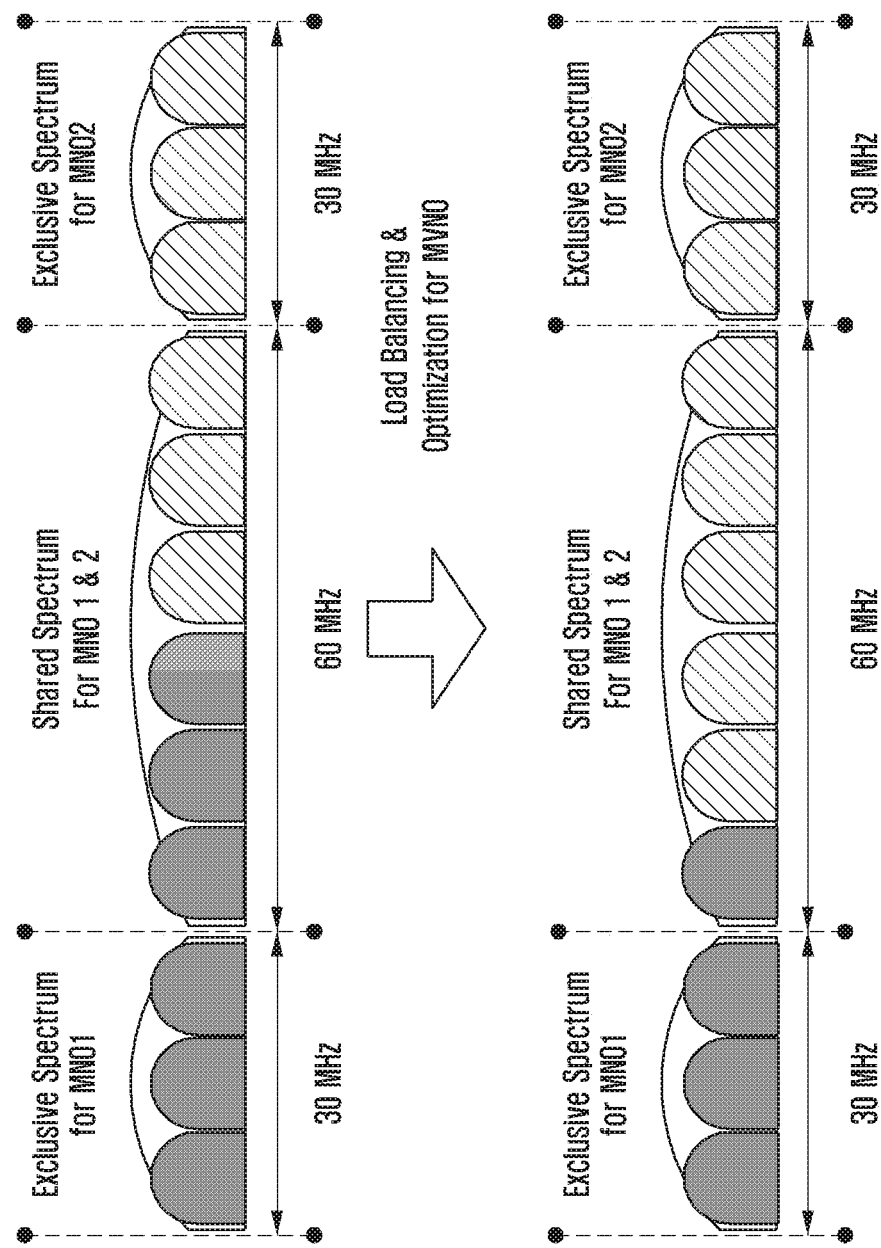
FIGS. 41 and 42 are diagrams for explaining frequency sharing operations according to an embodiment of the present invention.
Figure 42:
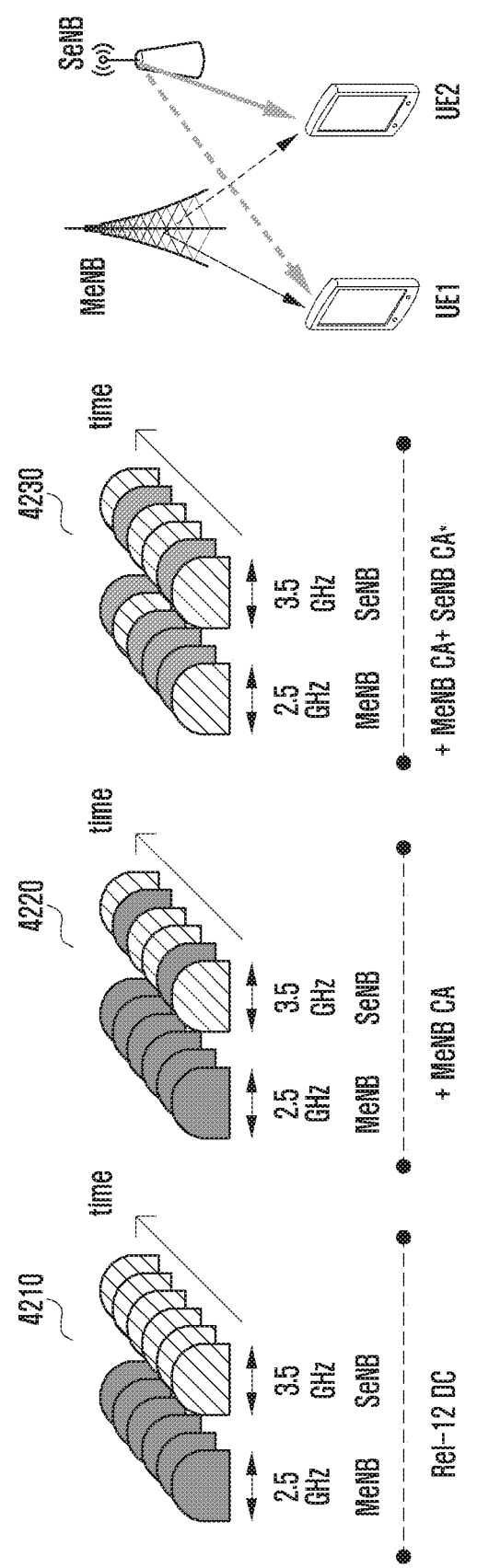

FIG. 40 is a diagram illustrating exemplary frequency sharing for 5G communication according to an embodiment of the present invention, and FIGS. 41 and 42 are diagrams for explaining frequency sharing operations according to an embodiment of the present invention.

In reference to FIG. 40, a 5G communication system is designed to share multi-purpose frequency sharing. For example, it may be possible to consider a mobile virtual network operator (MVNO) 4010 that is capable of using multiple operator networks. The MVNO 4010 has no physical mobile communication network but leases frequency spectrum from mobile network operators (MNOs) 4020 and 4025 to provide a communication service under its own brand name. As shown in FIG. 40, a first eNB (eNB1) 4030 belongs to the first MNO (MNO1) 4020, and a second eNB (eNB2) 4035 belongs to the second MNO (MNO2) 4025. The MVNO 4010 or platform provider may lease the networks of the two MNOs 4020 and 4025 to provide the first to third UEs 4040, 4043, and 4045 with certain services.

From the viewpoint of the MVNO 4010, which has leased the networks and frequency of the MNO1 4020 and the MNO2 4025, if necessary, it is possible to perform frequency sharing and adjust the ratio between MNO-specific resources to improve the quality of communication service.

In reference to FIG. 41, it may be possible to secure a 60-MHz shared band in addition to the 30-MHz exclusive bands for MNO1 4020 and MNO2 4025. In this case, if the number of users connected to the eNB2 4035 of the MNO2 4025 increases, the MVNO 4010 may assign the bandwidth of 50 MHz of the 60-MHz band for use by the eNB2 4035. This method may be considered in the case of sharing frequency by carrier unit (e.g., by 10 MHz unit).

Considering that the small cell's traffic varies significantly in volume and frequently, it may be difficult to expect sufficient throughput improvement only with the frequency sharing by 10 MHz unit. In this case, it may be possible to consider a temporal frequency sharing scheme by a few ms unit.

It may be possible to apply the temporal frequency sharing per MNO 4020 or 4025. In reference to FIG. 42, a sharing scheme may be applied in addition to the legacy Rel-12 dual connectivity (DC). In the legacy DC, the MeNB and SeNB each have independent schedulers. Typically, this is meaningful when the MeNB and SeNB are located at separate positions and connected through a non-ideal backhaul link. Since the backhaul link is not ideal, the MeNB operating at 2.5 GHz and the SeNB operating at 3.5 GHz are separated in the frequency domain according to the legacy standard (Rel-12) as denoted by reference number 4210. However, the present invention makes it possible to apply a temporal frequency sharing scheme. For example, it may be possible to allow for the MeNB to use the 3.5 GHz band (DC+MeNB CA) as denoted by reference number 4220. This is similar to the carrier aggregation (CA) scheme of using the 3.5 GHz band as the secondary carrier while MeNB uses the 2.5 GHz band as the primary carrier for bandwidth expansion. However, it may be necessary to apply a shared access scheme in the 3.5 GHz band to avoid resource collision and interference because the 3.5 GHz band is in use by the SeNB, even though it is a licensed band. The shared access scheme may be implemented in compliance with LBT or carrier sensing multiple access/collision avoidance (CSMA-CA) that is used in the unlicensed band. The shared access scheme may be an efficient resource-shared access scheme based on an explicit inter-eNB protocol. It may also be possible to allow for the SeNB to use the 2.5 GHz band for CA in addition to CA at the MeNB (DC+MeNB CA+SeNB CA) as denoted by reference number 4230. In this case, however, only the SeNB can use the 2.5 GHz band in an opportunistic manner while the MeNB uses a normal centralized resource access scheme for secure operations of the MeNB on the 2.5 GHz band.

In order to implement an efficient resource-shared access scheme, it may be possible to consider an explicit signal exchange-based resource access scheme instead of the legacy LBT or other carrier-sensing based resource access scheme. For example, an eNB may transmit to another eNB the information such as cell ID and PLMN ID using a preamble signal (e.g., initial signal and reservation signal) or a broadcast channel. The eNB is aware of the presence of the neighboring eNB based on the cell ID or PLMN ID thereof. The eNB may transmit the resource sharing information in or along with the above signal. The resource sharing information may include at least one of start time and length of the resource to be used, frequency of the resource to be used, variables for resource access, and transmit power. The variables for resource access may include a size of contention window for use in CBA.

Meanwhile, the eNB may determine the size of resource to be used based on the per-eNB resource allocation amounts configured by the network. For example, if it is determined to allocate the resources of the first and second eNBs at the ratio of 1:2, the first eNB may attempt resource access for 5 ms while the second eNB may attempt resource access for 10 ms. Of course, if the first eNB fails in recognizing the activity of the second eNB, it may allocate the UE the resources as necessary without any restriction. Alternatively, if it is configured to allocate the resources of the first and second eNBs at the ratio of 1:2, the first eNB may use the contention window having a length of 16, while the second eNB may use the contention window having a length of 32. Here, it may be possible to control at least one of the time/frequency resource amount, variables necessary for resource access, transmit power, and number of retransmissions.

For efficient resource sharing, the eNB may also notify the neighboring eNB of the resources that are not to be used in addition to the resources that are to be used. This notification may be performed using an occupancy signal and a vacancy signal. According to an embodiment of the present invention, the eNB may transmit a 1-bit occupancy/vacancy indicator indicative of the start point and length of the resource. In this case, the occupancy signal may be configured to include indication on only the downlink resource, both the downlink and uplink resources, or the downlink, uplink, and peer-link resources. According to an embodiment of the present invention, when resource type is changed, the occupancy signal may further include an indicator indicating the change.

Figure 43:
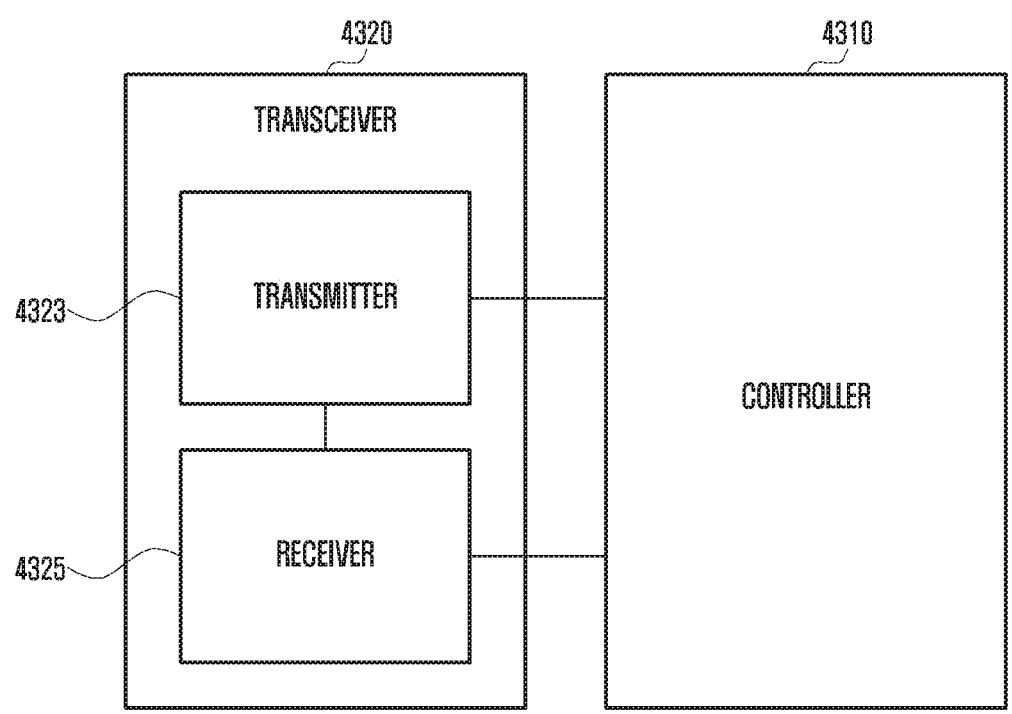
FIG. 43 is a block diagram illustrating a configuration of a UE according to an embodiment of the present invention.

FIG. 43 is a block diagram illustrating a UE according to an embodiment of the present invention.

In the embodiment of FIG. 43, the UE may include a transceiver 4320 and a controller 4310 for controlling overall operations of the UE.

The controller 4310 may control the UE to perform the operations of one of the above-described embodiments of the present invention. For example, the controller 4310 may control the UE to transmit an RAT discovery request message to an eNB through a CDCH, receive an RAT discovery response message and system information related to the RAT from the eNB, and receive a UE-specific configuration message in the resource region configured according to the system information received from the eNB.

The transceiver 4320 may perform the transmission and reception operations according to one of the above embodiments of the present invention. According to an embodiment of the present invention, the transceiver 4320 may include a transmitter 4323 for transmitting signals to other network entities and a receiver 4325 for receiving signals from the other network entities. For example, the transceiver 4320 may transmit the RAT discovery request message to the eNB and receive the RAT discovery response message, SI, and UE-specific configuration message from the eNB.

Although depicted as separate devices, the controller 4310 and the transceiver 4320 may be implemented into a component such as a single chip.

Figure 44:
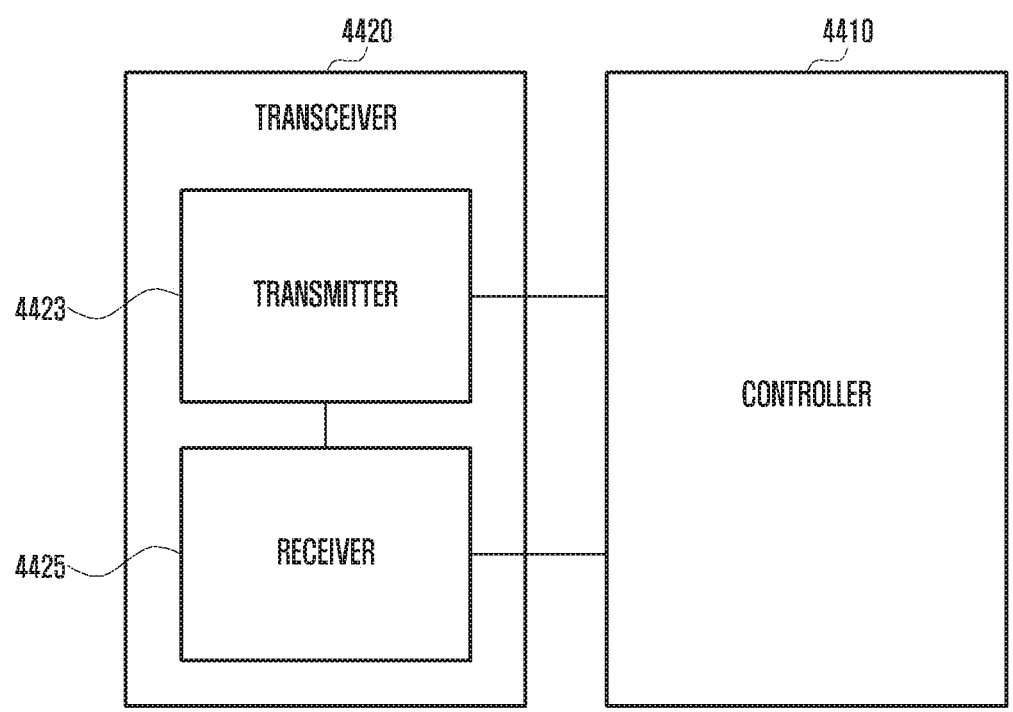
FIG. 44 is a block diagram illustrating a configuration of an eNB according to an embodiment of the present invention.

FIG. 44 is a block diagram illustrating a configuration of an eNB according to an embodiment of the present invention.

In the embodiment of FIG. 44, the eNB may include a transceiver 4420 and a controller 4410 for controlling overall operations of the eNB.

The controller 4410 may control the eNB to perform one of the operations of the above-described embodiments. For example, the controller 4410 may receive an RAT discovery request message from a UE through a CDCH and transmit to the UE an RAT discovery response message and RAT-related system information, and a UE-specific configuration message in a resource region configured according to the system information.

The transceiver 4420 may perform the transmission and reception operation of signals according to one of the above-described embodiments. According to an embodiment of the present invention, the transceiver 4420 may include a transmitter 4423 for transmitting signals to other network entities and a receiver 4425 for receiving signals from the other network entities. For example, the transceiver 4420 may receive the RAT discovery request message from the UE and transmit the RAT discovery response message, SI, and UE-specific configuration message.

Although depicted as separate devices, the controller 4410 and the transceiver 4420 may be implemented into one component such as a single chip.

The above described operations of the eNB and UE may be realized by implementing a memory device storing corresponding program codes in a certain component of the eNB or the UE. That is, the controller of the eNB or the UE may read out the program codes from the memory device and execute by means of a processor or a central processing unit (CPU) to realize the above described operations.

The various components, modules composing an entity, an eNB, or a UE may be implemented in the form of a hardware circuit such as complementary metal oxide semiconductor-based logic circuit, firmware, software and/or a combination of hardware and firmware, and/or software element stored in a machine-readably medium. For example, various electrical structure and methods may be executed by means of electric circuits such as transistors, logic gates, and on-demand semiconductors.

Although various embodiments of the present invention have been described using specific terms, the specification and drawings are to be regarded in an illustrative rather than a restrictive sense in order to help understand the present invention. It is obvious to those skilled in the art that various modifications and changes can be made thereto without departing from the broader spirit and scope of the invention.

Although preferred embodiments of the invention have been described using specific terms, the specification and drawings are to be regarded in an illustrative rather than a restrictive sense in order to help understand the present invention. It is obvious to those skilled in the art that various modifications and changes can be made thereto without departing from the broader spirit and scope of the invention.

What is claimed is:

1. A communication method of a terminal, the method comprising:
    transmitting, to a base station, a radio access technology (RAT) discovery request message for requesting a service on a common discovery channel (CDCH);
    receiving, from the base station, a RAT discovery response message including information on a resource for RAT-related system information;
    receiving, from the base station, the RAT-related system information based on the information on the resource for the RAT-related system information, the RAT-related system information including information on the service for the terminal; and
    receiving, from the base station, a terminal-specific configuration information for configuring the terminal on a resource region based on the RAT-related system information.

2. The method of claim 1, wherein the transmitting the RAT discovery request message comprises:
    receiving, from the base station, a common configuration message including CDCH configuration information; and
    transmitting, to the base station, the RAT discovery request message on the CDCH configured according to the CDCH configuration information.

3. The method of claim 1, wherein the RAT-related system information includes information on the resource region for receiving the terminal-specific configuration information.

4. The method of claim 1, wherein the receiving the RAT-related system information comprises:
    receiving, from the base station, the RAT-related system information on reception resources determined according to a position of a transmission resource of the RAT discovery request message or reception resources determined according to a position of a reception resource of the RAT discovery response message.

5. A communication method of a base station, the method comprising:
    receiving, from a terminal, a radio access technology (RAT) discovery request message for requesting a service on a common discovery channel (CDCH);
    transmitting, to the terminal, a RAT discovery response message including information on a resource for RAT-related system information;
    transmitting, to the terminal, the RAT-related system information based on the information on the resource for the RAT-related system information, the RAT-related system information including information on the service for the terminal; and
    transmitting, to the terminal, a terminal-specific configuration information for configuring the terminal on a resource region based on the RAT-related system information.

6. The method of claim 5, wherein the receiving the RAT discovery request message comprises:
    transmitting, to the terminal, a common configuration message including CDCH configuration information; and
    receiving, from the terminal, the RAT discovery request message on the CDCH configured according to the CDCH configuration information.

7. The method of claim 5, wherein the RAT-related system information includes information on the resource region for receiving the terminal-specific configuration information.

8. The method of claim 5, wherein the transmitting the RAT-related system information comprises:
    transmitting, to the terminal, the RAT-related system information on reception resources determined according to a position of a transmission resource of the RAT discovery request message or reception resources determined according to a position of a reception resource of the RAT discovery response message.

9. A terminal comprising:
    a transceiver; and
    a controller configured to:
        transmit, to a base station, a radio access technology (RAT) discovery request message for requesting a service on a common discovery channel (CDCH),
        receive, from the base station, a RAT discovery response message including information on a resource for RAT-related system information,
        receive, from the base station, the RAT-related system information based on the information on the resource for the RAT-related system information, the RAT-related system information including information on the service for the terminal, and
        receive, from the base station, a terminal-specific configuration information for configuring the terminal on a resource region based on the RAT-related system information.

10. The terminal claim 9, wherein the controller is further configured to:
    receive, from the base station, a common configuration message including CDCH configuration information; and transmit, to the base station, the RAT discovery request message on the CDCH configured according to the CDCH configuration information.

11. The terminal of claim 9, wherein the RAT-related system information includes information on the resource region for receiving the terminal-specific configuration information.

12. The terminal of claim 10, wherein the controller is further configured to receive, from the base station, the RAT-related system information on reception resources determined according to a position of a transmission resource of the RAT discovery request message or reception resources determined according to a position of a reception resource of the RAT discovery response message.

13. A base station comprising:
a transceiver; and
a controller configured to:
receive, from a terminal, a radio access technology (RAT) discovery request message for requesting a service on a common discovery channel (CDCH),
transmit, to the terminal, a RAT discovery response message including information on a resource for RAT-related system information,
transmit, to the terminal, the RAT-related system information based on the information on the resource for the RAT-related system information, the RAT-related system information including information on the service for the terminal, and
transmit, to the terminal, a terminal-specific configuration information for configuring the terminal on a resource region based on the RAT-related system information.

14. The base station of claim 13, wherein the controller is further configured to:
transmit, to the terminal, a common configuration message including CDCH configuration information, and
receive, from the terminal, the RAT discovery request message on the CDCH configured according to the CDCH configuration information.

15. The base station of claim 13,
wherein the RAT-related system information includes information on the resource region for receiving the terminal-specific configuration information, and
wherein the controller is further configured to transmit, to the terminal, the RAT-related system information on reception resources determined according to a position of a transmission resource of the RAT discovery request message or reception resources determined according to a position of a reception resource of the RAT discovery response message.

* * * * *